US011441073B2

(12) United States Patent
Hirschmann et al.

(10) Patent No.: US 11,441,073 B2
(45) Date of Patent: Sep. 13, 2022

(54) LIQUID-CRYSTALLINE MEDIUM

(71) Applicant: MERCK PATENT GMBH, Darmstadt (DE)

(72) Inventors: Harald Hirschmann, Darmstadt (DE); Martina Windhorst, Muenster (DE); Monika Bauer, Seligenstadt (DE); Volker Reiffenrath, Rossdorf (DE); Matthias Bremer, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/832,193

(22) Filed: Aug. 21, 2015

(65) Prior Publication Data

US 2016/0053178 A1 Feb. 25, 2016

(30) Foreign Application Priority Data

Aug. 22, 2014 (DE) .................. 10 2014 012 641.2

(51) Int. Cl.
| | | |
|---|---|---|
| G02F 1/1333 | (2006.01) |
| C09K 19/34 | (2006.01) |
| C09K 19/12 | (2006.01) |
| C09K 19/30 | (2006.01) |
| C09K 19/32 | (2006.01) |
| C09K 19/54 | (2006.01) |

(52) U.S. Cl.
CPC .......... C09K 19/3402 (2013.01); C09K 19/12 (2013.01); C09K 19/3003 (2013.01); C09K 19/3098 (2013.01); C09K 19/32 (2013.01); C09K 19/54 (2013.01); C09K 19/542 (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/3422* (2013.01); *C09K 2019/548* (2013.01)

(58) Field of Classification Search
CPC .............. C09K 19/3402; C09K 19/12; C09K 19/3003; C09K 19/3098; C09K 19/32; C09K 19/54; C09K 19/542; C09K 2019/122; C09K 2019/123; C09K 2019/124; C09K 2019/3004; C09K 2019/3009; C09K 2019/301; C09K 2019/3016; C09K 2019/3027; C09K 2019/3422; C09K 2019/548; G02F 1/1333

See application file for complete search history.

(56) References Cited

U.S. PATENT DOCUMENTS

| | | |
|---|---|---|
| 6,692,657 B1 | 2/2004 | Kato et al. |
| 7,081,279 B2 | 7/2006 | Kato et al. |
| 7,582,337 B2 * | 9/2009 | Klasen-Memmer ........ C09K 19/322 252/299.62 |
| 8,168,081 B2 | 5/2012 | Klasen-Memmer |
| 8,475,889 B2 | 7/2013 | Klasen-Memmer |
| 8,496,850 B2 | 7/2013 | Hattori et al. |
| 8,535,768 B2 | 9/2013 | Saito |
| 8,728,590 B2 * | 5/2014 | Hattori ............ C09K 19/3402 252/299.61 |
| 8,968,597 B2 | 3/2015 | Furusato et al. |
| 9,062,250 B2 | 6/2015 | Ito et al. |
| 9,102,869 B2 | 8/2015 | Furusato et al. |
| 9,150,787 B2 | 10/2015 | Gotoh et al. |
| 9,777,216 B2 | 10/2017 | Klasen-Memmer et al. |
| 2004/0065866 A1 | 4/2004 | Kato et al. |
| 2008/0017836 A1 | 1/2008 | Saito |
| 2009/0032771 A1 | 2/2009 | Saito |
| 2011/0037024 A1 | 2/2011 | Kobayashi |
| 2011/0248216 A1 | 10/2011 | Klasen-Memmer |
| 2014/0043579 A1 | 2/2014 | Furusato et al. |
| 2014/0110630 A1 | 4/2014 | Goebel |
| 2015/0299571 A1 | 10/2015 | Yanai et al. |
| 2016/0053178 A1 * | 2/2016 | Hirschmann .......... C09K 19/12 252/299.5 |
| 2018/0030350 A1 | 2/2018 | Hirschmann |

FOREIGN PATENT DOCUMENTS

| | | |
|---|---|---|
| CN | 102131897 A | 7/2011 |
| CN | 102753653 A | 10/2012 |
| EP | 0969071 A1 | 1/2000 |
| EP | 2266941 A1 | 12/2010 |
| EP | 1958999 B1 | 7/2012 |

(Continued)

OTHER PUBLICATIONS

European Search Report received in the corresponding related European Patent Application No. EP15002257 dated Jan. 20, 2016.

(Continued)

*Primary Examiner* — Geraldina Visconti
(74) *Attorney, Agent, or Firm* — Millen White Zelano & Branigan, PC; Brion P. Heaney

(57) ABSTRACT

The invention relates to a liquid-crystalline medium which comprises at least one compound of the formula I,

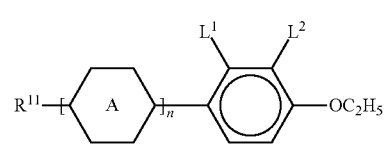

I wherein the radicals $R^{11}$, $L^1$, $L^2$, n and A are as defined herein, and to the use thereof for an active-matrix display, in particular based on the VA, PSA, PS-VA, PA-VA, PALC, FFS, PS-FFS, IPS or PS-IPS effect.

34 Claims, No Drawings

(56) References Cited

FOREIGN PATENT DOCUMENTS

| EP | 2677018 | A2 | 12/2013 |
|----|---------|----|---------|
| EP | 2722380 | A2 | 4/2014 |
| EP | 2380947 | B1 | 8/2015 |
| EP | 2957618 | A1 | 12/2015 |
| WO | 2008009417 | A1 | 1/2008 |
| WO | 11148928 | A1 | 12/2011 |
| WO | 11158820 | A1 | 12/2011 |
| WO | 13125379 | A1 | 8/2013 |
| WO | 13175892 | A1 | 11/2013 |
| WO | 14006963 | A1 | 1/2014 |
| WO | 14024648 | A1 | 2/2014 |

OTHER PUBLICATIONS

European Search Report received in the corresponding related European Patent Application No. EP15002257 dated Jun. 21, 2017.
Third Party observations received in the corresponding related European Patent Application No. EP15002257 dated Mar. 21, 2018.
First Office Action in corresponding CN App. 201510724108.x dated Feb. 19, 2019 (pp. 1-9).
Office Action in corresponding TW App. 104127395 dated Jan. 24, 2019 (pp. 1-3).

\* cited by examiner

LIQUID-CRYSTALLINE MEDIUM

The invention relates to a liquid-crystalline medium, in particular based on a mixture of polar compounds, which comprises at least one compound of the formula I,

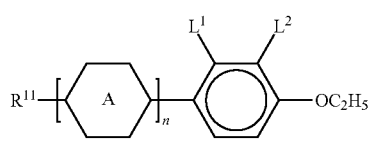

in which the individual radicals each, independently of one another and identically or differently on each occurrence, have the following meaning:
$R^{11}$ denotes an alkenyl radical having 2 to 12 C atoms,
$L^1$ and $L^2$ denote F, Cl, $CF_3$, $OCF_3$ or $CHF_2$,
n denotes 1 or 2,
A denotes a trans-1,4-cyclohexylene radical, or a 1,4-phenylene radical, which may also be substituted by one or two identical or different radicals $L^1$,
and to the use thereof for an active-matrix display, in particular based on the VA (vertically aligned), PSA (polymer sustained VA), PS-VA (polymer stabilized VA), PA-VA (photo alignment-VA), PALC (plasma addressed liquid crystal), FFS (fringe field switching), PS-FFS (polymer stabilized-FFS), IPS (in-plane switching) or PS-IPS (polymer stabilized-IPS) effect.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy Δn and values for the dielectric anisotropy of Δ∈≤−0.5 in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or air-craft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There thus continues to be a great demand for MLC displays having very high specific resistance at the same time as a large working-temperature range, short response times and a low threshold voltage with the aid of which various grey shades can be produced.

The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

The invention is based on the object of providing liquid-crystal mixtures, in particular for monitor and TV applications, which are based on the ECB effect or on the IPS or FFS effect, which do not have the above-mentioned disadvantages or only do so to a reduced extent. In particular, it must be ensured for monitors and televisions that they also operate at extremely high and extremely low temperatures and at the same time have short response times and at the same time have improved reliability behavior, in particular have no or significantly reduced image sticking after long operating times.

Surprisingly, it is possible to improve the rotational viscosities, and the ratio of rotational viscosity and elastic constants, and thus the response times, if polar compounds of the general formula I are used in liquid-crystal mixtures, in particular in LC mixtures having negative dielectric anisotropy, preferably for VA displays.

The use of compounds of the formula I in LC mixtures having negative dielectric anisotropy surprisingly results in very low rotational viscosities and in a reduction in the ratio of rotational viscosity and elastic constants. Liquid-crystal mixtures, preferably VA, PS (=polymer stabilized)-VA, PA (=photo alignment)-VA, IPS, PS-IPS, PS-FFS, FFS mixtures, in particular UB-FFS (ultra brightness fringe field switching) mixtures, which have short response times, at the same time good phase properties and good low-temperature behavior can therefore be prepared.

The invention thus relates to a liquid-crystalline medium which comprises at least one compound of the formula I. The present invention likewise relates to compounds of the formula I.

The mixtures according to the invention preferably exhibit very broad nematic phase ranges having clearing points ≥70° C., preferably ≥75° C., in particular ≥80° C., very favorable values for the capacitive threshold, relatively high values for the holding ratio and at the same time very good low-temperature stabilities at −20° C. and −30° C., as well as very low rotational viscosities and short response times. The mixtures according to the invention are furthermore distinguished by the fact that, in addition to the improvement in the rotational viscosity $\gamma_1$, relatively high values of the elastic constant $K_3$ for improving the response times can be observed. In particular, the mixtures according to the invention have a particularly low value for the ratio $\gamma_1/K_3$ of rotational viscosity $\gamma_1$ and elastic constant $K_3$, which is an indicator of a fast response time.

Some preferred embodiments of the mixtures according to the invention are indicated below.

In the compounds of the formula I, $R^{11}$ preferably denotes straight-chain alkenyl having 2 to 15, preferably 2 to 6, C atoms, particularly preferably $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Preferred compounds of the formula I are selected from the following sub-formulae:

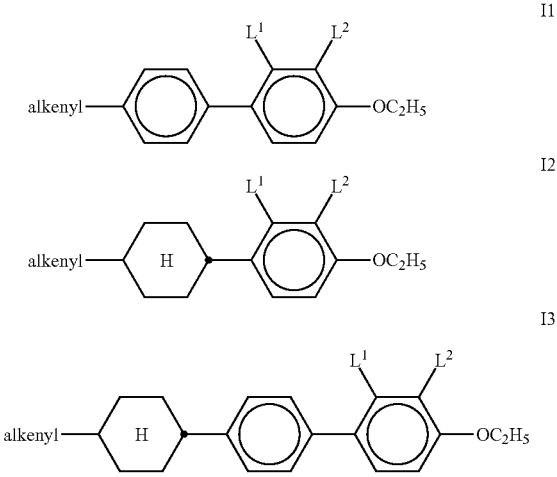

I4

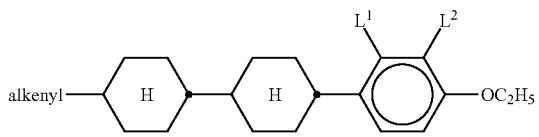

in which alkenyl denotes a straight-chain alkenyl radical having 2-6 C atoms, and $L^1$ and $L^2$ each, independently of one another, denote F or Cl.

Particular preference is given to compounds of the formulae I1, I3 and I4.

"Alkenyl" in the compounds of the sub-formulae I1 to I4 preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula I are selected from the following sub-formulae:

I1a

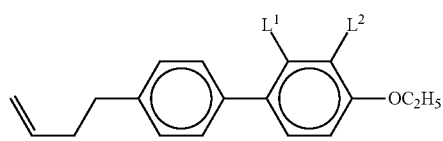

I3a

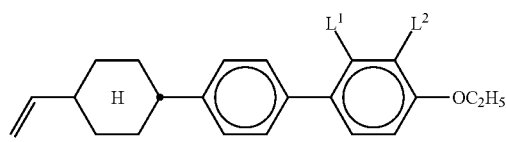

I4a

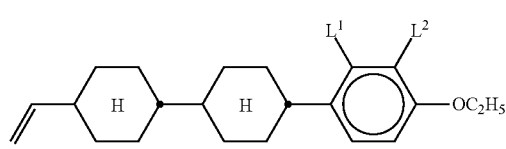

in which $L^1$ and $L^2$ each, independently of one another, denotes F or Cl.

In the compounds of the formula I and in the sub-formulae I1 to I4 and I1a to I4a, preferably $L^1=L^2=F$.

The media according to the invention preferably comprise one, two, three, four or more, preferably one, two, three or four, compounds of the formula I.

In a preferred embodiment of the invention, the liquid-crystalline medium comprises precisely one compound of the formula I, preferably a compound of the formula I1 or a compound of the formula I4, in particular a compound of the formula I1a or a compound of the formula I4a.

In a further preferred embodiment of the invention, the liquid-crystalline medium comprises precisely two compounds of the formula I, preferably a compound of the formula I1 and a compound of the formula I3, or a compound of the formula I1 and a compound of the formula I4, in particular a compound of the formula I1a and a compound of the formula I3a, or a compound of the formula I1a and a compound of the formula I4a.

In a further preferred embodiment of the invention, the liquid-crystalline medium comprises precisely three compounds of the formula I, preferably a compound of the formula I1, a compound of the formula I3 and a compound of the formula I4, in particular a compound of the formula I1a, a compound of the formula I3a and a compound of the formula I4a.

In a further preferred embodiment of the invention, the liquid-crystalline medium comprises precisely three compounds of the formula I, preferably a compound of the formula I1 and two compounds of the formula I3, in particular a compound of the formula I1a, a compound of the formula I3a and a compound of the formula I3b.

In a further preferred embodiment of the invention, the liquid-crystalline medium comprises precisely four compounds of the formula I, preferably a compound of the formula I1 and a compound of the formula I4 and two compounds of the formula I3, in particular a compound of the formula I1a, a compound of the formula I3a, a compound of the formula I3b and a compound of the formula I4a.

The compounds of the formula I are preferably employed in the liquid-crystalline medium in amounts from ≥1% by weight, preferably ≥5% by weight, to ≤60% by weight, preferably ≤40% by weight, based on the mixture as a whole. Particular preference is given to liquid-crystalline media which comprise 2-30% by weight, preferably 5-15% by weight, of one or more compounds of the formula I.

Preferred embodiments of the liquid-crystalline medium according to the invention are indicated below:
a) Liquid-crystalline medium which additionally comprises one or more compounds selected from the group of the compounds of the formulae IIA, IIB and IIC:

IIA

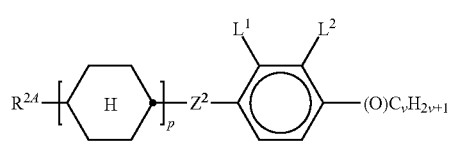

IIB

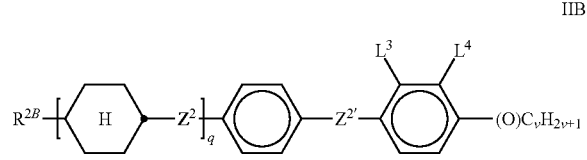

IIC

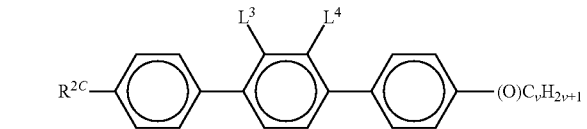

in which $R^{2A}$, $R^{2B}$ and $R^{2C}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

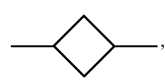

—C≡C—, —$CF_2$O—, —O$CF_2$—, —OC—O— or —O—CO— in such a way that O atoms are not linked directly to one another, $L^{1-4}$ each, independently of one another, denote F, Cl, CF$_3$ or CHF$_2$, $Z^2$ and $Z^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, or —CH=CHCH$_2$O—, (O) denotes —O— or a single bond, p denotes 1 or 2, q denotes 0 or 1, and v denotes 1 to 6, with the proviso that the compounds of the formulae IIA and IIB are not identical to the compounds of the formula I.

In the compounds of the formulae IIA and IIB, $Z^2$ and $Z^{2'}$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular CH$_3$, C$_2$H$_5$, n-C$_3$H$_7$, n-C$_4$H$_9$, and n-C$_5$H$_{11}$.

In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —C$_2$H$_4$— bridge.

If in the formula IIB $Z^2$=—C$_2$H$_4$—, $Z^{2'}$ is preferably a single bond or, if $Z^{2'}$=—C$_2$H$_4$—, $Z^2$ is preferably a single bond. In the compounds of the formulae IIA and IIB, (O)C$_v$H$_{2v+1}$ preferably denotes OC$_v$H$_{2v+1}$, furthermore C$_v$H$_{2v+1}$. In the compounds of the formula IIC, (O)C$_v$H$_{2v+1}$ preferably denotes C$_v$H$_{2v+1}$. In the compounds of the formula IIC, $L^3$ and $L^4$ preferably each denote F.

Preferred compounds of the formulae IIA, IIB and IIC are indicated below:

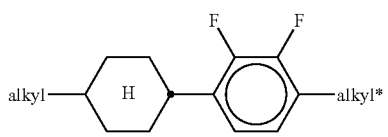

IIA-1

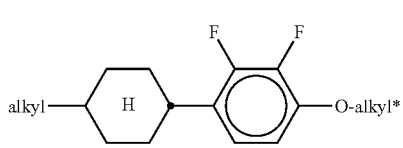

IIA-2

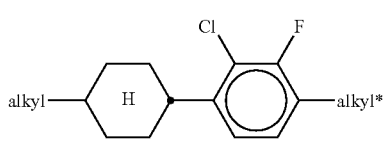

IIA-3

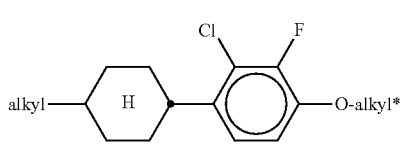

IIA-4

-continued

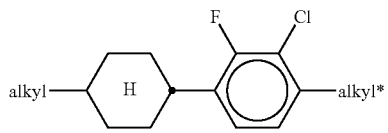

IIA-5

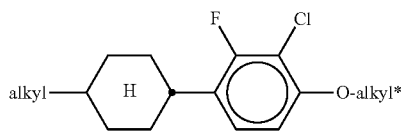

IIA-6

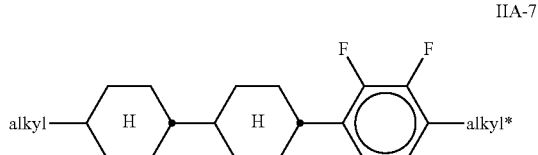

IIA-7

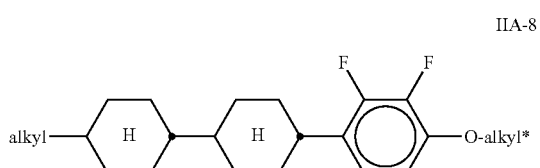

IIA-8

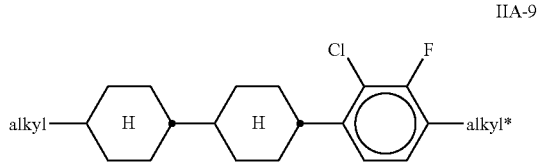

IIA-9

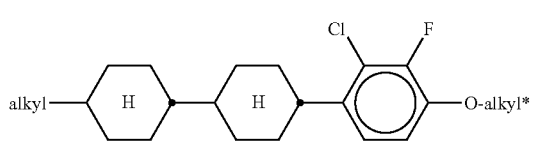

IIA-10

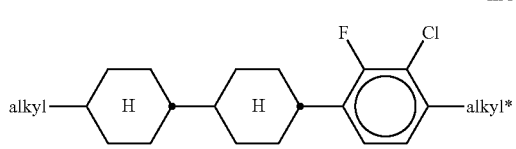

IIA-11

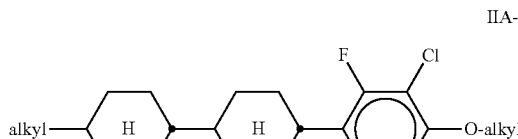

IIA-12

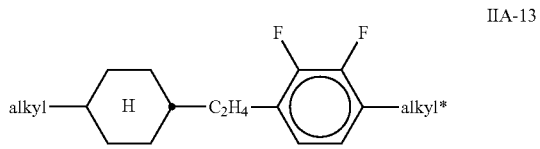

IIA-13

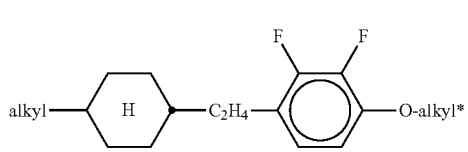

IIA-14

-continued
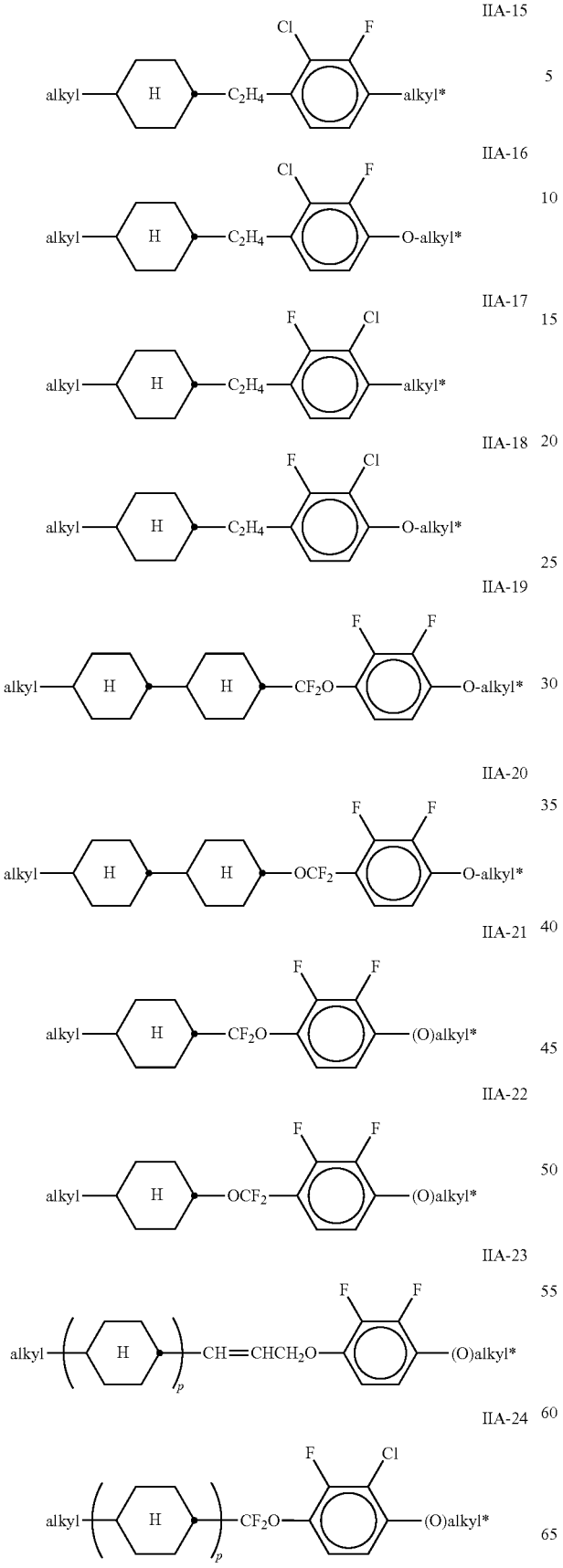
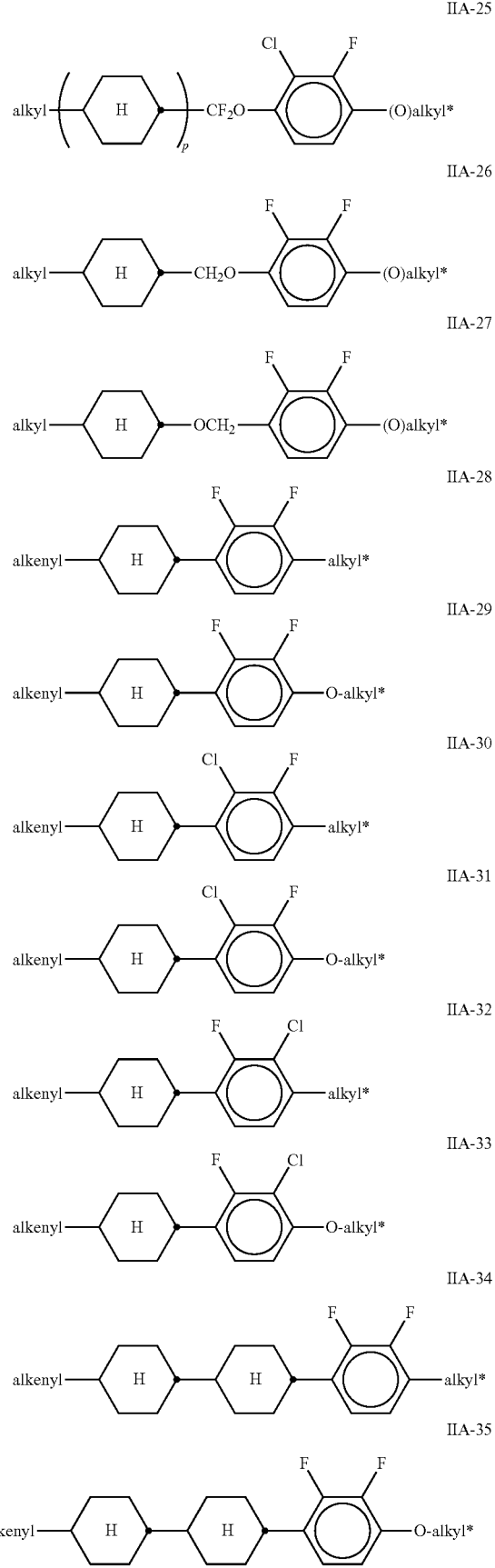

IIA-36 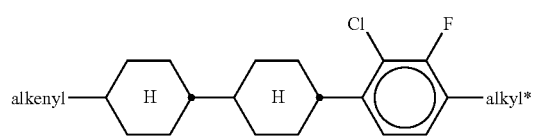
IIA-37 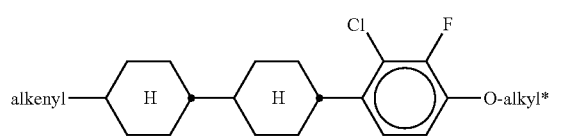
IIA-38 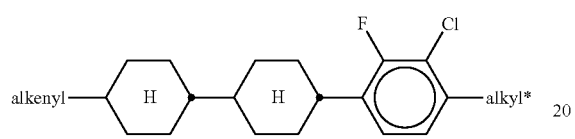
IIA-39 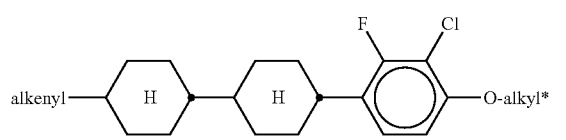
IIA-40 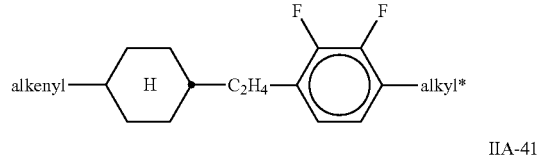
IIA-41 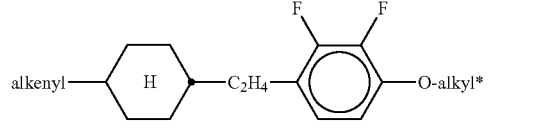
IIB-1 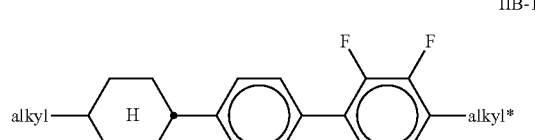
IIB-2 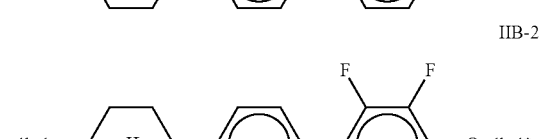
IIB-3 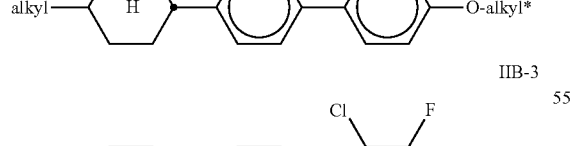
IIB-4 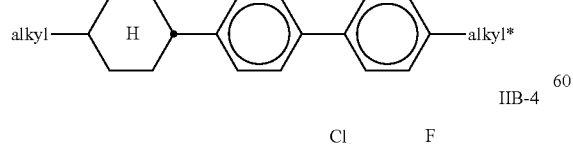
IIB-5 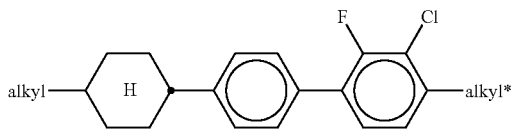
IIB-6 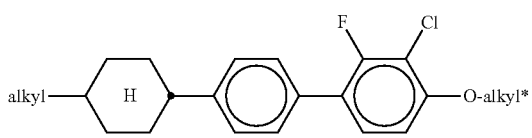
IIB-7 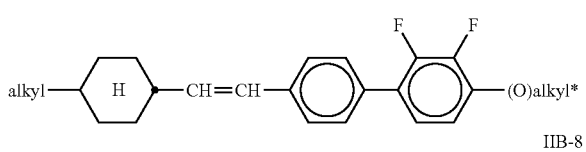
IIB-8 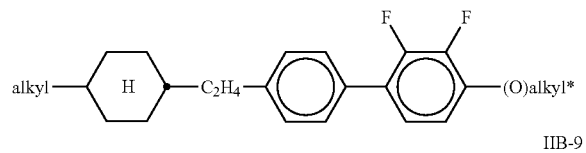
IIB-9 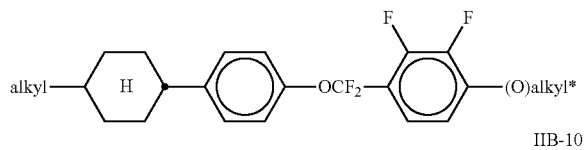
IIB-10 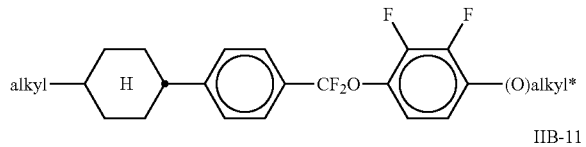
IIB-11 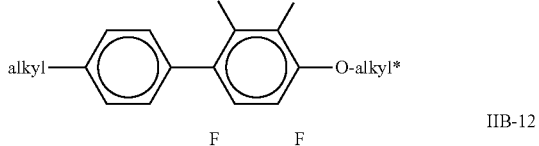
IIB-12 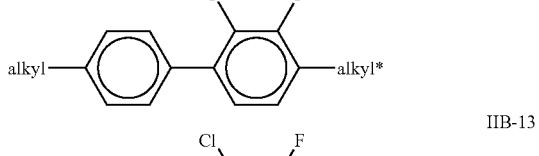
IIB-13 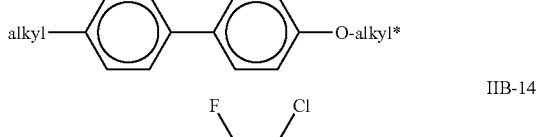
IIB-14 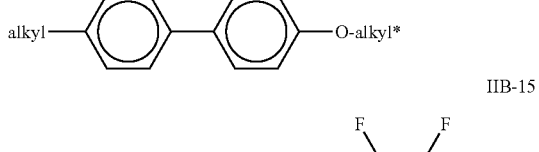
IIB-15 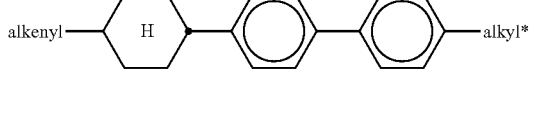

-continued

IIB-16

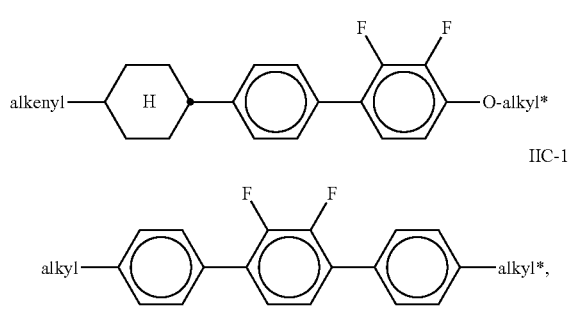

IIC-1 in which alkyl and alkyl* each, independently of one another, denote a straight-chain alkyl radical having 1-6 C atoms and alkenyl denotes a straight-chain alkenyl radical having 2-6 C atoms.

Particularly preferred mixtures according to the invention comprise one or more compounds of the formulae IIA-2, IIA-8, IIA-14, IIA-29, IIA-35, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

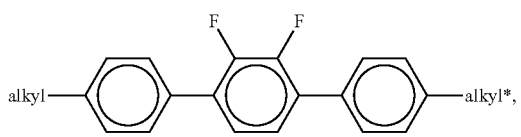

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

III

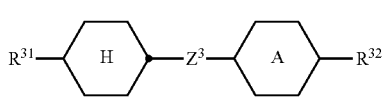

in which
$R^{31}$ and $R^{32}$ each, independently of one another, denote a straight-chain alkyl, alkoxyalkyl or alkoxy radical having up to 12 C atoms, and

denotes

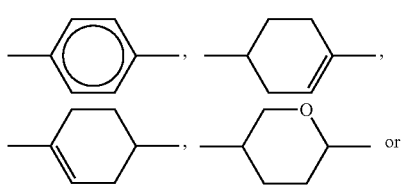

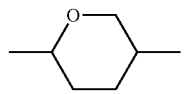

$Z^3$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$—, or —CF═CF—.

Preferred compounds of the formula III are indicated below:

IIIa

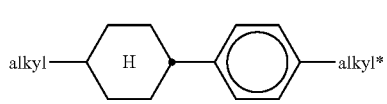

IIIb

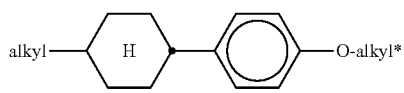

IIIc

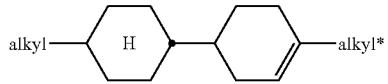

IIId

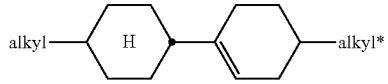

in which
alkyl and
alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium additionally comprising one or more alkenyl compounds of the formula A

A

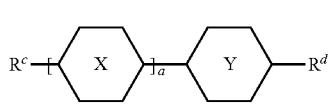

in which
X and Y each, independently of one another, denote a trans-1,4-cyclohexylene radical, or a 1,4-phenylene radical, which may also be substituted by one or two identical or different radicals L$^1$, one of the radicals R$^c$ and R$^d$ denotes an alkenyl radical having 2 to 12 C atoms, and the other of the radicals R$^c$ and R$^d$ denotes an alkyl radical having 1 to 12 C atoms, in which, in addition, one or two non-adjacent CH$_2$ groups may each be replaced by —O—, —CH═CH—, —CO—, —OCO— or —COO— in such a way that O atoms are not linked directly to one another, L$^1$ denotes F, Cl, CF$_3$, OCF$_3$ or CHF$_2$, preferably F or Cl,
a denotes 1 or 2.
R$^c$ is preferably straight-chain alkyl or alkoxy having 1 to 8 C atoms or straight-chain alkenyl having 2 to 7 C atoms.

The compounds of the formula A are preferably selected from the following sub-formulae:

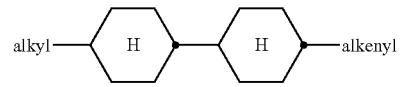
A1

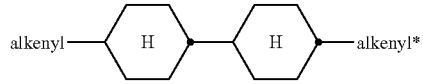
A2

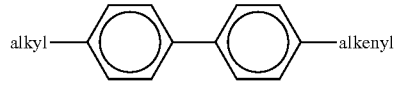
A3

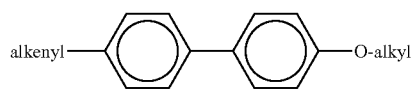
A4

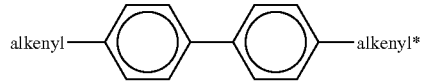
A5

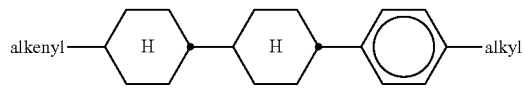
A6

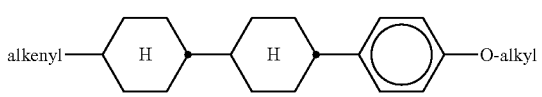
A7

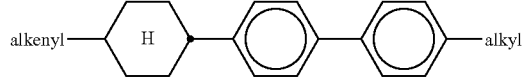
A8

A9 in which alkyl denotes a straight-chain alkyl radical having 1-6 C atoms and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula A are selected from the following sub-formulae:

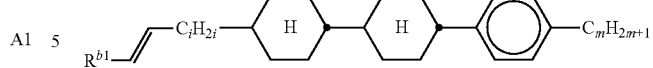
A1a

A3a

A6a in which m denotes 1, 2, 3, 4, 5 or 6, i denotes 0, 1, 2 or 3, and $R^{b1}$ denotes H, $CH_3$ or $C_2H_5$.

In a particularly preferred embodiment, the liquid-crystalline medium comprises one or more compounds selected from the following formulae:

A1a1

A1a2

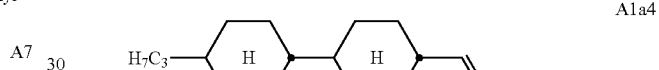
A1a3

A1a4

A1a5 preferably in total amounts of ≥15% by weight, in particular of ≥25% by weight. Particular preference is given to compounds of the formula A1a1.

The compound of the formula A1a1 is preferably employed in concentrations of 20-60% by weight, in particular 25-60% by weight, based on the LC mixture.

Preference is furthermore given to liquid-crystalline media which comprise the compounds of the formulae A1a1 and A1a4. The proportion of compounds of the formula A in the mixture as a whole is preferably at least 5% by weight, particularly preferably at least 10% by weight, very particularly preferably at least 20% by weight.

d) Liquid-crystalline medium which additionally comprises one or more tetracyclic compounds of the formulae

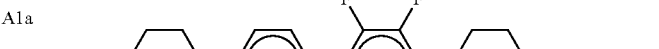
V-1

V-2

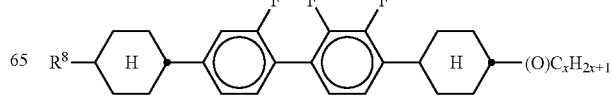

-continued

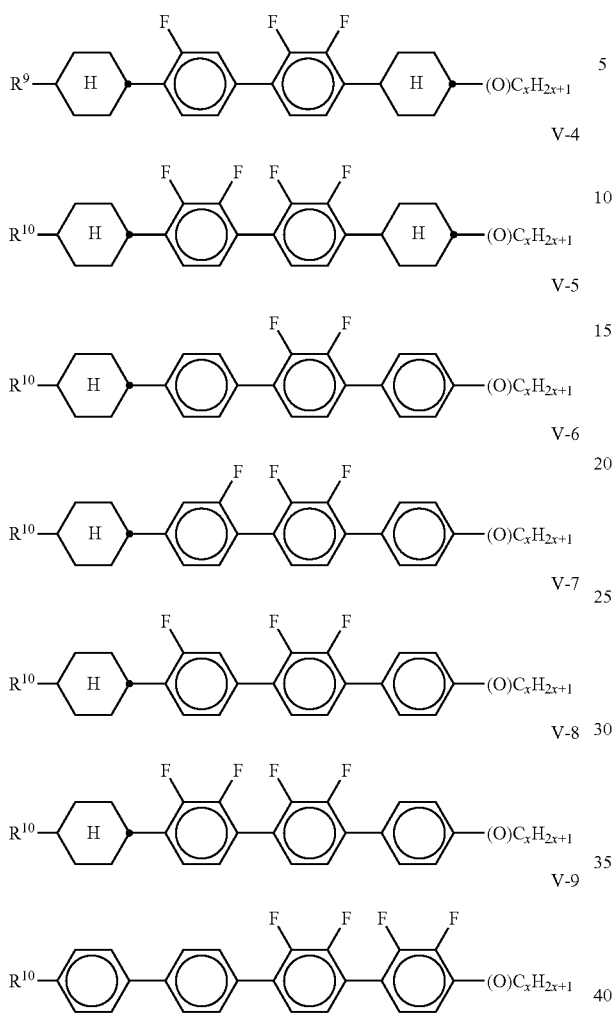

in which
R$^{7-10}$ each, independently of one another, have one of the meanings indicated for R$^{2A}$ in formula IIA,
(O) denotes —O— or a single bond, and
w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6,

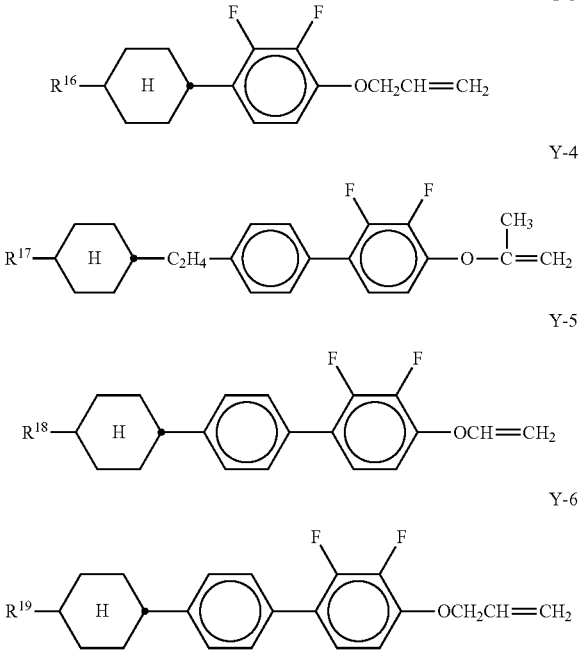

in which R$^{14}$-R$^{19}$ each, independently of one another, denotes an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of 5% by weight.

f) Liquid-crystalline medium additionally comprising one or more fluorinated terphenyls of the formulae T-1 to T-21,

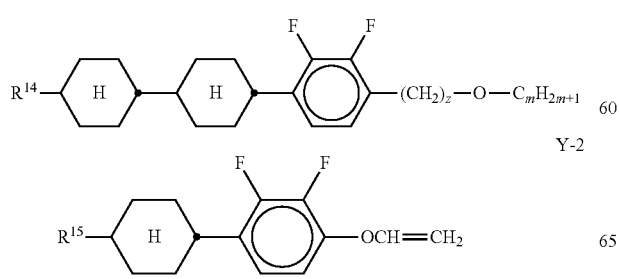

T-5
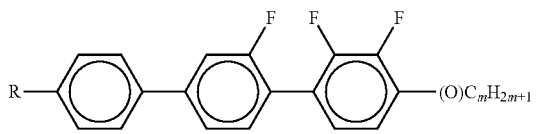

T-6
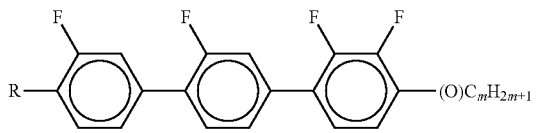

T-7
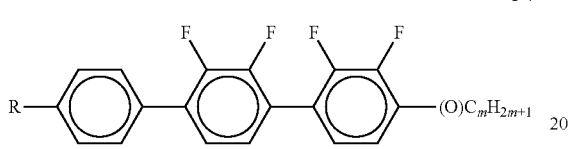

T-8
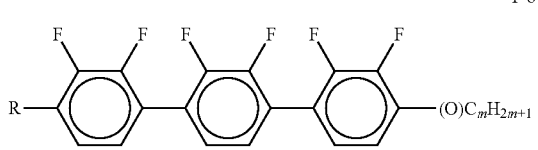

T-9
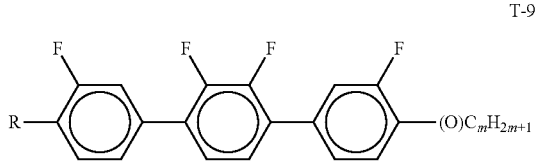

T-10
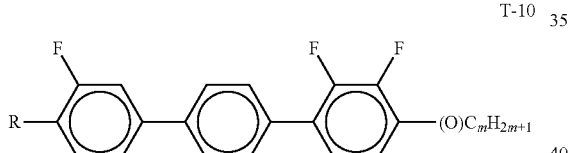

T-11
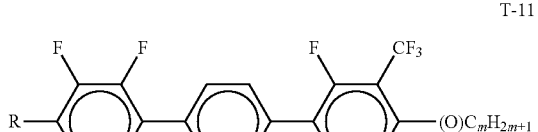

T-12
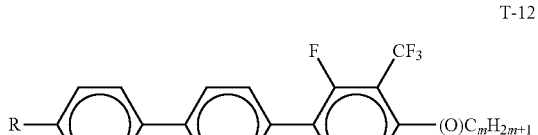

T-13
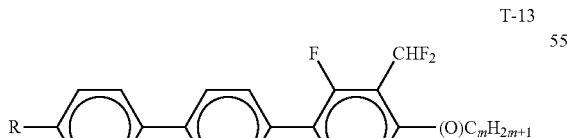

T-14
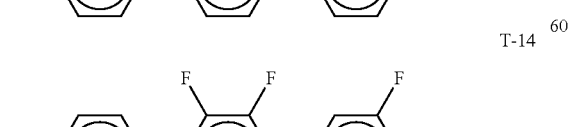

T-15
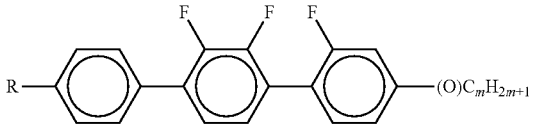

T-16
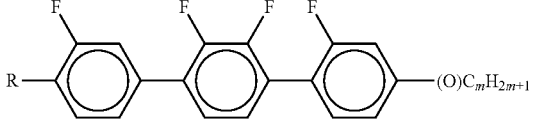

T-17
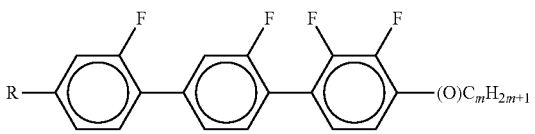

T-18
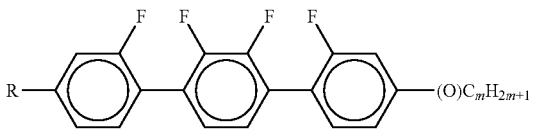

T-19
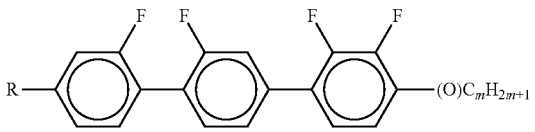

T-20
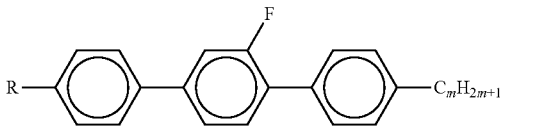

T-21
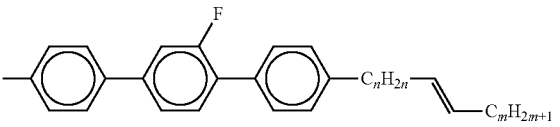

in which

R denotes a straight-chain alkyl or alkoxy radical having 1-7 C atoms, or alkenyl having 2-7 C atoms, (O) denotes —O— or a single bond, m=0, 1, 2, 3, 4, 5 or 6, and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-3,

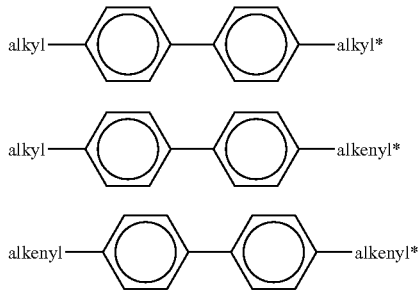

in which
alkyl and alkyl* each, independently of one another, denote a straight-chain alkyl radical having 1-6 C atoms, and
alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formulae B-1 and B-2 are particularly preferred.

Particularly preferred biphenyls are

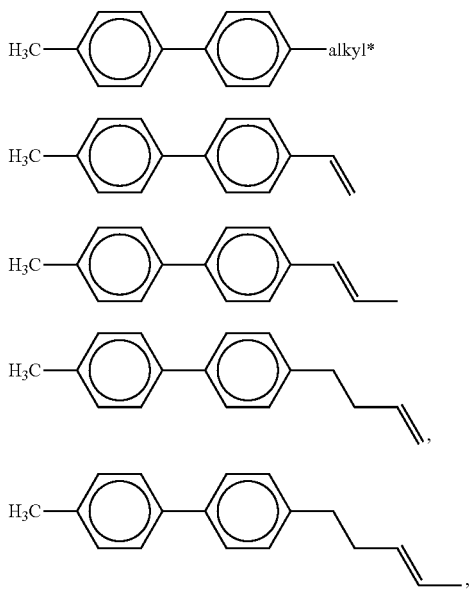

in which alkyl* denotes an alkyl radical having 1-6 C atoms. The medium according to the invention particularly preferably comprises one or more compounds of the formulae B-1a and/or B-2d.

h) Liquid-crystalline medium comprising at least one compound of the formulae Z-1 to Z-7,

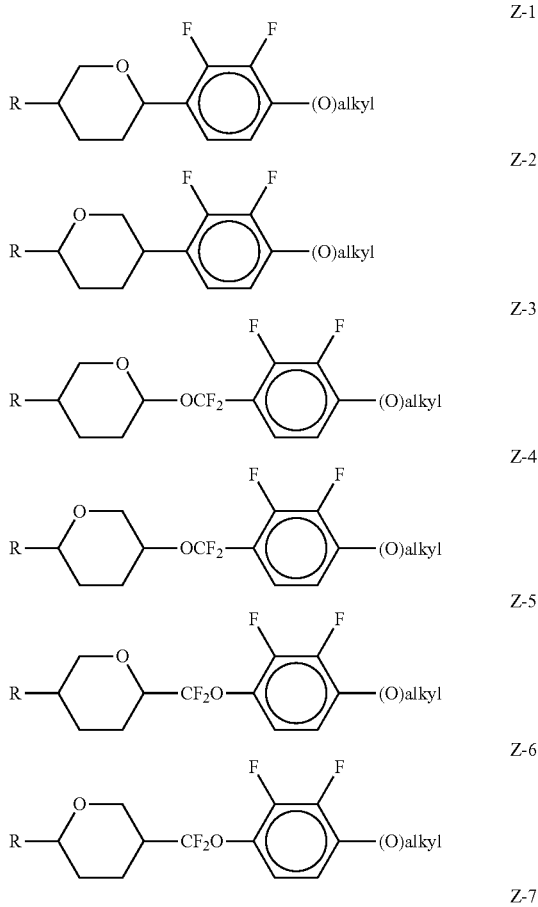

in which R denotes a straight-chain alkyl or alkoxy radical having 1-7 C atoms, (O) denotes —O— or a single bond, and alkyl denotes a straight-chain alkyl radical having 1-6 C atoms.

i) Liquid-crystalline medium comprising at least one compound of the formulae O-1 to O-17,

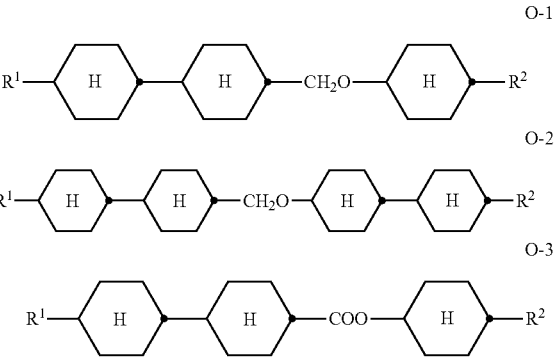

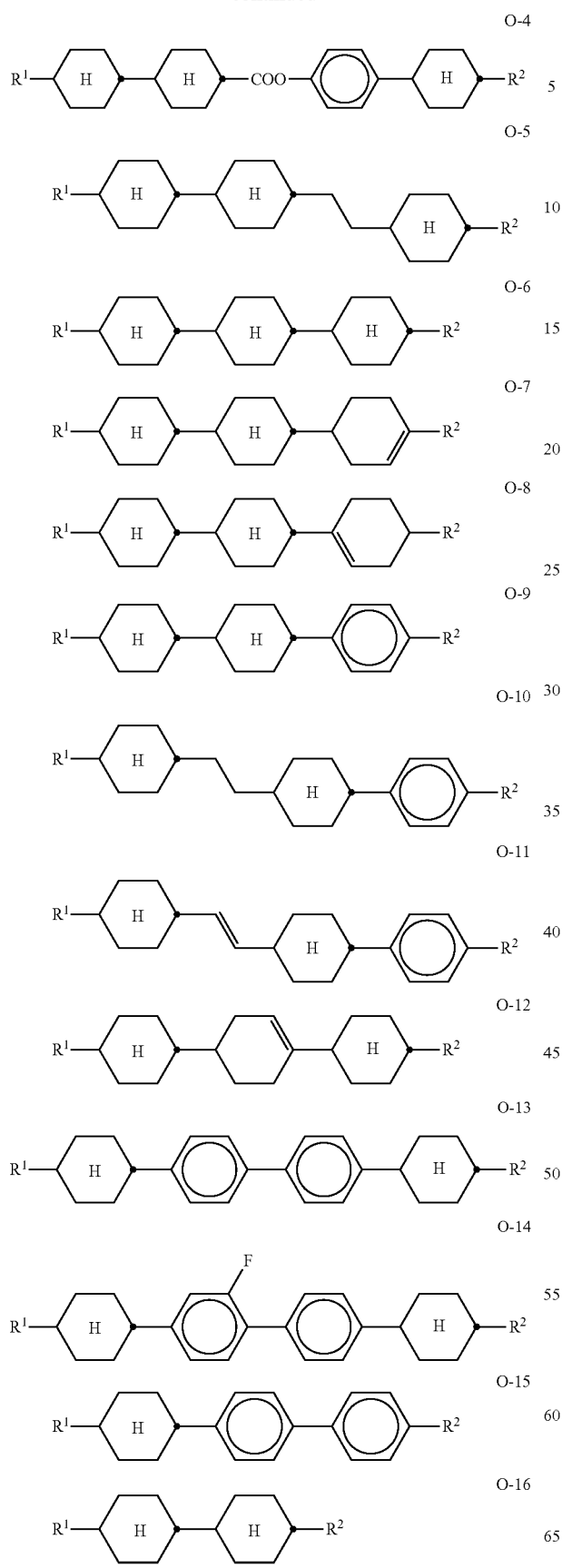

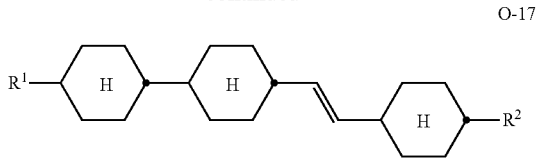

in which $R^1$ and $R^2$ have the meanings indicated for $R^{2A}$ in formula IIA. $R^1$ and $R^2$ preferably each, independently of one another, denote straight-chain alkyl.

Preferred media comprise one or more compounds of the formulae O-1, O-3, O-4, O-5, O-9, O-13, O-14, O-15, O-16 and/or O-17.

Mixtures according to the invention very particularly preferably comprise the compounds of the formula O-9, O-15, O-16 and/or O-17, in particular in amounts of 5-30%.

Preferred compounds of the formulae O-15 and O-16 are indicated below:

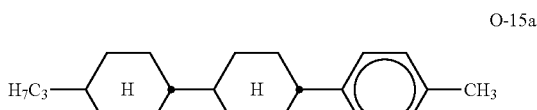

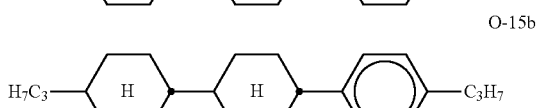

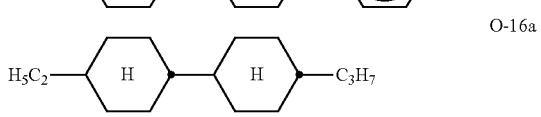

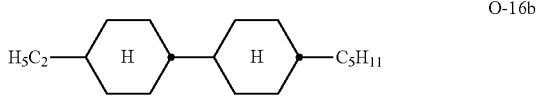

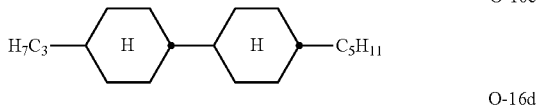

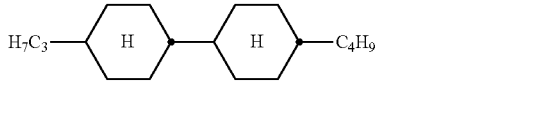

The medium according to the invention particularly preferably comprises the tricyclic compounds of the formula O-15a and/or of the formula O-15b in combination with one or more bicyclic compounds of the formulae O-16a to O-16d. The total proportion of the compounds of the formulae O-15a and/or O-15b in combination with one or more compounds selected from the bicyclic compounds of the formulae O-16a to O-16d is 5-40%, very particularly preferably 15-35%.

Very particularly preferred mixtures comprise compounds O-15a and O-16a:

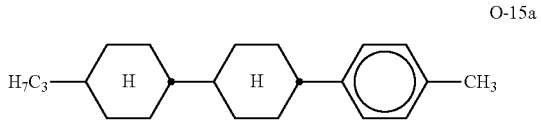

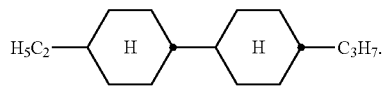

Compounds O-15a and O-16a are preferably present in the mixture in a concentration of 15-35%, particularly preferably 15-25% and especially preferably 18-22%, based on the mixture as a whole.

Very particularly preferred mixtures comprise the following three compounds:

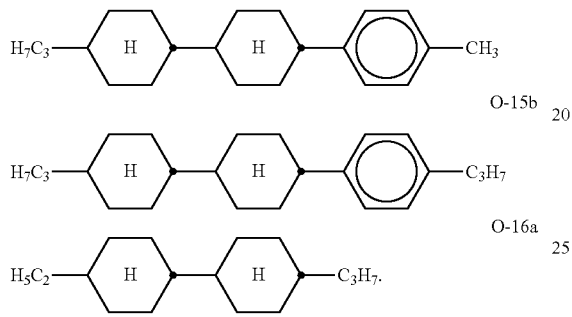

Compounds O-15a, O-15b and O-16a are preferably present in the mixture in a concentration of 15-35%, particularly preferably 15-25% and especially preferably 18-22%, based on the mixture as a whole.

j) Preferred liquid-crystalline media according to the invention comprise one or more substances which contain a tetrahydronaphthyl or naphthyl unit, such as, for example, the compounds of the formulae N-1 to N-5,

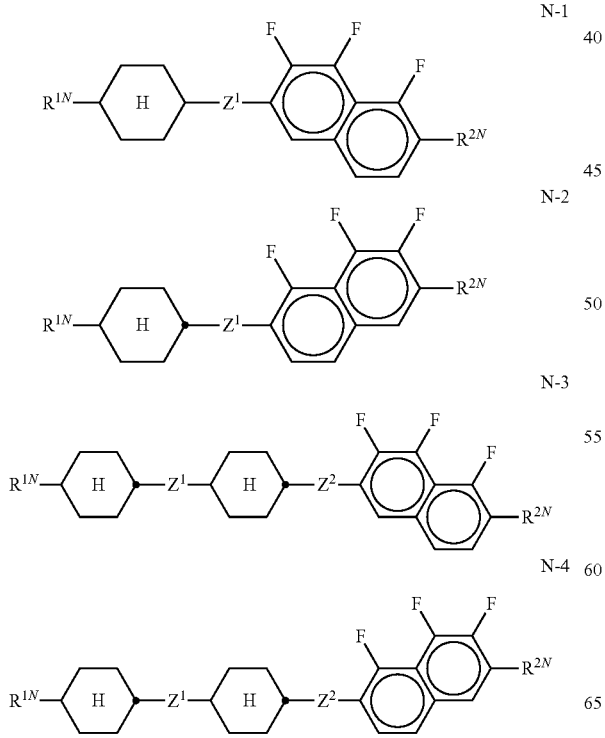

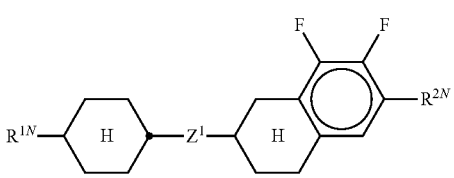

in which $R^{1N}$ and $R^{2N}$ each, independently of one another, have the meanings indicated for $R^{2A}$ in formula IIA, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

k) Preferred mixtures comprise one or more compounds selected from the group of the compounds of the formulae BC, CR, PH-1, PH-2, BF-1, BF-2, BS-1 and BS-2,

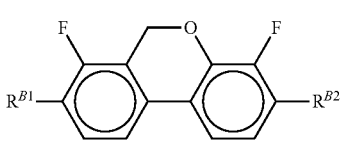

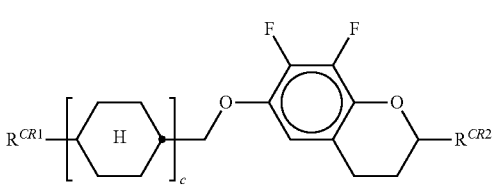

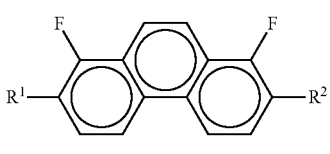

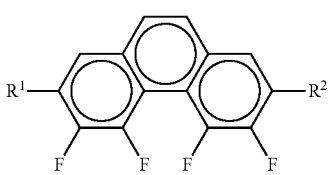

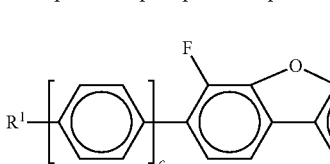

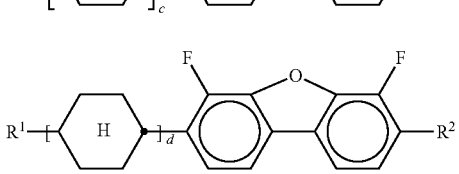

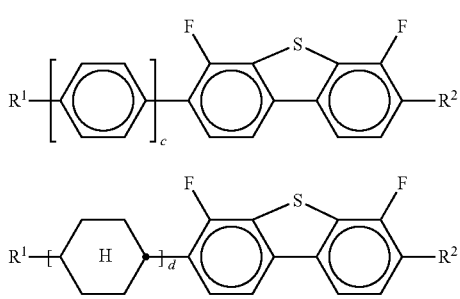

BS-1

BS-2 in which
$R^{B1}, R^{B2}, R^{CR1}, R^{CR2}, R^1, R^2$ each, n independently of one another, have the meaning of $R^{24}$ in formula IIA. c denotes 0, 1 or 2. d denotes 1 or 2.

The mixtures according to the invention preferably comprise the compounds of the formulae BC, CR, PH-1, PH-2, BF-1, BF-2, BS-1 and/or BS-2 in amounts of 3 to 20% by weight, in particular in amounts of 3 to 15% by weight.

Particularly preferred compounds of the formulae BC and CR are the compounds BC-1 to BC-7, CR-1 to CR-5, BF-1a to BF-1c and BS-1a to BS-1c,

BC-1

BC-2

BC-3

BC-4

BC-5

BC-6

BC-7

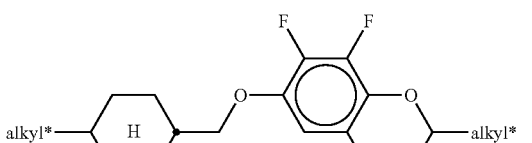

CR-1

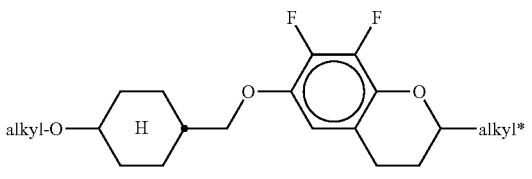

CR-2

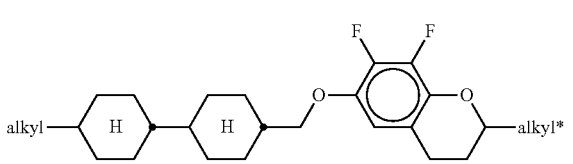

CR-3

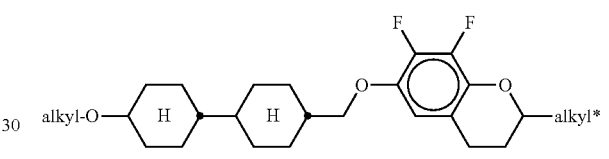

CR-4

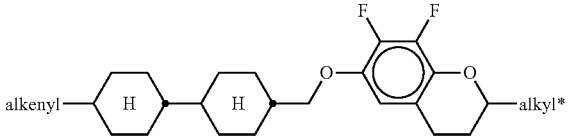

CR-5

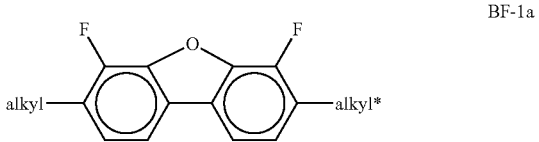

BF-1a

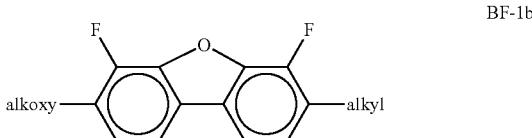

BF-1b

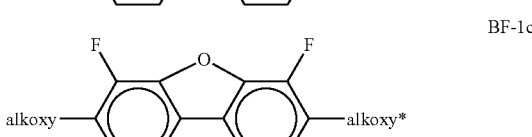

BF-1c

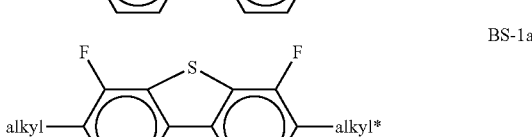

BS-1a

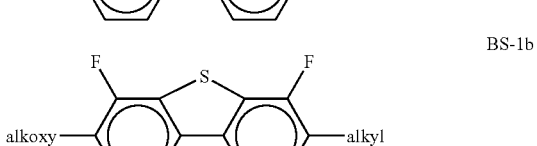

BS-1b

-continued

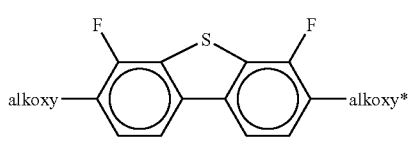
BS-1c in which
alkyl and alkyl* each, independently of one another, denote a straight-chain alkyl radical having 1-6 C atoms,
alkoxy and alkoxy* each, independently of one another, denote a straight-chain alkoxy radical having 1-6 C atoms, and
alkenyl and
alkenyl* each, independently of one another, denote a straight-chain alkenyl radical having 2-6 C atoms.
Very particular preference is given to mixtures comprising one, two or three compounds of the formula BC-2, BF-1 or BS-1, in particular BF-1c.

l) Preferred mixtures comprise one or more indane compounds of the formula In,

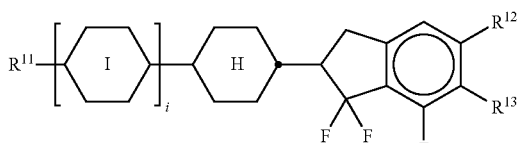
In in which
$R^{11}$, $R^{12}$,
$R^{13}$ each, independently of one another, denote a straight-chain alkyl, alkoxy, alkoxyalkyl or alkenyl radical having 1-6 C atoms,
$R^{12}$ and $R^{13}$ additionally denote halogen, preferably F,

denotes

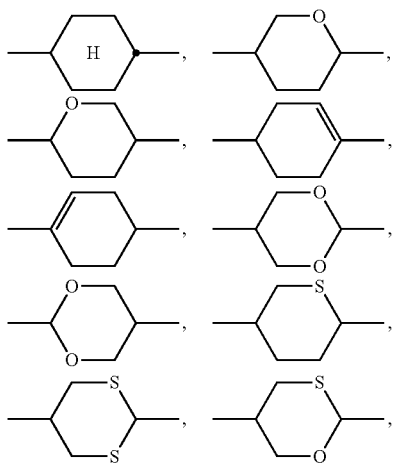

i denotes 0, 1 or 2.
Preferred compounds of the formula In are the compounds of the formulae In-1 to In-16 indicated below:

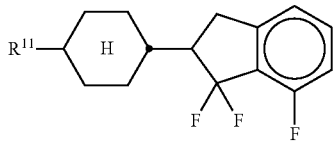
In-1

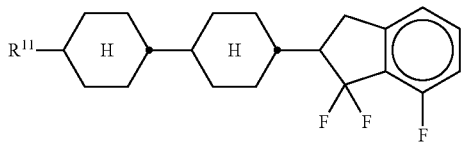
In-2

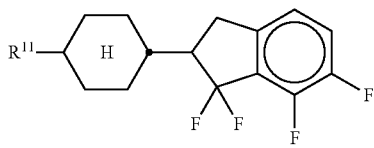
In-3

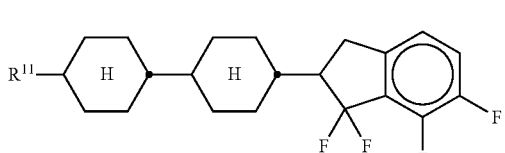
In-4

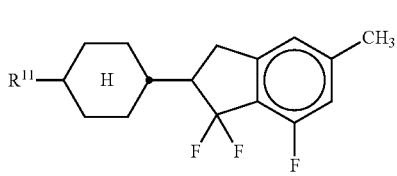
In-5

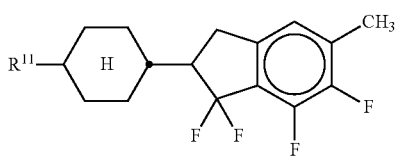
In-6

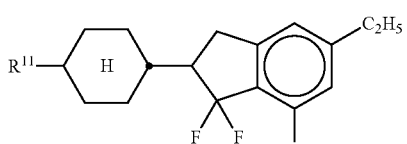
In-7

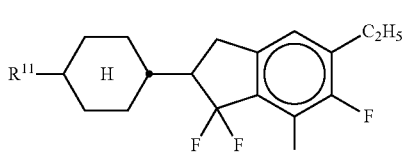
In-8

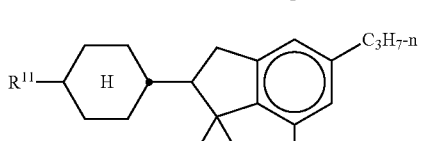
In-9

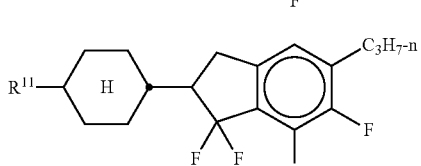
In-10

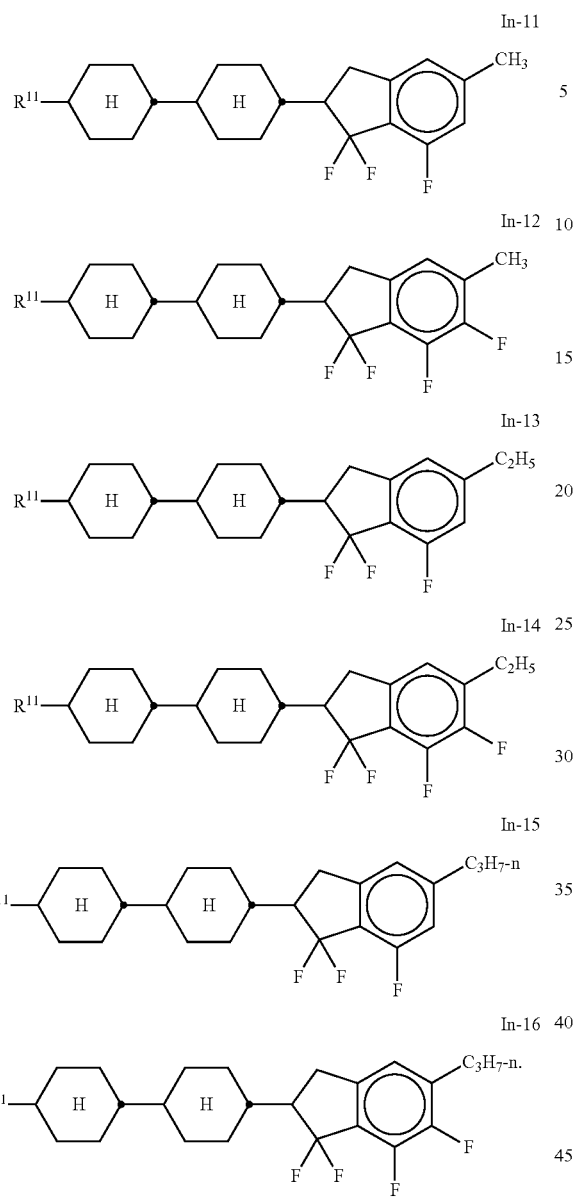

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally comprise one or more compounds of the formulae L-1 to L-11,

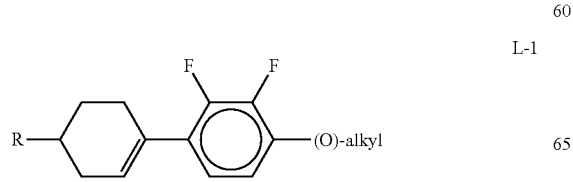

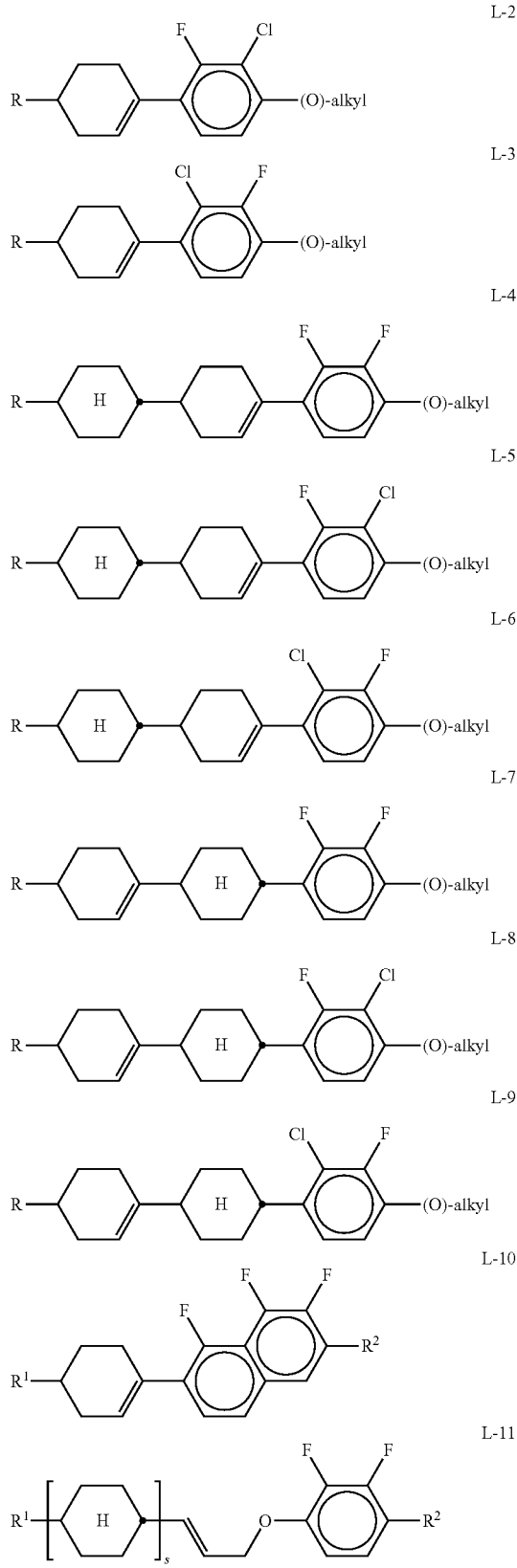

in which

R, $R^1$ and $R^2$ each, independently of one another, have the meanings indicated for $R^{2,4}$ in formula IIA, (O) denotes —O— or a single bond, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

n) The medium additionally comprises one or more compounds of the formula EY

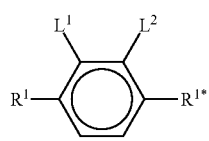

EY in which $R^1$ has the meanings indicated for $R^{2A}$ in formula IIA, $L^1$ and $L^2$ are each independently F or Cl, and $R^{1*}$ has one of the meanings indicated for $R^1$. In the compounds of the formula EY, $R^1$ and $R^{1*}$ preferably denote alkoxy having ≥2 C atoms, and $L^1=L^2=F$. Particular preference is given to the compounds of the formulae

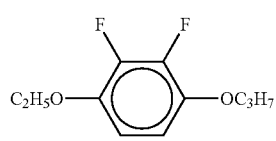

EY-1

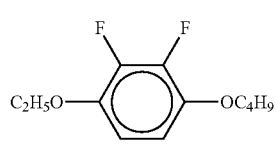

EY-2

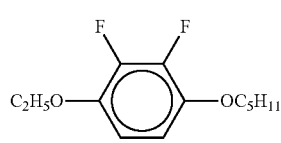

EY-3

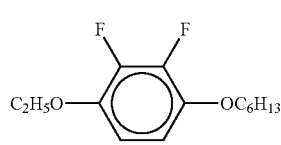

EY-4

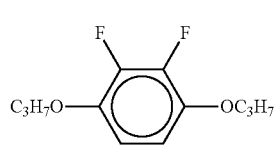

EY-5

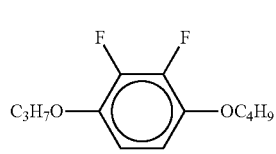

EY-6

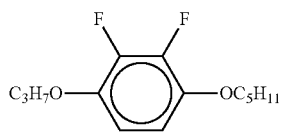

EY-7

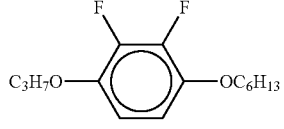

EY-8

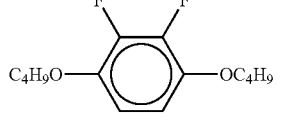

EY-9

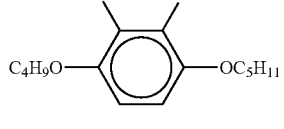

EY-10

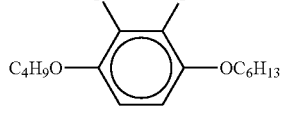

EY-11

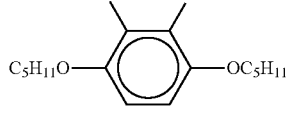

EY-12

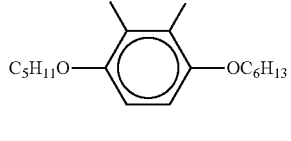

EY-13

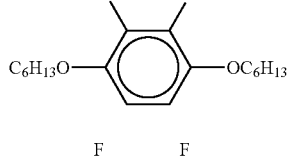

EY-14

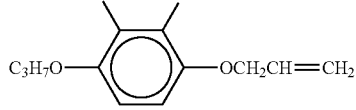

EY-15

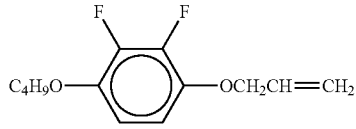

EY-16

EY-17

-continued

EY-18
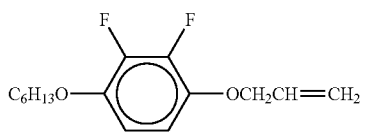

EY-19
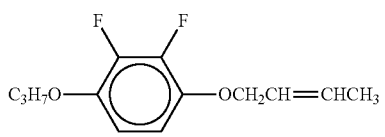

EY-20
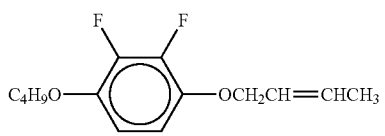

EY-21
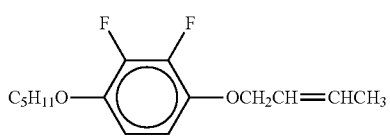

EY-22
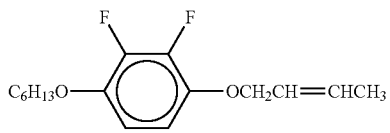

EY-23
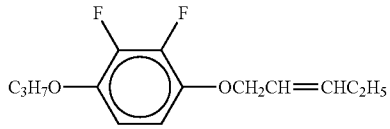

EY-24
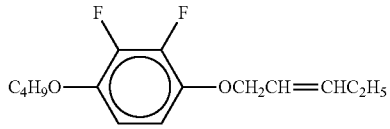

EY-25
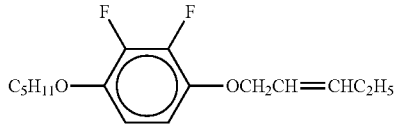

EY-26
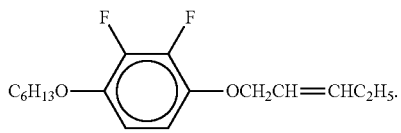

n) The medium additionally comprises one or more compounds selected from the following formulae:

Q-1
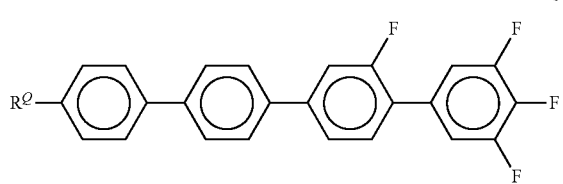

-continued

Q-2
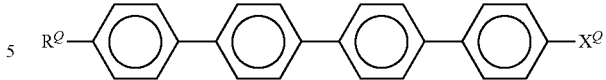

Q-3
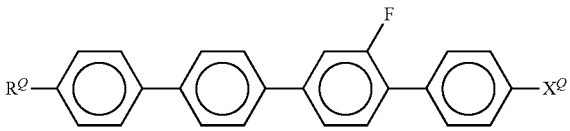

Q-4
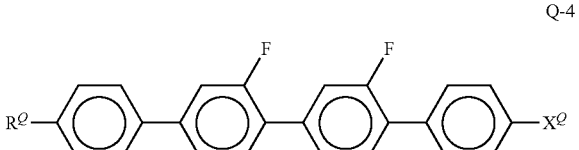

Q-5
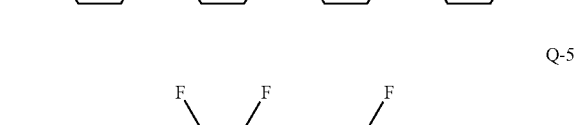

Q-6
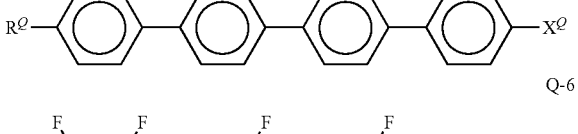

Q-7
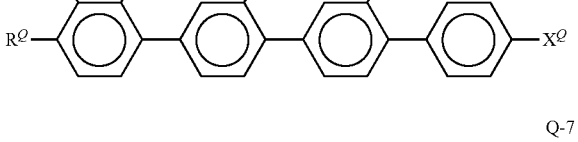

Q-8
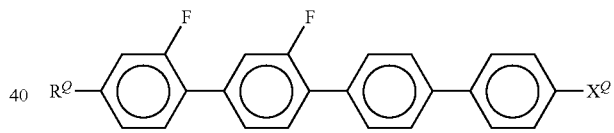

Q-9

In the compounds of the formulae Q-1 to Q-9, $R^Q$ and $X^Q$ each, independently of one another, have the meanings of $R^{24}$ in formula IIA. Preferably, $R^Q$ and $X^Q$ denote a straight-chain alkyl radical having 1-6 C atoms, in particular having 2-5 C atoms.

Particularly preferred mixture concepts are indicated below: (the acronyms used are explained in Table A. n and m here each, independently of one another, denote 1-6.)

The mixtures according to the invention preferably comprise the compound of the formula I in which $L^1=L^2=F$, CC-n-V(m), preferably CC-3-V, CC-4-V, CC-5-V and/or CC-3-V1, preferably in concentrations >15%, in particular 20-50%, based on the mixture as a whole, and/or ≥20% by weight of CC-3-V, preferably 30% by weight of CC-3-V, based on the mixture as a whole, and/or CCY-n-Om, preferably CCY-2-O2, CCY-3-O1, CCY-3-O2, CCY-3-O3, CCY-4-O2 and/or CCY-5-O2, preferably in concentrations >5%, in particular 10-30%, based on the mixture as a whole, and/or CPY-n-Om, in particular CPY-2-O2, CPY-3-O2 and/or CPY-5-O2, preferably in concentrations >5%, in particular 10-30%, based on the mixture as a whole, and/or PY-n-Om, preferably PY-3-O2, preferably in concentrations >5%, in particular 5-20%, based on the mixture as a whole, and/or PYP-n-m, preferably PYP-2-3, preferably in concentrations >3%, in particular 3-15%, based on the mixture as a whole.

The invention furthermore relates to an electro-optical display having active-matrix addressing based on the ECB, VA, PS-VA, PSA, PA-VA, IPS, PS-IPS, FFS or PS-FFS effect, characterized in that it contains, as dielectric, a liquid-crystalline medium according to the invention as described above.

The liquid-crystalline medium according to the invention preferably has a nematic phase from ≤–20° C. to ≥70° C., particularly preferably from ≤–30° C. to ≥80° C., very particularly preferably from ≤–40° C. to ≥90° C.

The expression "have a nematic phase" here means on the one hand that no smectic phase and no crystallization are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of –20° C. in a corresponding test cell is 1000 h or more, the medium is referred to as stable at this temperature. At temperatures of –30° C. and –40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2 \cdot$s$^{-1}$ at 20° C.

The values of the birefringence Δn in the liquid-crystal mixture are generally between 0.07 and 0.16, preferably between 0.08 and 0.12.

The liquid-crystal mixture according to the invention has a ΔE of –0.5 to –8.0, in particular –2.5 to –6.0, where ΔE denotes the dielectric anisotropy.

The rotational viscosity $\gamma_1$ at 20° C. is preferably ≤165 mPa·s, in particular ≤140 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a ΔE>1.5, the term "dielectrically neutral compounds" denotes those having –1.5 ≤ ΔE ≤ 1.5 and the term "dielectrically negative compounds" denotes those having ΔE<–1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative ΔE.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤–0.5. Besides one or more compounds of the formula I, it preferably comprises the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of ΔE≤–0.8 is (are) preferably selected. This value must be more negative, the smaller the proportion A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

Particularly preferred individual compounds in component B are extremely low-viscosity nematic liquid crystals having a flow viscosity of not greater than 18 mm$^2 \cdot$s$^{-1}$, preferably not greater than 12 mm$^2 \cdot$s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of ΔE≥1.5. These so-called positive compounds are generally present in a mixture of negative dielectric anisotropy in amounts of ≤20% by weight, based on the mixture as a whole.

A multiplicity of suitable materials is known to the person skilled in the art from the literature. Particular preference is given to compounds of the formula III.

In addition, these liquid-crystal phases may also comprise more than 18 components, preferably 18 to 25 components.

Besides one or more compounds of the formula I, the phases preferably comprise 4 to 15, in particular 5 to 12, and particularly preferably <10, compounds of the formulae IIA, IIB and/or IIC and optionally III.

Besides compounds of the formula I and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nemato-genic substances, in particular known substances, from the classes of the azoxybenzenes, benzylideneanilines, biphenyls, terphenyls, phenyl or cyclohexyl benzoates, phenyl or cyclohexyl cyclo hexanecarboxylates, phenylcyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterized by the formula IV

   IV in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline, G denotes —CH=CH—
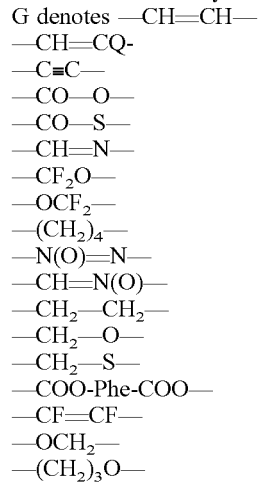

or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerizable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture. These mixtures may optionally also comprise an initiator, as described, for example, in U.S. Pat. No. 6,781,665. The initiator, for example Irganox-1076 from Ciba, is preferably added to the mixture comprising polymerizable compounds in amounts of 0-1%. Mixtures of this type can be used for so-called polymer-stabilized VA modes (PS-VA) or PSA (polymer sustained VA), in which polymerization of the reactive mesogens is intended to take place in the liquid-crystalline mixture. The prerequisite for this is that the liquid-crystal mixture does not itself comprise any polymerizable components which likewise polymerize under the conditions where the RMs polymerize.

The polymerization is preferably carried out under the following conditions:

The polymerizable reactive mesogen(s) (RM) is (are) polymerized in a cell using a UV-A lamp of defined intensity for a defined period and applied voltage (typically 10 V to 30 V alternating voltage, frequencies in the range from 60 Hz to 1 kHz). The UV-A light source employed is typically a metal halide vapor lamp or a high-pressure mercury lamp having an intensity of 50 mW/cm².

These are conditions where, for example, liquid-crystalline compounds having an alkenyl- or alkenyloxy side chain, such as, for example, the compound of the formula

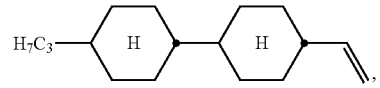

do not polymerize.

In a preferred embodiment of the invention, the polymerizable compounds are selected from the compounds of the formula M,

   M in which the individual radicals have the following meanings:

$R^a$ and $R^b$ each, independently of one another, denote P, P-Sp-, H, halogen, $SF_{85}$, $NO_2$, a carbon group or hydrocarbon group, where at least one of the radicals $R^a$ and $R^b$ denotes or contains a group P or P-Sp-, P on each occurrence, identically or differently, denotes a polymerizable group, Sp on each occurrence, identically or differently, denotes a spacer group or a single bond, $A^1$ and $A^2$ each, independently of one another, denote an aromatic, heteroaromatic, alicyclic or heterocyclic group, preferably having 4 to 25 ring atoms, which may also contain fused rings, and which may also be mono- or polysubstituted by L, L denotes P-Sp-, H, OH, $CH_2OH$, halogen, $SF_5$, $NO_2$, a carbon group or a hydrocarbon group, $Z^1$ on each occurrence, identically or differently, denotes —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, CR$^0$R$^{00}$ or a single bond, R$^0$ and R$^{00}$ each, independently of one another, denote H or alkyl having 1 to 12 C atoms, m denotes 0, 1, 2, 3 or 4, n1 denotes 1, 2, 3 or 4.

Particularly preferred compounds of the formula M are those in which

R$^a$ and R$^b$ each, independently of one another, denote P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by) —C(R$^0$) ═C(R$^{00}$)—, —C≡C—, —N(R$^{00}$)—, —O—, —S—, —CO—, —CO—O—, —OCO—, or —O—CO—O— in such a way that O and/or S atoms are not linked directly to one another, and in which, in addition, one or more H atoms may each be replaced by F, Cl, Br, I, CN, P or P-Sp-, where at least one of the radicals R$^a$ and R$^b$ denotes or contains a group P or P-Sp-, A$^1$ and A$^2$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, 2-oxo-2H-chromene-3,6-diyl, 2-oxo-2H-chromene-3,7-diyl, 4-oxo-4H-chromene-2,6-diyl, 4-oxo-4H-chromene-3,6-diyl, 4-oxo-4H-chromene-3,7-diyl (trivial name coumarine or flavone respectively), where, in addition, one or more CH groups in these groups may each be replaced by N, cyclohexane-1,4-diyl, in which, in addition, one or more non-adjacent CH$_2$ groups may each be replaced by O or S, 1,4-cyclohexenylene, bicyclo-[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(═O)N(R$^x$)$_2$, —C(═O)Y$^1$, —C(═O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F, Cl, P or P-Sp-, P denotes a polymerizable group, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that 0 and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms.

Further preferred compounds of the formula M are those selected from one or more of the following sub-groups:

m is 2 or 3, m is 2,

R$^a$ and R$^b$ denote identical or different groups P-Sp-,

R$^a$ and R$^b$ denote identical or different groups P-Sp- in which one or more groups Sp denote a single bond, m is 2 or 3, and R$^a$ and R$^b$ denote identical groups P-Sp-, one of the radicals R$^a$ and R$^b$ denotes P-Sp- and the other denotes an unpolymerizable group, preferably straight-chain or branched alkyl having 1 to 25 C atoms, in which, in addition, one or more non-adjacent CH$_2$ groups may each be replaced, independently of one another, by —C(R$^0$)═C(R$^{00}$)—, —C≡C—, —N(R$^0$)—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, one or more groups Sp denote a single bond, one or more groups Sp denote —(CH$_2$)$_{p1}$—, —(CH$_2$)$_{p1}$—O—, —(CH$_2$)$_{p1}$—OCO— or —(CH$_2$)$_{p1}$—OCOO—, in which p1 denotes an integer from 1 to 12, and r1 denotes an integer from 1 to 8, L does not denote and/or contain a polymerizable group, A$^1$ and A$^2$ denote, independently of one another, 1,4-phenylene or naphthalene-2,6-diyl, in which, in addition, one or more CH groups in these groups may each be replaced by N and which may, in addition, be mono- or polyfluorinated, Z' is selected from the group consisting of —O—, —CO—O—, —OCO—, —OCH$_2$—, —CH$_2$O—, —CF$_2$O—, —OCF$_2$—, —CH$_2$CH$_2$—, —CH═CH—, —CF═CF—, —CH═CF—, —CF═CH—, —C≡C— and a single bond, L is an unpolymerizable group, preferably selected from the group consisting of F, Cl, —CN, straight-chain and branched alkyl having 1 to 25 C atoms, in which, in addition, one or more non-adjacent CH$_2$ groups may each be replaced, independently of one another, by —C(R$^0$)═C(R$^{00}$)—, —C≡C—, —N(R$^0$)—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN.

Particularly preferred compounds of the formula M are selected from the following sub-formulae:

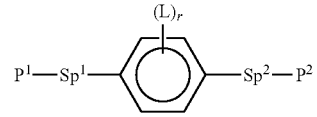

M1

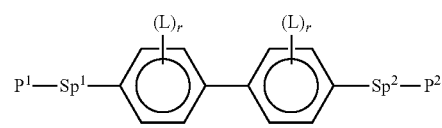

M2

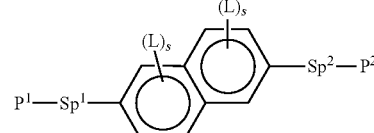

M3

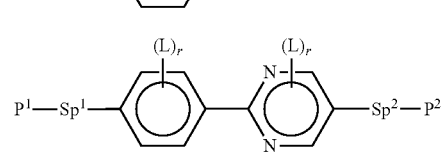

M4

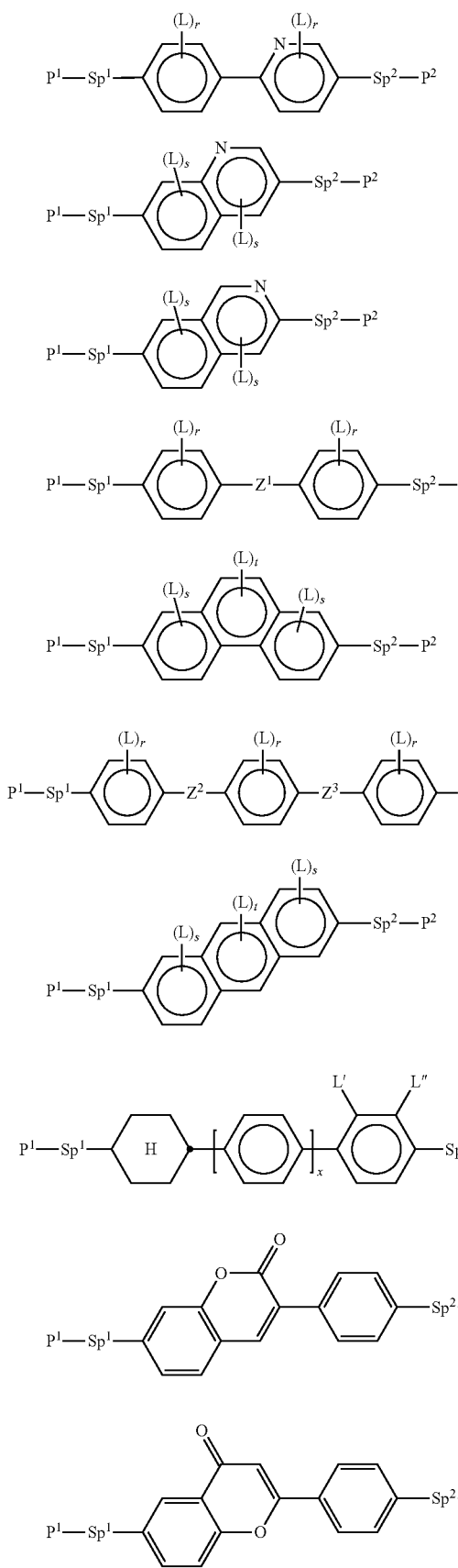
in which
P[1] and P[2] have one of the meanings indicated for P and preferably denote acrylate, methacrylate, fluoroacrylate, oxetane, vinyloxy or epoxy,
Sp[1] and Sp[2] each, independently of one another, have one of the meanings indicated for Sp or denote a single bond, where one or more of the radicals P[1]-Sp[1]- and P²-Sp² may also denote R^{aa}, where at least one of the radicals P¹-Sp¹- and P²-Sp² is different from R^{aa}, R^{aa} denotes F, Cl, —CN, straight-chain or branched alkyl having 1 to 25 C atoms, in which, in addition, one or more non-adjacent CH₂ groups may each be replaced, independently of one another, by —C(R⁰)=C(R⁰⁰)—, —C≡C—, —N(R⁰)—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, R⁰, R⁰⁰ have the meanings indicated in formula M, Z¹ denotes —O—, —CO—, —C(R^yR^z)— or —CF₂CF₂—, Z² and Z³ each, independently of one another, denote —CO—O—, —O—CO—, —CH₂O—, —OCH₂—, —CF₂O—, —OCF₂— or —(CH₂)_n—, in which n is 2, 3 or 4, L has the meaning indicated above for formula I, L' and L'' each, independently of one another, denote H, F or Cl, r denotes 0, 1, 2, 3 or 4, s denotes 0, 1, 2 or 3, t denotes 0, 1 or 2, x denotes 0 or 1, and R^y and R^z each, independently of one another, denote H, CH₃ or CF₃.

Further preferred compounds of the formula M are selected from the following sub-formulae:

M22

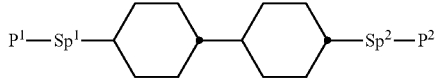

M23

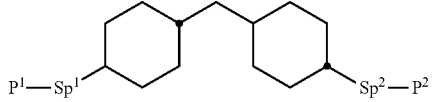

M24

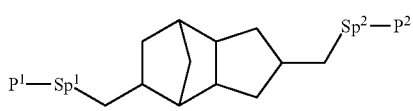

M25

M26

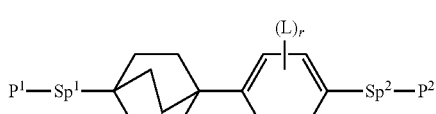

M27

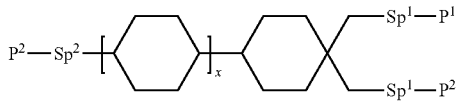

M28

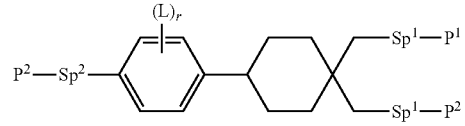

M29

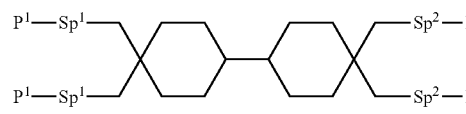

M30

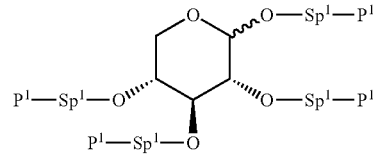

M31

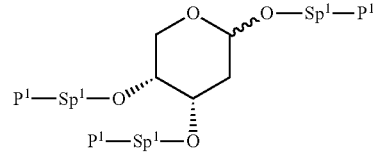

M32

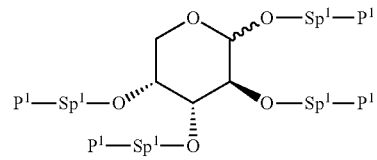

M33

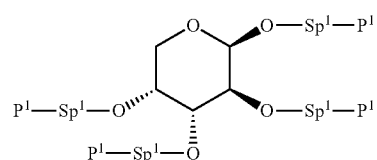

M34

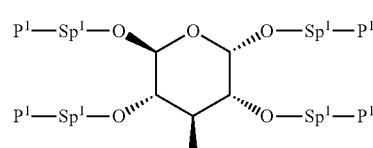

M35 in which the individual radicals have the meanings indicated for formulae M1-M21.

In a further preferred embodiment of the invention, the polymerizable compounds are chiral or optically active compounds selected from formula II* (chiral RMs):

$$(R^*\text{-}(A^1\text{-}Z^1)_m)_k\text{-}Q \quad \text{II*}$$

in which A¹, Z¹ and m have on each occurrence, identically or differently, one of the meanings indicated in formula M, R* has on each occurrence, identically or differently, one of the meanings indicated for R^a in formula M, where R* can be chiral or achiral, Q denotes a k-valent chiral group, which is optionally mono- or polysubstituted by L, as defined in formula M, k is 1, 2, 3, 4, 5 or 6, where the compounds contain at least one radical R* or L which denotes or contains a group P or P-Sp- as defined above.

Particularly preferred compounds of the formula II* contain a monovalent group Q of the formula III*

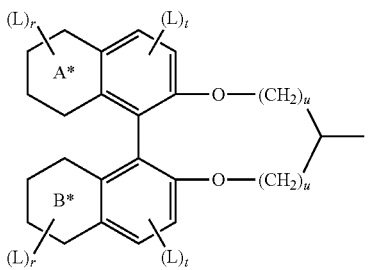

III* in which L has on each occurrence, identically or differently, the meaning of L indicated in formula M, and r has on each occurrence, identically or differently, the meanings indicated above, A* and B* each, independently of one another, denote fused benzene, cyclohexane or cyclohexene, t on each occurrence, identically or differently, denotes 0, 1 or 2, and u on each occurrence, identically or differently, denotes 0, 1 or 2.

Particular preference is given to groups of the formula III* in which u denotes 1.

Further preferred compounds of the formula II* contain a monovalent group Q or one or more groups R* of the formula IV*

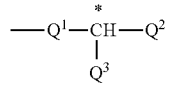

IV* in which $Q^1$ denotes alkylene or alkyleneoxy having up to 9 C atoms or a single bond, $Q^2$ denotes optionally fluorinated alkyl or alkoxy having 1 to 10 C atoms, in which, in addition, one or two non-adjacent $CH_2$ groups may each be replaced by —O—, —S—, —CH=CH—, —CO—, —OCO—, —COO—, —O—COO—, —S—CO—, —CO—S— or —C≡C— in such a way that O and/or S atoms are not linked directly to one another, $Q^3$ denotes F, Cl, CN or alkyl or alkoxy as defined for $Q^2$, but different from $Q^2$.

Preferred groups of the formula IV* are, for example, 2-butyl (=1-methyl-propyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyl-oxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxa-pentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluoro-decyloxy, 1,1,1-trifluoro-2-octyloxy, 1,1,1-trifluoro-2-octyl, 2-fluoromethyl-octyloxy.

Further preferred compounds of the formula II* contain a divalent group Q of the formula V*

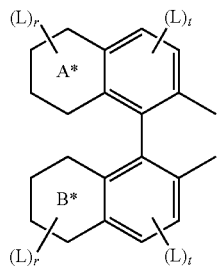

V* in which L, r, t, A* and B* have the meanings indicated above for formula III*.

Further preferred compounds of the formula II* contain a divalent group Q selected from the following formulae:

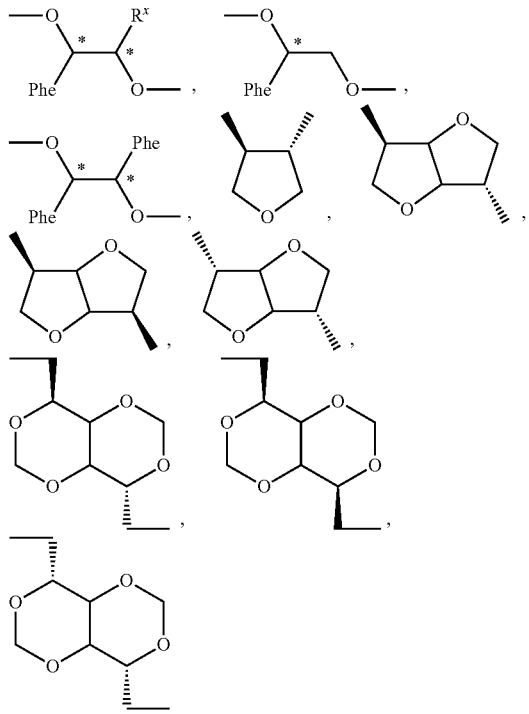

in which Phe denotes phenyl, which is optionally mono- or polysubstituted by L, and $R^x$ denotes F or optionally fluorinated alkyl having 1 to 4 C atoms.

Suitable chiral RMs are described, for example, in GB 2 314 839 A, U.S. Pat. No. 6,511,719, 7,223,450, WO 02/34739 A1, U.S. Pat. No. 7,041,345, U.S. Pat. No. 7,060,331 or U.S. Pat. No. 7,318,950. Suitable RMs containing binaphthyl groups are described, for example, in U.S. Pat. Nos. 6,818,261, 6,916,940, 7,318,950 and 7,223,450.

The chiral structural elements shown above and below and polymerizable and polymerized compounds containing such chiral structural elements can be employed in optically active form, i.e. as pure enantiomers or as any desired mixture of the two enantiomers, or alternatively as a racemate. The use of racemates is preferred. The use of racemates has some advantages over the use of pure enantiomers, such as, for example, significantly lower synthesis complexity and lower material costs.
The compounds of the formula II* are preferably present in the LC medium in the form of the racemate.
Particularly preferred compounds of the formula II* are selected from the following sub-formulae:
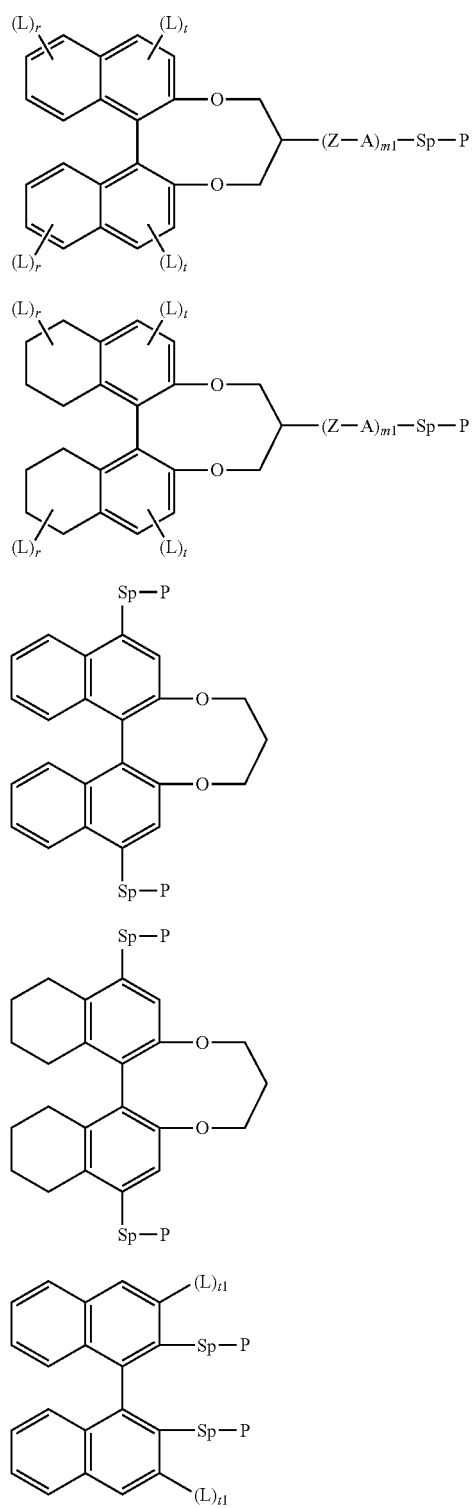
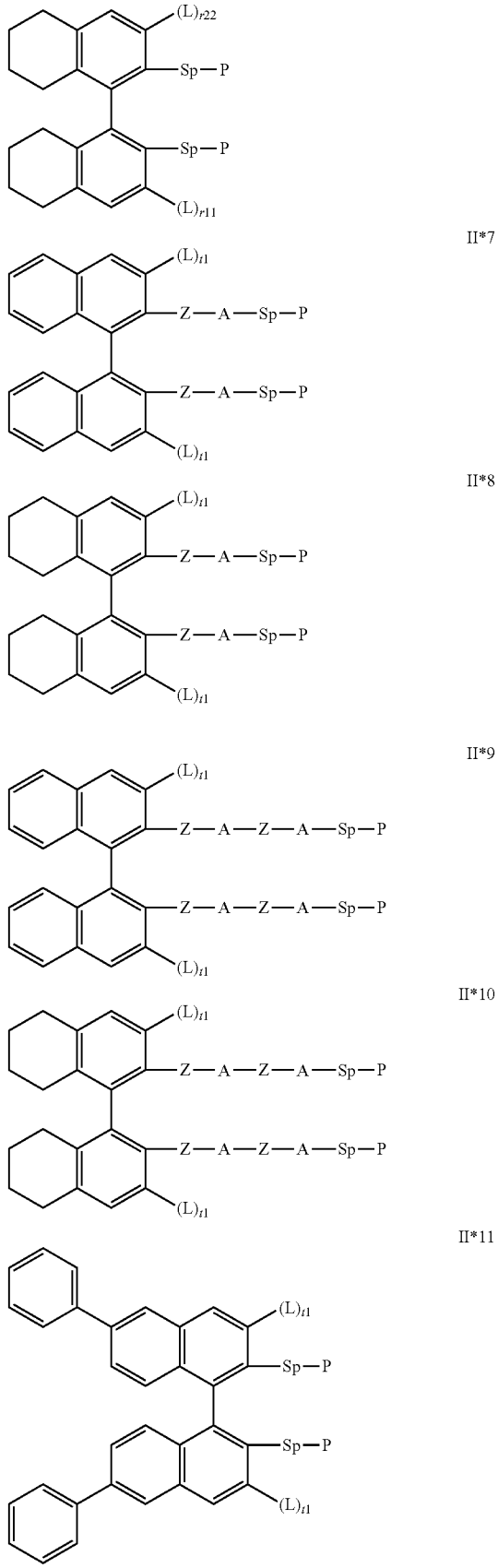

in which L, P, Sp, and m have the meanings indicated above in formula M, r and t have the meanings indicated above in formula III*, Z and A have on each occurrence, identically or differently, one of the meanings indicated for $Z^1$ and $A^1$ respectively, and r11, r22, and t1 on each occurrence, identically or differently, denotes 0 or 1.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having up to 40, preferably up to 25, particularly preferably up to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyl-oxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, or —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may each be replaced by —O—, —S—, —CO—, —CO—O—, —O—CO—, or —O—CO—O— in such a way that O and/or S atoms are not linked directly to one another, and in which one or more H atoms may each be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may each be replaced by N, S or O in such a way that O atoms and/or S atoms are not linked directly to one another.

Preferred aryl groups are, for example, phenyl, biphenyl, terphenyl, 1,1':3',1''-terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalin-imidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phen-oxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, iso-benzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may each be replaced by Si and/or one or more CH groups may each be replaced by N and/or one or more non-adjacent CH$_2$ groups may each be replaced by —O— or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" above and below, are, for example, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, in which R$^x$ has the meaning indicated above, and Y$^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R$^0$, —OR$^0$, —CO—R$^0$, —CO—O—R$^0$, —O—CO—R$^0$ or —O—CO—O—R$^0$, in which R$^0$ has the meaning indicated above.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

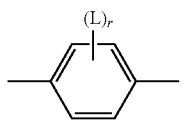

is preferably

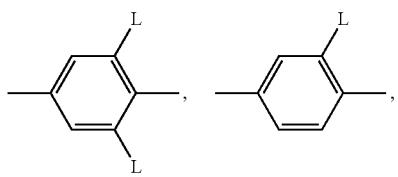

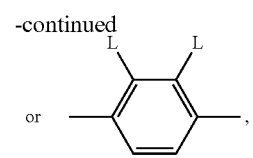

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from CH$_2$=CW$^1$—COO—, CH$_2$=CW$^1$—CO—,

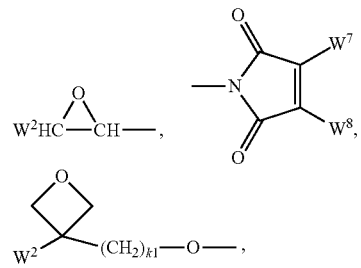

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are different from P-Sp-, k$_1$, k$_2$ and k$_3$ each, independently of one another, denote 0 or 1, k$_3$ preferably denotes 1.

Particularly preferred groups P are CH$_2$=CW$^1$—COO—, in particular CH$_2$=CH—COO—, CH$_2$=C(CH$_3$)—COO— and CH$_2$=CF—COO—, furthermore CH$_2$=CH—O—, (CH$_2$=CH)$_2$CH—OCO—, (CH$_2$=CH)$_2$CH—O—,

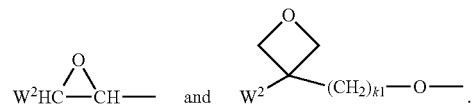

Very particularly preferred groups P are vinyloxy, acrylate, methacrylate, fluoroacrylate, chloroacrylate, oxetane and epoxide, in particular acrylate and methacrylate.

Preferred spacer groups Sp are selected from the formula Sp'-X', so that the radical P-Sp- corresponds to the formula P-Sp'-X'—, where Sp' denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —NR$^0$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH═CH— or —C≡C— in such a way that O and/or S atoms are not linked directly to one another, X' denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═CH—, —N═N—, —CH═CR$^0$—, —CY$^2$═CY$^3$—, —C≡C—, —CH═CH—COO—, —OCO—CH═CH— or a single bond, R$^{00}$ and R$^{000}$ each, independently of one another, denote H or alkyl having 1 to 12 C atoms, and Y$^2$ and Y$^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NW— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and R$^{00}$ and R$^{000}$ have the meanings indicated above.

Particularly preferred groups —X'-Sp'- are —(CH$_2$)$_{p1}$—, —O—(CH$_2$)$_{p1}$—, —OCO—(CH$_2$)$_{p1}$—, —OCO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, P-Sp- denotes a radical containing two or more polymerizable groups (multifunctional polymerizable radicals). Suitable radicals of this type and polymerizable compounds containing them and the preparation thereof are described, for example, in U.S. Pat. No. 7,060,200 B1 or US 2006/0172090 A1. Particular preference is given to multifunctional polymerizable radicals P-Sp- selected from the following formulae:

| | |
|---|---|
| —X-alkyl-CHP$^1$—CH$_2$—CH$_2$P$^2$ | M*a |
| —X-alkyl-C(CH$_2$P$^1$)(CH$_2$P$^2$)—CH$_2$P$^3$ | M*b |
| —X-alkyl-CHP$^1$CHP$^2$—CH$_2$P$^3$ | M*c |
| —X-alkyl-C(CH$_2$P$^1$)(CH$_2$P$^2$)—C$_{aa}$H$_{2aa+1}$ | M*d |
| —X-alkyl-CHP$^1$—CH$_2$P$^2$ | M*e |
| —X-alkyl-CHP$^1$P$^2$ | M*f |
| —X-alkyl-CP$^1$P$^2$—C$_{aa}$H$_{2aa+1}$ | M*g |
| —X-alkyl-C(CH$_2$P$^1$)(CH$_2$P$^2$)—CH$_2$OCH$_2$—C(CH$_2$P$^3$)(CH$_2$P$^4$)CH$_2$P$^5$ | M*h |
| —X-alkyl-CH((CH$_2$)$_{aa}$P$^1$)((CH$_2$)$_{bb}$P$^2$) | M*i |
| —X-alkyl-CHP$^1$CHP$^2$—C$_{aa}$H$_{2aa+1}$ | M*k |
| —X'-alkyl-C(CH$_3$)(CH$_2$P$^1$)(CH$_2$P$^2$) | M*m | in which alkyl denotes a single bond or straight-chain or branched alkylene having 1 to 12 C atoms, in which one or more non-adjacent $CH_2$ groups may each be replaced, independently of one another, by —C(R$^0$)═C(R$^{00}$)—, —C≡C—, —N(R$^0$)—, —O—, —S—, —CO—, —CO—O—, —O—CO—, or —O—CO—O— in such a way that O and/or S atoms are not linked directly to one another and in which, in addition, one or more H atoms may each be replaced by F, Cl or CN, where R$^{00}$ and R$^{000}$ have the meanings indicated above, aa and bb each, independently of one another, denote 0, 1, 2, 3, 4, 5 or 6, X has one of the meanings indicated for X', and P$^{1-5}$ each, independently of one another, have one of the meanings indicated for P.

The polymerizable compounds and RMs can be prepared analogously to processes known to the person skilled in the art and described in standard works of organic chemistry, such as, for example, in Houben-Weyl, Metho-den der organischen Chemie [Methods of Organic Chemistry], Thieme-Verlag, Stuttgart. Further synthetic methods are given in the documents cited above and below. In the simplest case, the synthesis of such RMs is carried out, for example, by esterification or etherification of 2,6-dihydroxynaphthalene or 4,4'-dihydroxybiphenyl using corresponding acids, acid derivatives or halogenated compounds containing a group P, such as, for example, (meth)acryloyl chloride or (meth)acrylic acid, in the presence of a dehydrating reagent, such as, for example, DCC (dicyclohexylcarbodiimide).

The LC mixtures and LC media according to the invention are in principle suitable for any type of PS or PSA display, in particular those based on LC media having negative dielectric anisotropy, particularly preferably for PSA-VA, PSA-IPS or PS-FFS displays. However, the person skilled in the art will also be able, without inventive step, to employ suitable LC mixtures and LC media according to the invention in other displays of the PS or PSA type which differ from the above-mentioned displays, for example, through their basic structure or through the nature, arrangement or structure of the individual components used, such as, for example, the substrates, alignment layers, electrodes, addressing elements, backlighting, polarizers, colored filters, compensation films optionally present, etc.

Very particularly suitable polymerizable compounds are listed in Table D.

If the liquid-crystalline media according to the invention comprise at least one polymerizable compound, it is present in the medium in amounts of 0.1 to 10% by weight, preferably 0.2 to 4.0% by weight, particularly preferably 0.2 to 2.0% by weight.

The mixtures according to the invention may furthermore comprise conventional additives, such as, for example, stabilizers, antioxidants, UV absorbers, nanoparticles, microparticles, etc.

The structure of the liquid-crystal displays according to the invention corresponds to the usual geometry, as described, for example, in EP-A 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

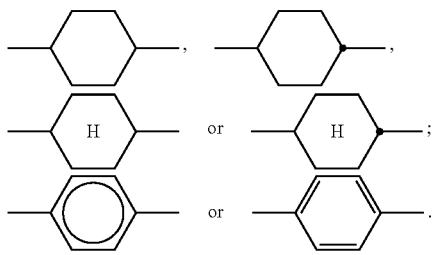

Throughout the patent application and in the working examples, the structures of the liquid-crystalline compounds are indicated by means of acronyms. Unless indicated otherwise, the transformation into chemical formulae is carried out in accordance with Tables 1-3. All radicals $C_iH_{2i+1}$, $C_nH_{2n+1}$, $C_mH_{2m+1}$ and $C_{m'}H_{2m'+1}$ or $C_nH_{2n}$ and $C_mH_{2m}$ are straight-chain alkyl radicals or alkylene radicals in each case having n, m, m' or z C atoms respectively. n, m, m', i each denote, independently of one another, 1, 2, 3, 4, 5, 6, 7, 8, 9, 10, 11 or 12, preferably 1, 2, 3, 4, 5 or 6. In Table 1 the ring elements of the respective compound are coded, in Table 2 the bridging members are listed and in Table 3 the meanings of the symbols for the left-hand or right-hand side chains of the compounds are indicated.

TABLE 1

| Ring elements | |
|---|---|
| 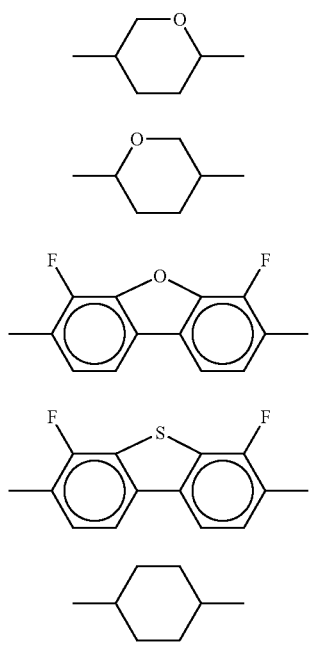 | A<br><br>AI<br><br>B<br><br>B(S)<br><br>C |

TABLE 1-continued

| Ring elements | |
|---|---|
| 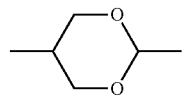 | D |
| 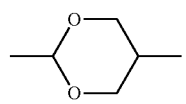 | DI |
| 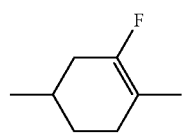 | F |
| 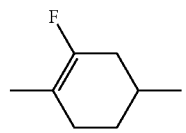 | FI |
| 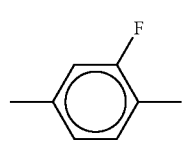 | G |
| 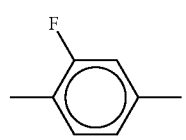 | GI |
| 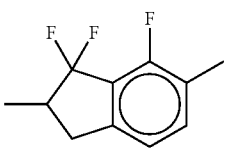 | K |
| 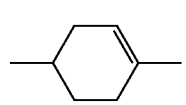 | L |
| 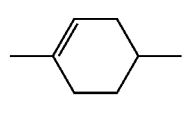 | LI |
| 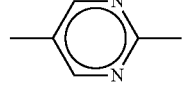 | M |
| 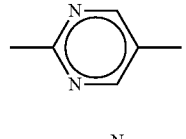 | MI |
|  | N |

TABLE 1-continued

Ring elements

| Structure | Code |
|---|---|
| pyridine (N at 2-position) | NI |
| phenyl | P |
| thiophene (2,5-linked) | S |
| 3,5-difluorophenyl | U |
| 2,6-difluorophenyl | UI |
| 2,3-difluorophenyl | Y |
| 2-fluoro-3-chlorophenyl | Y(F, Cl) |
| 2-chloro-3-fluorophenyl | Y(Cl, F) |

TABLE 2

Bridging members

| | | | |
|---|---|---|---|
| E | —CH$_2$CH$_2$— | | |
| V | —CH=CH— | | |
| T | —C≡C— | | |
| W | —CF$_2$CF$_2$— | | |
| Z | —COO— | ZI | —OCO— |
| O | —CH$_2$O— | OI | —OCH$_2$— |
| Q | —CF$_2$O— | QI | —OCF$_2$— |

TABLE 3

Side chains

| Left-hand side chain | | Right-hand side chain | |
|---|---|---|---|
| n- | C$_n$H$_{2n+1}$— | -n | —C$_n$H$_{2n+1}$ |
| nO— | C$_n$H$_{2n+1}$—O— | —On | —O—C$_n$H$_{2n+1}$ |
| V— | CH$_2$=CH— | —V | —CH=CH$_2$ |
| nV— | C$_n$H$_{2n+1}$—CH=CH— | -nV | —C$_n$H$_{2n}$—CH=CH$_2$ |
| Vn- | CH$_2$=CH—C$_n$H$_{2n}$— | —Vn | —CH=CH—C$_n$H$_{2n+1}$ |
| nVm- | C$_n$H$_{2n+1}$—CH=CH—C$_m$H$_{2m}$— | -nVm | —C$_n$H$_{2n}$—CH=CH—C$_m$H$_{2m+1}$ |
| N— | N≡C— | —N | —C≡N |
| F— | F— | —F | —F |
| Cl— | Cl— | —Cl | —Cl |
| M— | CFH$_2$— | —M | —CFH$_2$ |
| D- | CF$_2$H— | -D | —CF$_2$H |
| T- | CF$_3$— | -T | —CF$_3$ |
| MO— | CFH$_2$O— | —OM | —OCFH$_2$ |
| DO— | CF$_2$HO— | —OD | —OCF$_2$H |
| TO— | CF$_3$O— | —OT | —OCF$_3$ |
| T- | CF$_3$— | -T | —CF$_3$ |
| A— | H—C≡C— | —A | —C≡C—H |

Besides the compounds of the formulae IIA and/or IIB and/or IIC, one or more compounds of the formula I, the mixtures according to the invention preferably comprise one or more of the compounds from Table A indicated below.

TABLE A
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
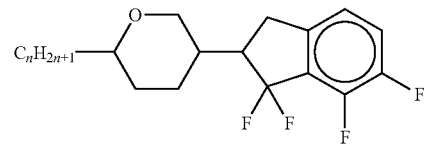
AIK-n-F
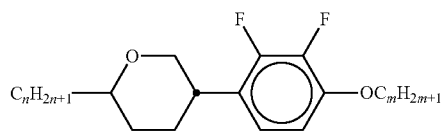
AIY-n-Om
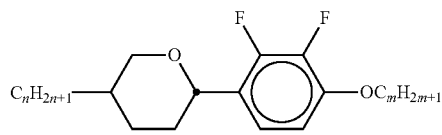
AY-n-Om
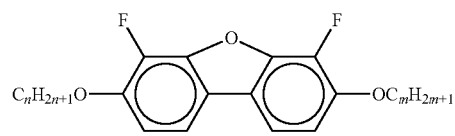
B-nO-Om
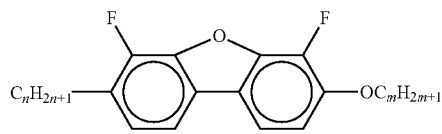
B-n-Om
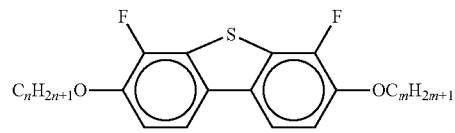
B(S)-nO-Om
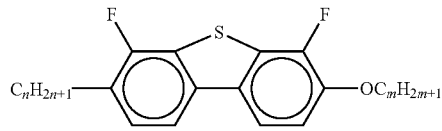
B(S)-n-Om TABLE A-continued
The following abbreviations are used:
(n, m, m', i: each, independently of one another, 1, 2, 3, 4, 5, or 6;
(O)$C_mH_{2m+1}$ means $OC_mH_{2m+1}$ or $C_mH_{2m+1}$)
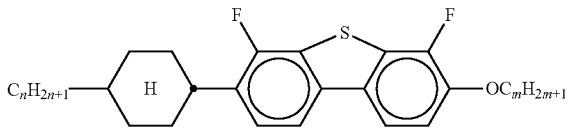
CB(S)-n-(O)m
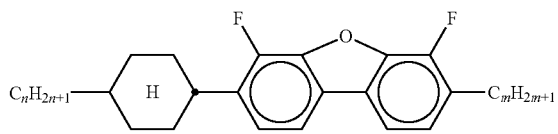
CB-n-m
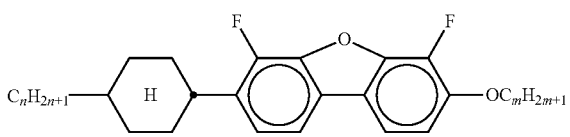
CB-n-Om
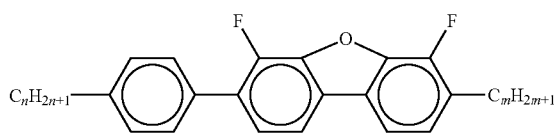
PB-n-m
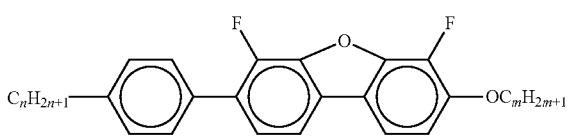
PB-n-Om
BCH-nm
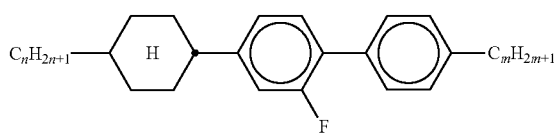
BCH-nmF
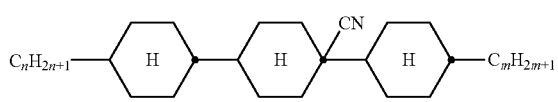
BCN-nm TABLE A-continued
The following abbreviations are used:
(n, m, m', i: each, independently of one another, 1, 2, 3, 4, 5, or 6;
(O)$C_mH_{2m+1}$ means $OC_mH_{2m+1}$ or $C_mH_{2m+1}$)
C-1V-V1
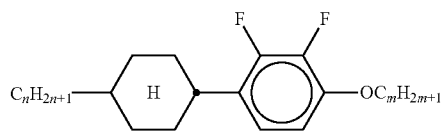
CY-n-Om
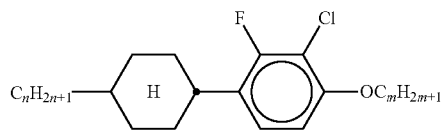
CY(F, Cl)n-Om
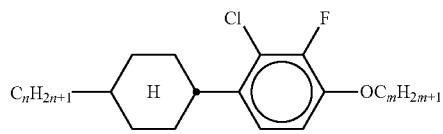
CY(Cl, F)-n-Om
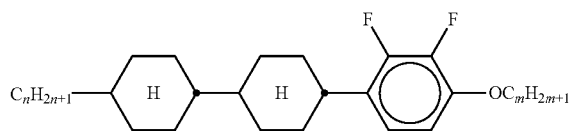
CCY-n-Om
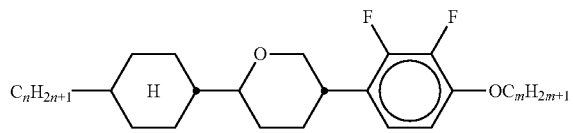
CAIY-n-Om
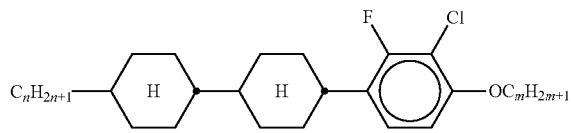
CCY(F, Cl)n-Om TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
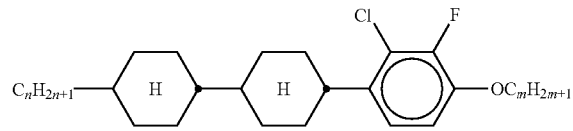
CCY(Cl, F)-n-Om
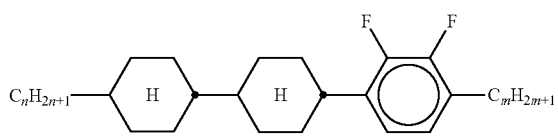
CCY-n-m
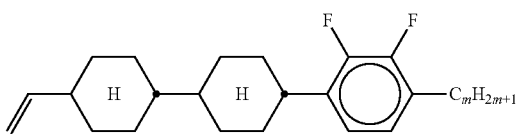
CCY-V-m
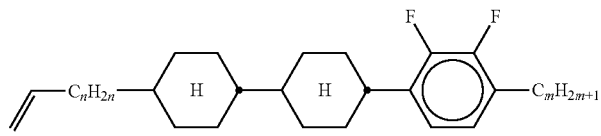
CCY-Vn-m
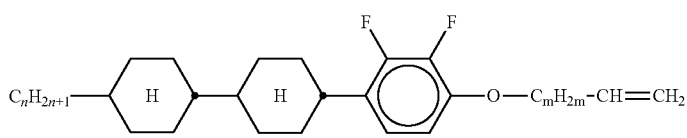
CCY-n-OmV
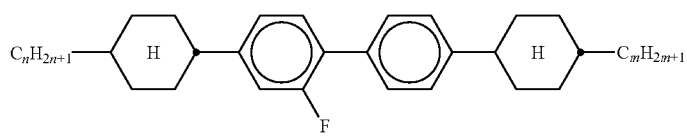
CBC-nmF
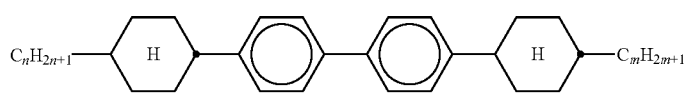
CBC-nm TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
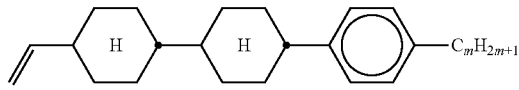
CCP-V-m
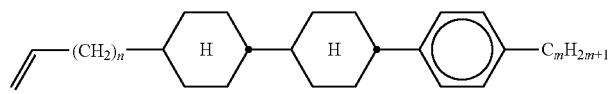
CCP-Vn-m
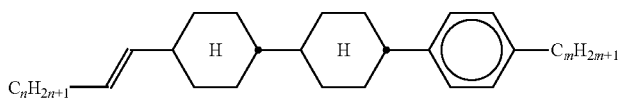
CCP-nV-m
CCP-n-m
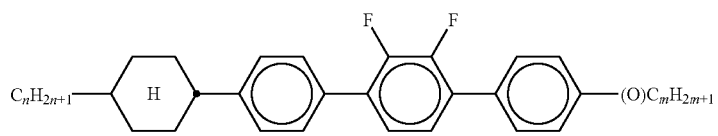
CPYP-n-(O)m
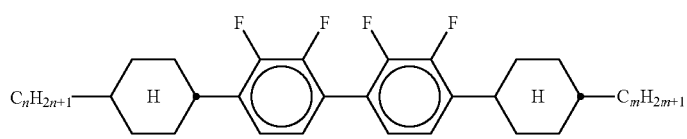
CYYC-n-m
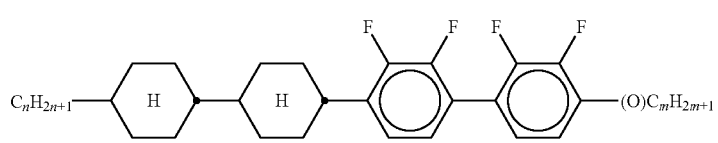
CCYY-n-(O)m TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1})$
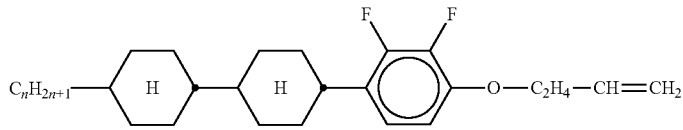
CCY-n-O2V
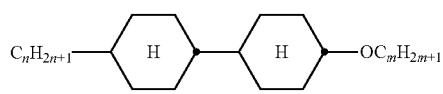
CCH-nOm
CCP-n-m
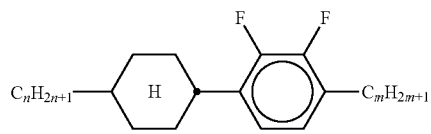
CY-n-m
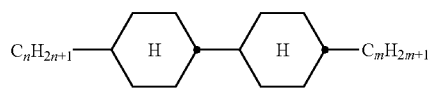
CCH-nm
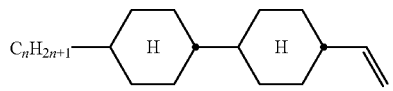
CC-n-v
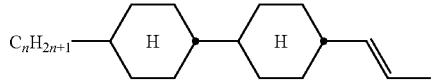
CC-n-V1
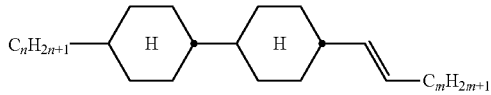
CC-n-Vm TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1})$
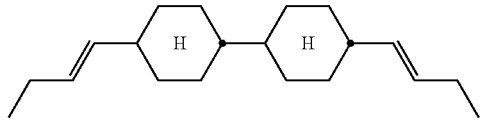
CC-2V-V2
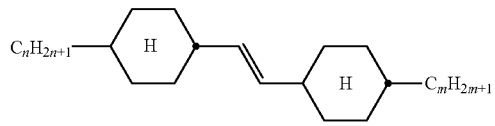
CVC-n-m
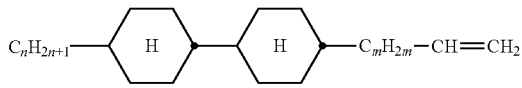
CC-n-mV
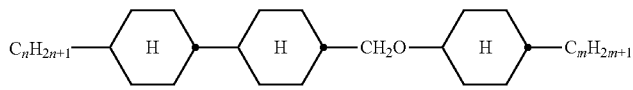
CCOC-n-m
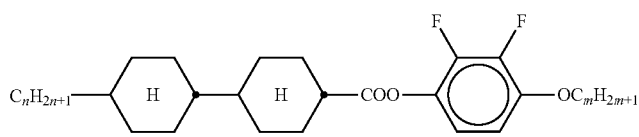
CP-nOmFF
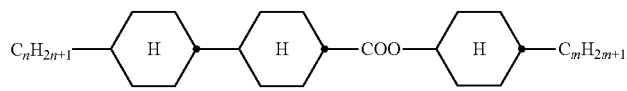
CH-nm
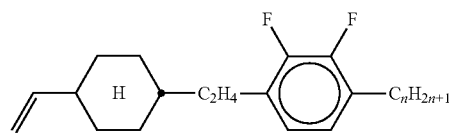
CEY-V-n
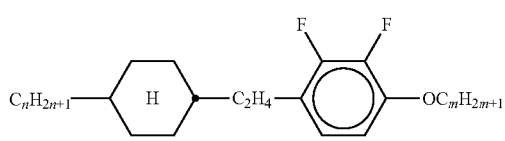
CEY-n-Om TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
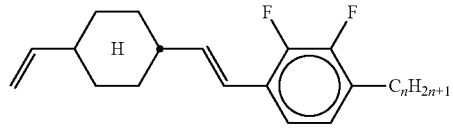
CVY-V-n
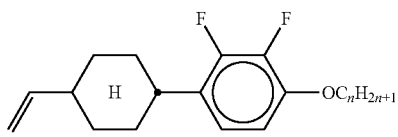
CY-V-On
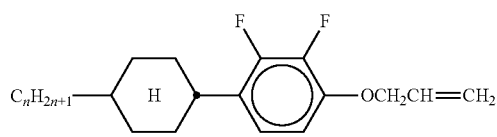
CY-n-O1V
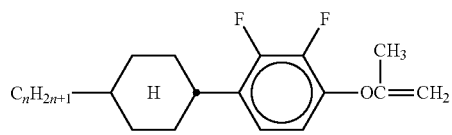
CY-n-OC(CH$_3$)=CH$_2$
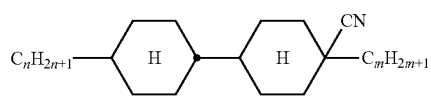
CCN-nm
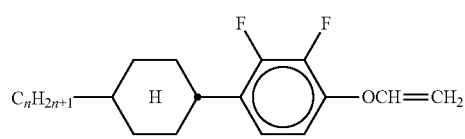
CY-n-OV
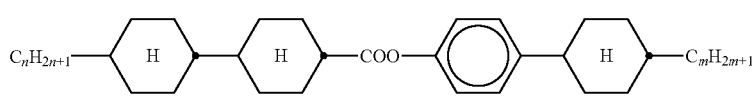
CCPC-nm TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
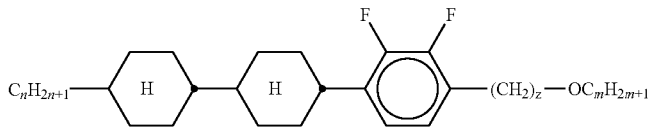
CCY-n-zOm
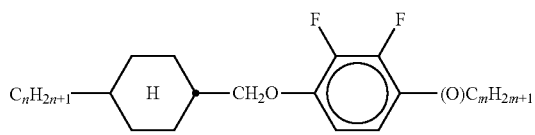
COY-n-(O)m
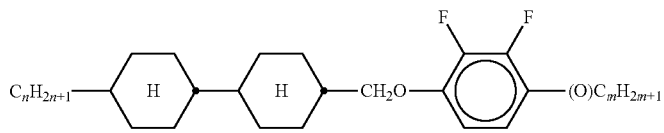
CCOY-n-(O)m
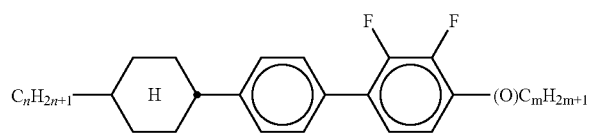
CPY-n-(O)m
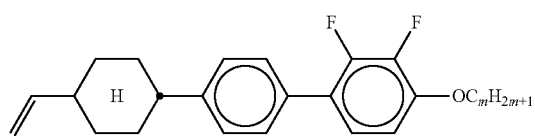
CPY-V-Om
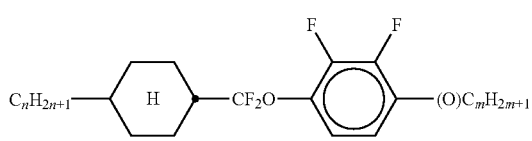
CQY-n-(O)m
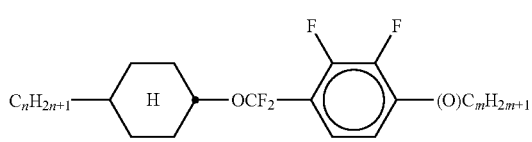
CQIY-n-(O)m TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
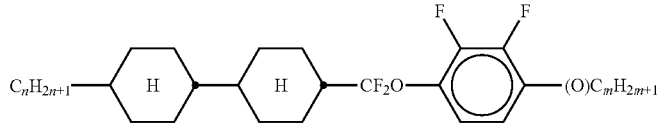
CCQY-n-(O)m
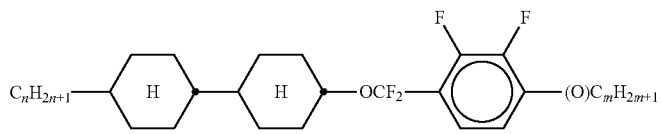
CCQIY-n-(O)m
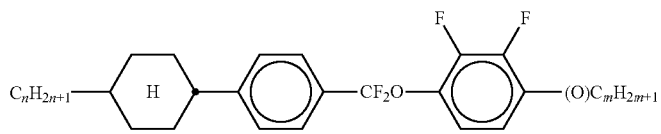
CPQY-n-(O)m
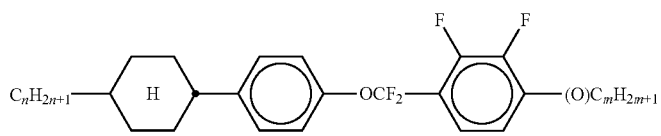
CPQIY-n-(O)m
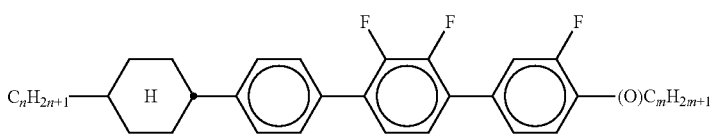
CPYG-n-(O)m
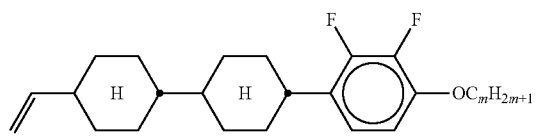
CCY-V-Om
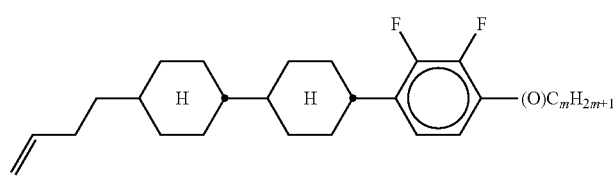
CCY-V2-(O)m TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
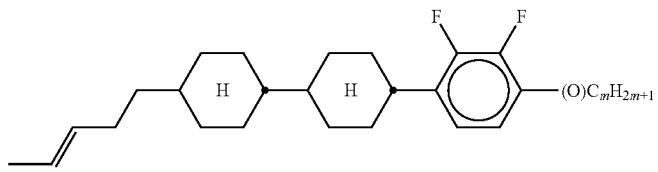
CCY-1V2-(O)m
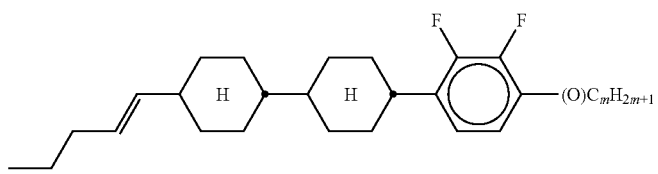
CCY-3V-(O)m
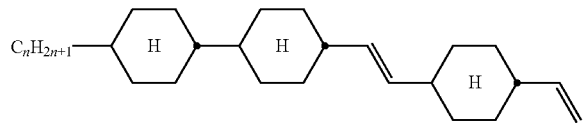
CCVC-n-V
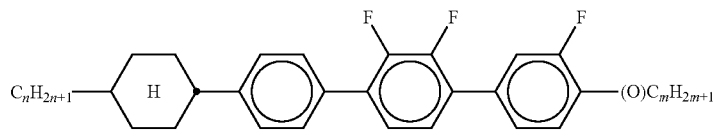
CPYG-n-(O)m
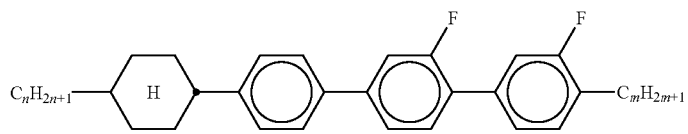
CPGP-n-m
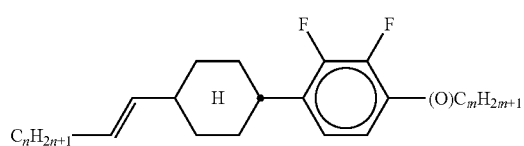
CY-nV-(O)m TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
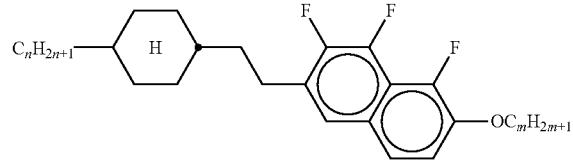
CENaph-n-Om
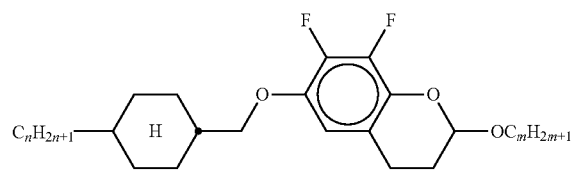
COChrom-n-Om
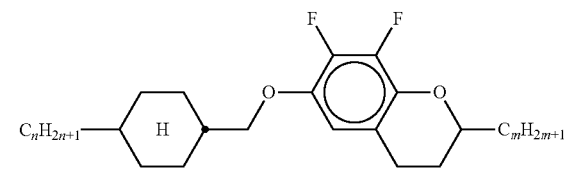
COChrom-n-m
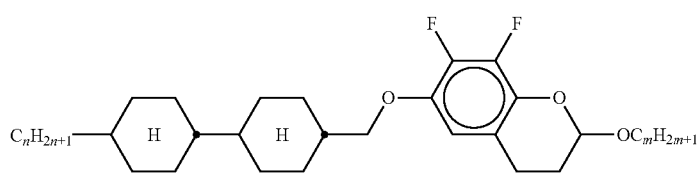
CCOChrom-n-Om
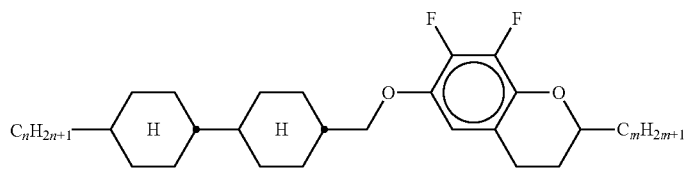
CCOChrom-n-m
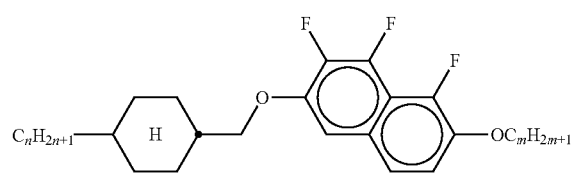
CONaph-n-Om TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
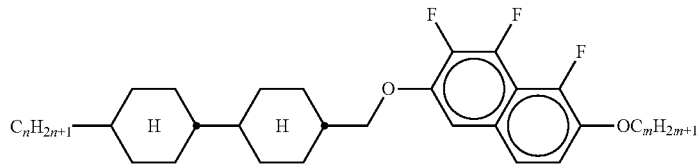
CCONaph-n-Om
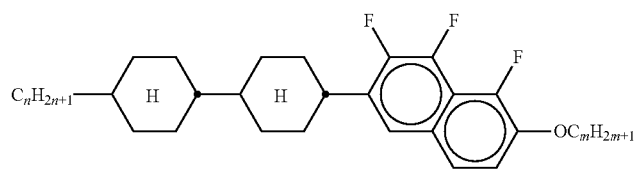
CCNaph-n-Om
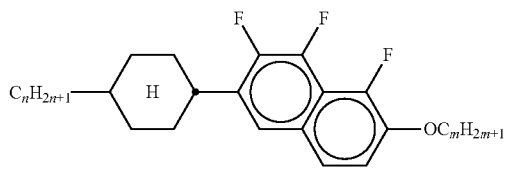
CNaph-n-Om
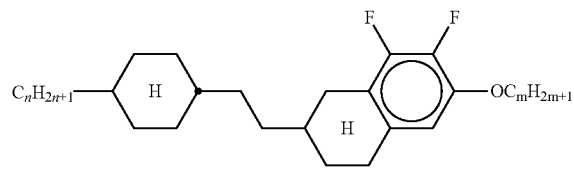
CETNaph-n-Om
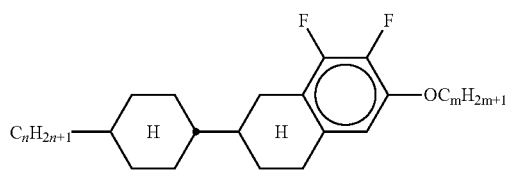
CTNaph-n-Om
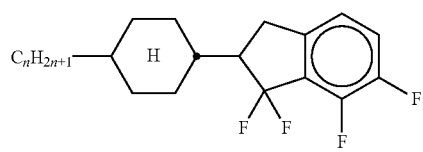
CK-n-F TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
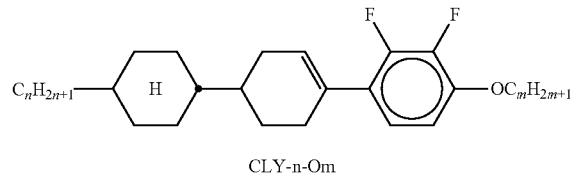
CLY-n-Om
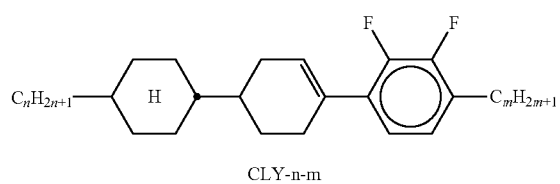
CLY-n-m
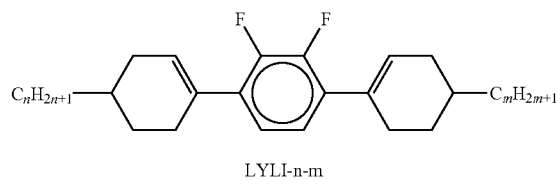
LYLI-n-m
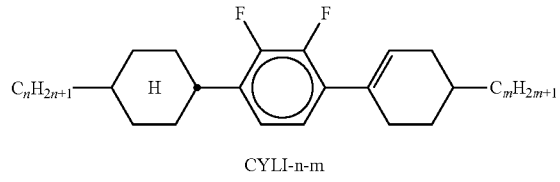
CYLI-n-m
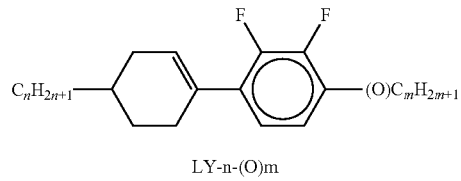
LY-n-(O)m
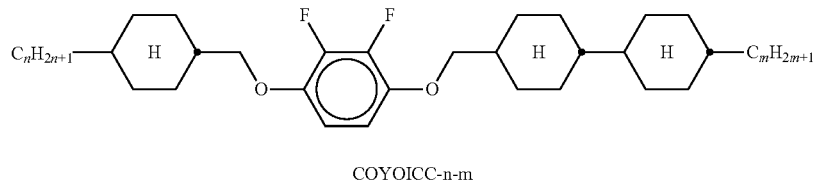
COYOICC-n-m
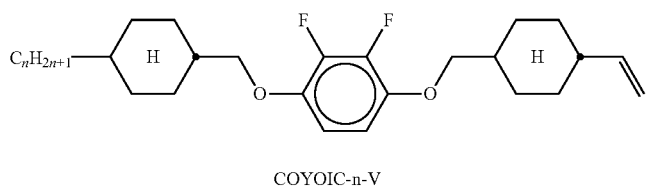
COYOIC-n-V TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
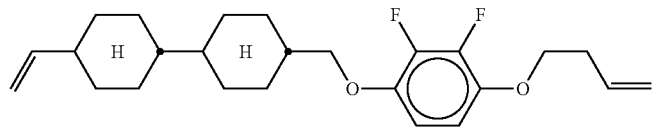
CCOY-V-O2V
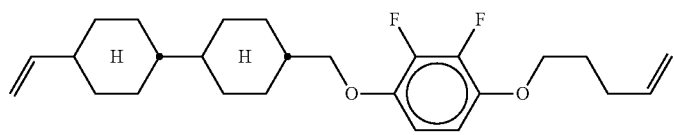
CCOY-V-O3V
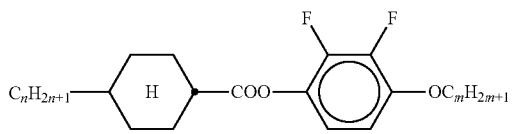
D-nOmFF
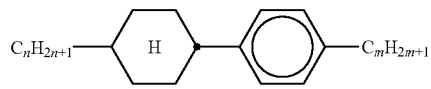
PCH-nm
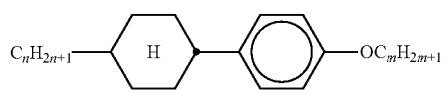
PCH-nOm
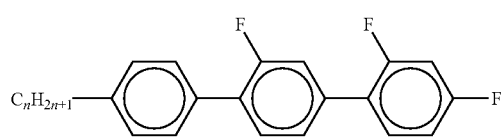
PGIGI-n-F
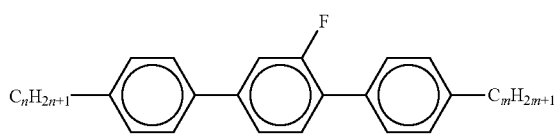
PGP-n-m
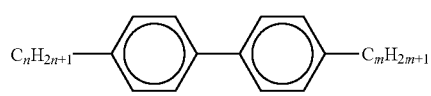
PP-n-m TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
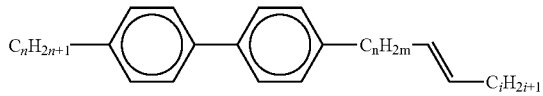
PP-n-mVi
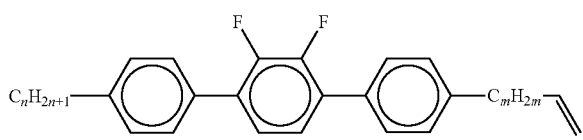
PYP-n-mV
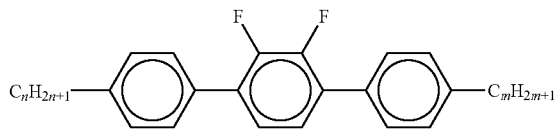
PYP-n-m
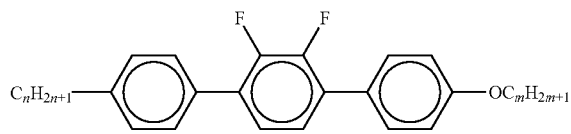
PYP-n-Om
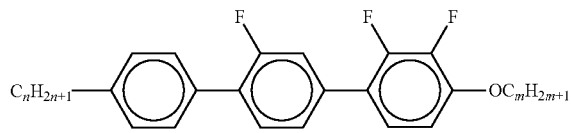
PGIY-n-Om
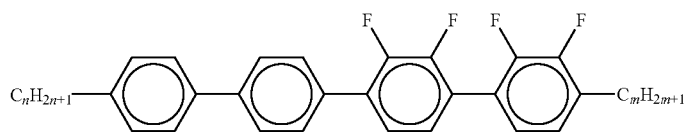
PPYY-n-m
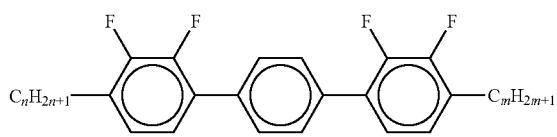
YPY-n-m TABLE A-continued
The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)
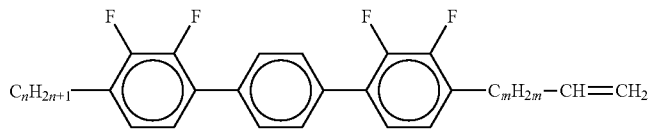
YPY-n-mV
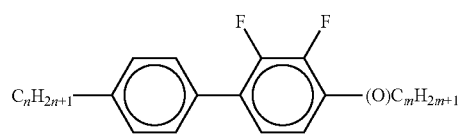
PY-n-(O)m
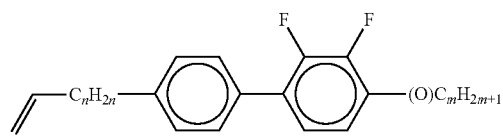
PY-Vn-(O)m
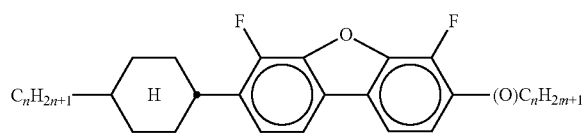
C-DFDBF-n-(O)m
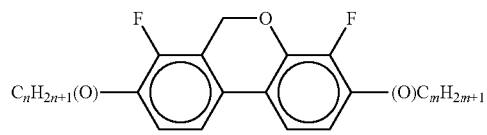
DFDBC-n(O)-(O)m
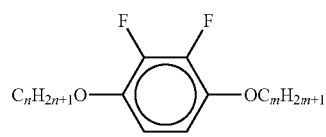
Y-nO-Om
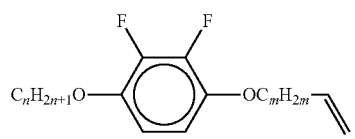
Y-nO-OmV

TABLE A-continued

The following abbreviations are used:
(n, m, m', i: each, independently of one another, 1, 2, 3, 4, 5, or 6;
$(O)C_mH_{2m+1}$ means $OC_mH_{2m+1}$ or $C_mH_{2m+1}$)

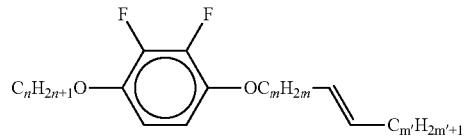

Y-nO-OmVm'

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilizers or chiral dopants may be added. Suitable stabilizers for the mixtures according to the invention are, in particular, those listed in Table C.

For example, 0-15% of pleochroic dyes may be added, furthermore conductive salts, preferably ethyldimethyldodecylammonium 4-hexoxybenzo-ate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE B

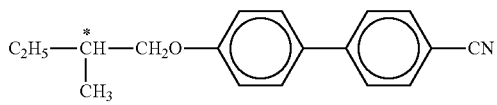

C 15

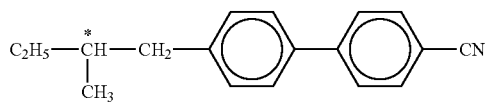

CB 15

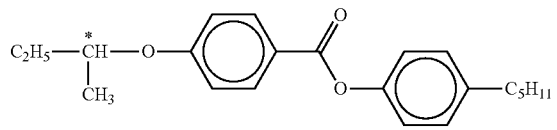

CM 21

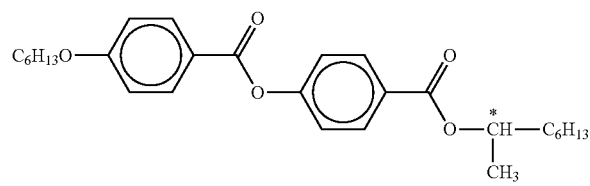

R/S-811

TABLE B-continued
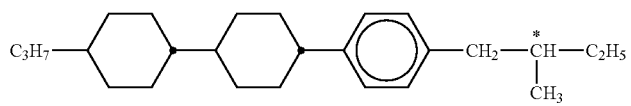
CM 44
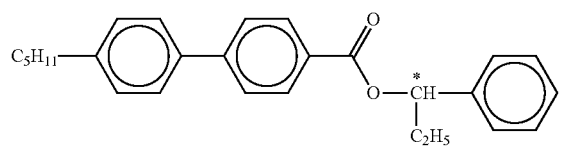
CM 45
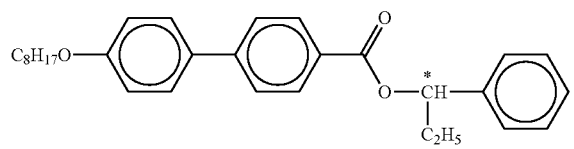
CM 47
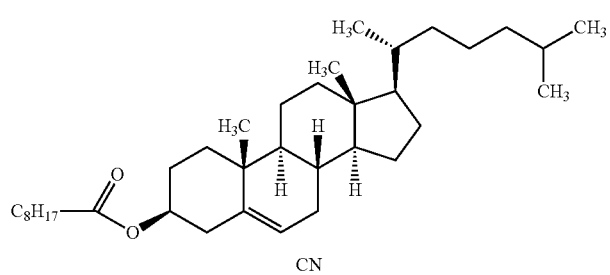
CN
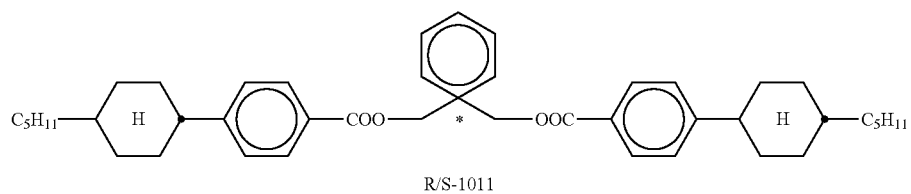
R/S-1011
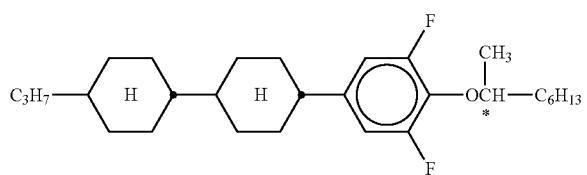
R/S-2011
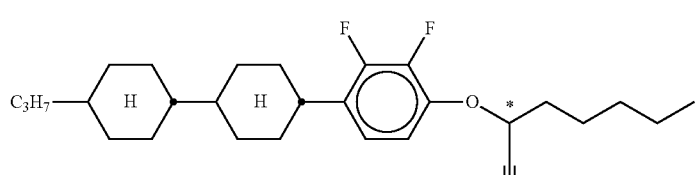
R/S-3011

TABLE B-continued

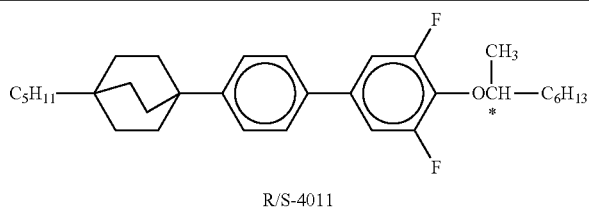

R/S-4011

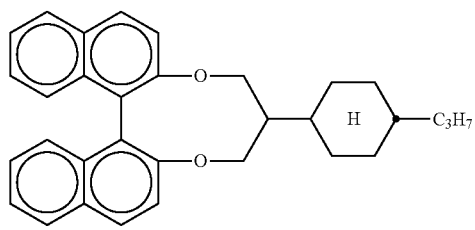

R/S-5011

Stabilizers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilizers are, in particular, BHT derivatives, for example 2,6-di-tert-butyl-4-alkylphenols, and Tinuvin 770.

TABLE C

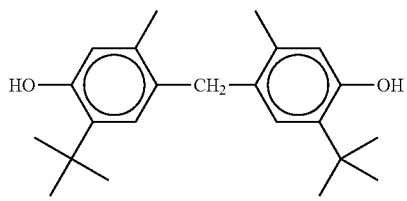

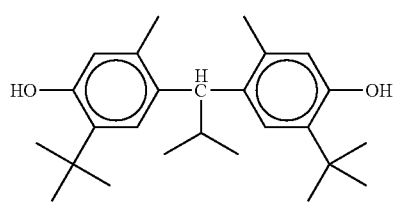

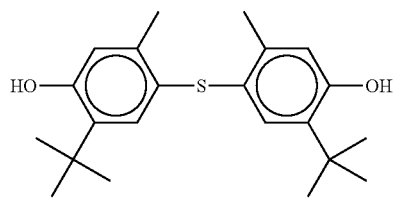

TABLE C-continued
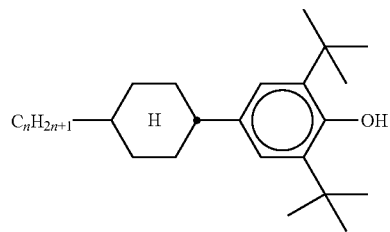
n = 1, 2, 3, 4, 5, 6 or 7,
preferably n = 3
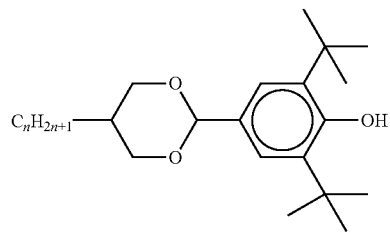
n = 1, 2, 3, 4, 5, 6 or 7,
preferably n = 3
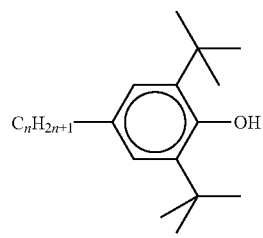
n = 1, 2, 3, 4, 5, 6 or 7,
preferably n = 7
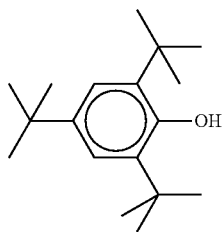
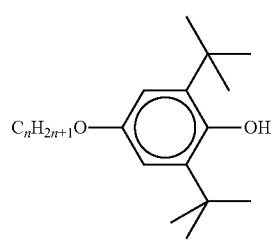
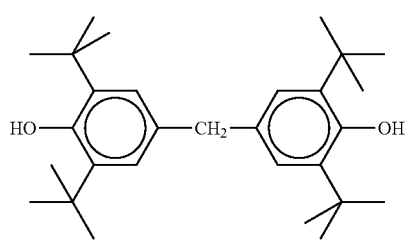

TABLE C-continued
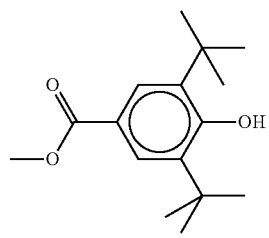
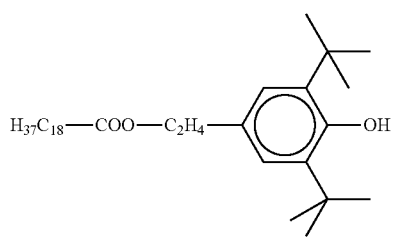
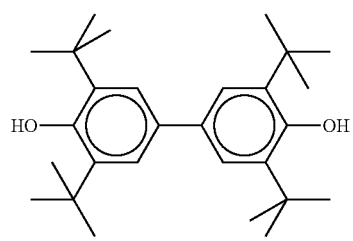
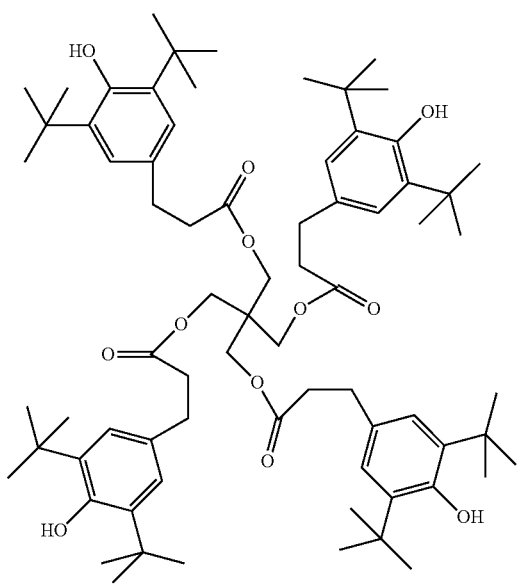 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
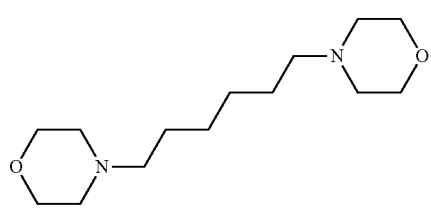 [SMILES: C(CCCN1CCOCC1)CCN1CCOCC1]

TABLE C-continued
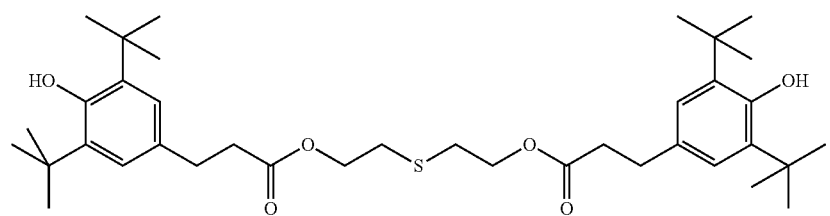 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
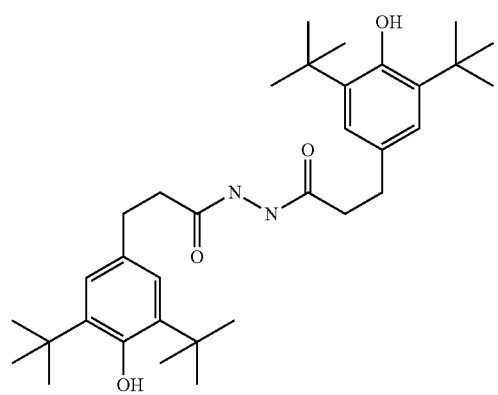 [SMILES: CC(C)(C)c1cc(CCC(=O)NNC(=O)CCc2cc(C(C)(C)C)c(O)c(C(C)(C)C)c2)cc(C(C)(C)C)c1O]
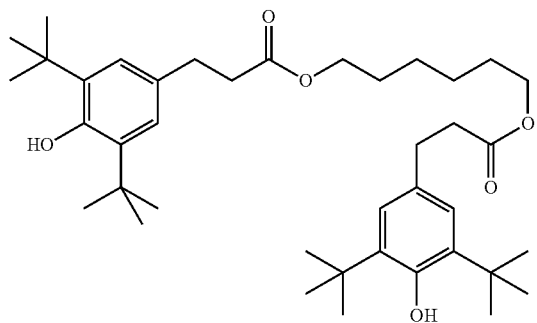 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
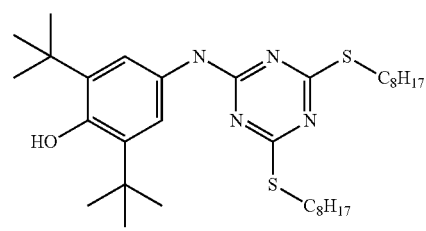

TABLE C-continued
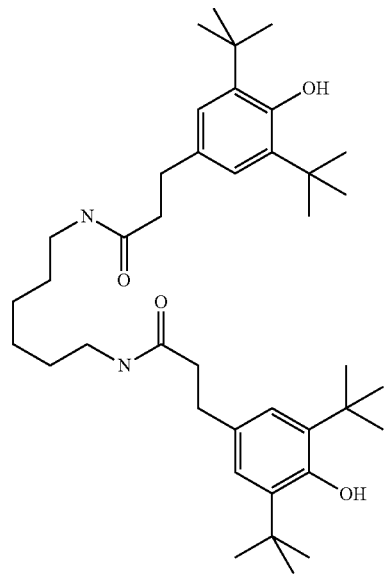 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
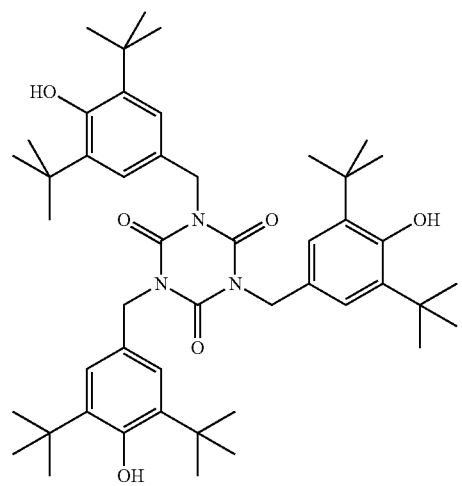 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
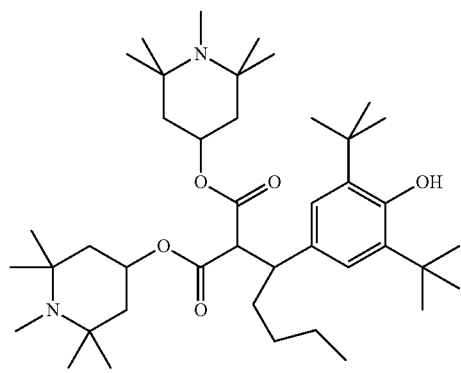 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
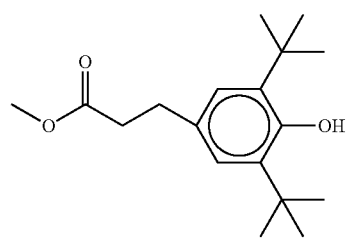

TABLE C-continued
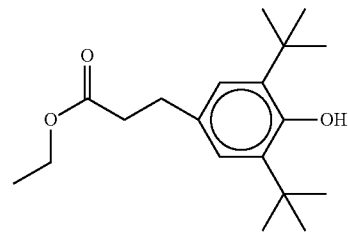
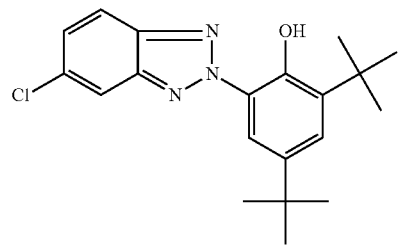 [SMILES: CC(C)(C)c1cc(-n2nc3ccc(Cl)cc3n2)c(O)c(C(C)(C)C)c1]
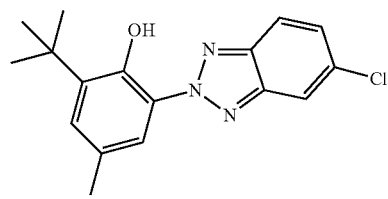 [SMILES: Cc1cc(-n2nc3ccc(Cl)cc3n2)c(O)c(C(C)(C)C)c1]
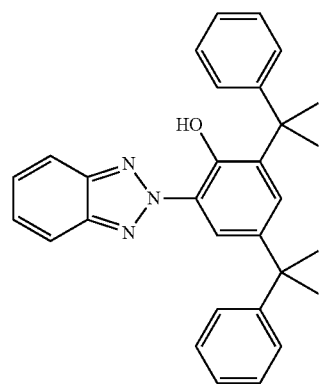 [SMILES: CC(C)(c1ccccc1)c1cc(-n2nc3ccccc3n2)c(O)c(C(C)(C)c2ccccc2)c1]
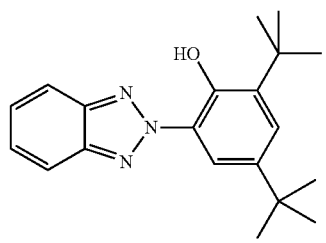 [SMILES: CC(C)(C)c1cc(-n2nc3ccccc3n2)c(O)c(C(C)(C)C)c1]
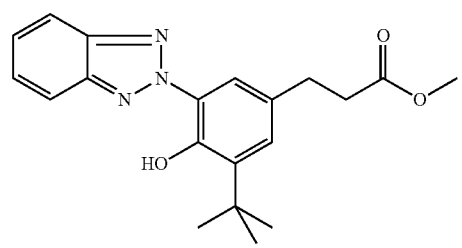 [SMILES: COC(=O)CCc1cc(-n2nc3ccccc3n2)c(O)c(C(C)(C)C)c1]

TABLE C-continued
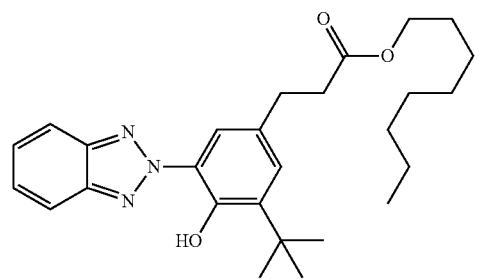 [SMILES: CCCCCCCCOC(=O)CCc1cc(-n2nc3ccccc3n2)c(O)c(C(C)(C)C)c1]
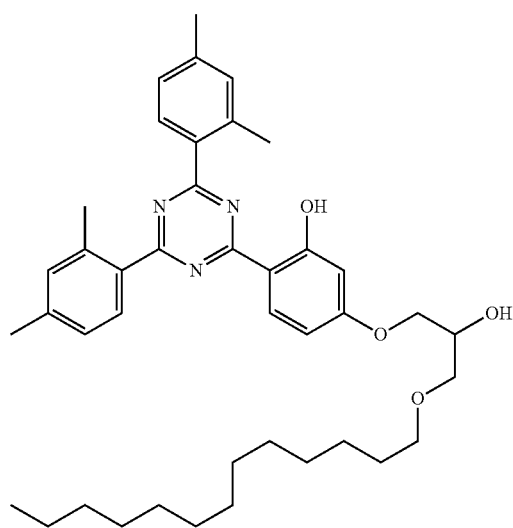 [SMILES: CCCCCCCCCCCCCOCC(O)COc1ccc(-c2nc(-c3ccc(C)cc3C)nc(-c3ccc(C)cc3C)n2)c(O)c1]
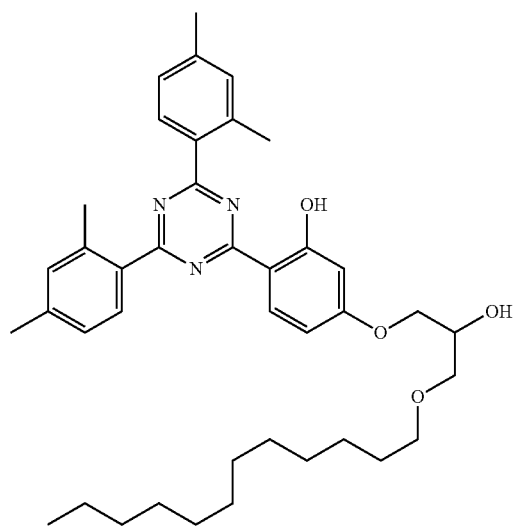 [SMILES: CCCCCCCCCCCCOCC(O)COc1ccc(-c2nc(-c3ccc(C)cc3C)nc(-c3ccc(C)cc3C)n2)c(O)c1]

TABLE C-continued
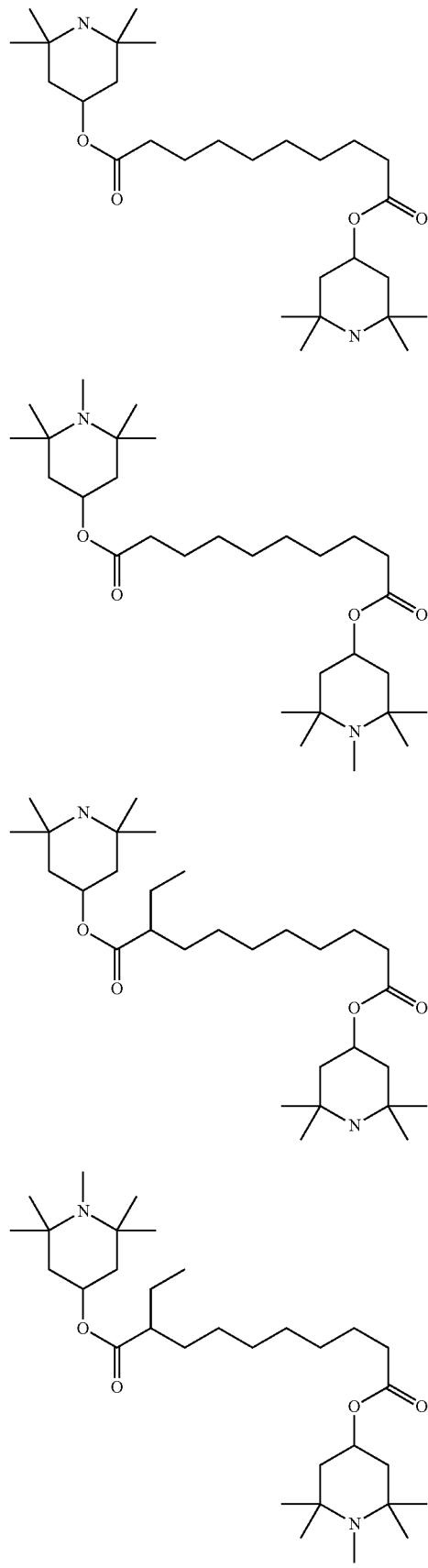

TABLE C-continued
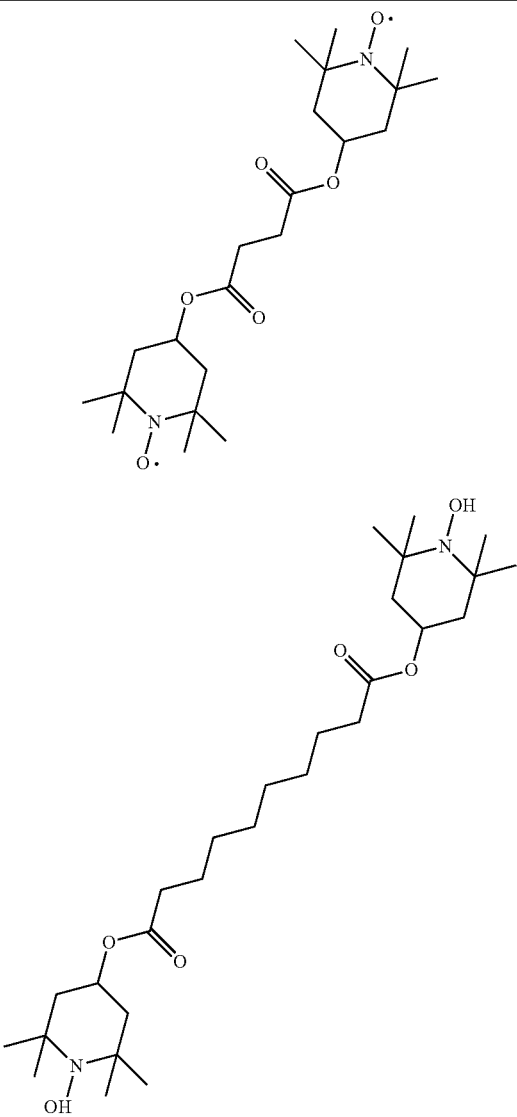
Suitable reactive mesogens (polymerizable compounds) for use in the mixtures according to the invention, preferably in PSA and PS-VA applications are shown in Table D below:
TABLE D
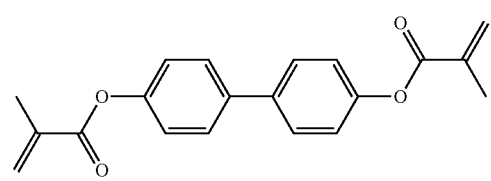
RM-1
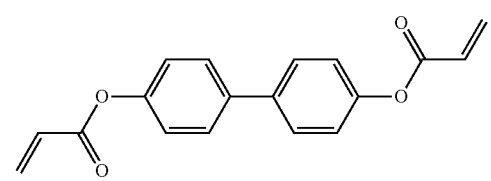 [SMILES: C=CC(=O)Oc1ccc(-c2ccc(OC(=O)C=C)cc2)cc1]
RM-2

TABLE D-continued
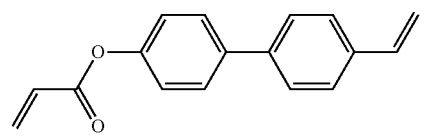 [SMILES: C=CC(=O)Oc1ccc(-c2ccc(C=C)cc2)cc1]
RM-3
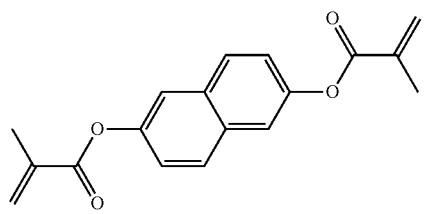 [SMILES: C=C(C)C(=O)Oc1ccc2cc(OC(=O)C(=C)C)ccc2c1]
RM-4
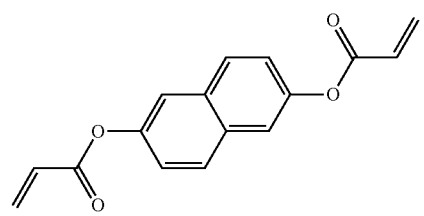 [SMILES: C=CC(=O)Oc1ccc2cc(OC(=O)C=C)ccc2c1]
RM-5
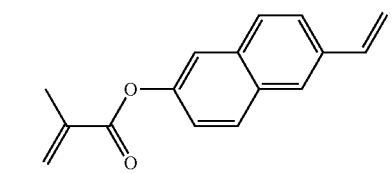 [SMILES: C=Cc1ccc2cc(OC(=O)C(=C)C)ccc2c1]
RM-6
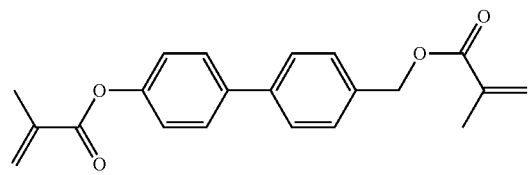 [SMILES: C=C(C)C(=O)OCc1ccc(-c2ccc(OC(=O)C(=C)C)cc2)cc1]
RM-7
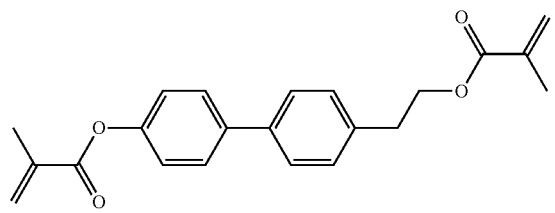 [SMILES: C=C(C)C(=O)OCCc1ccc(-c2ccc(OC(=O)C(=C)C)cc2)cc1]
RM-8
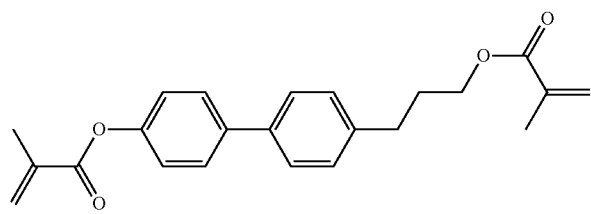 [SMILES: C=C(C)C(=O)OCCCc1ccc(-c2ccc(OC(=O)C(=C)C)cc2)cc1]
RM-9
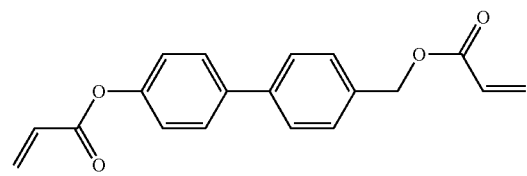 [SMILES: C=CC(=O)OCc1ccc(-c2ccc(OC(=O)C=C)cc2)cc1]
RM-10

TABLE D-continued
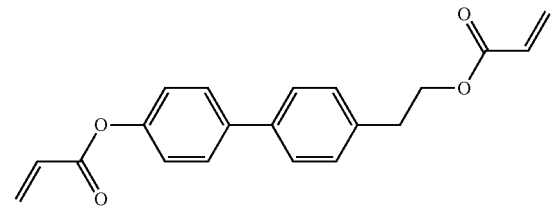 [SMILES: C=CC(=O)OCCc1ccc(-c2ccc(OC(=O)C=C)cc2)cc1]
RM-11
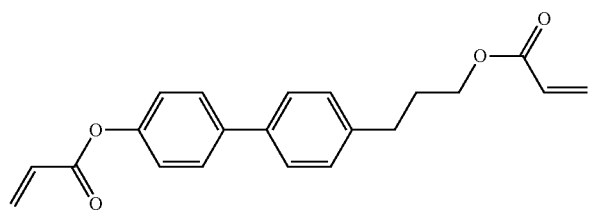 [SMILES: C=CC(=O)OCCCc1ccc(-c2ccc(OC(=O)C=C)cc2)cc1]
RM-12
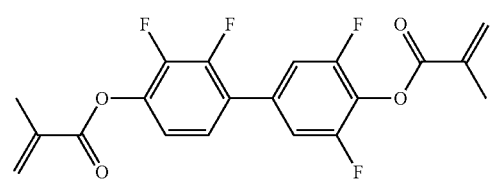
RM-13
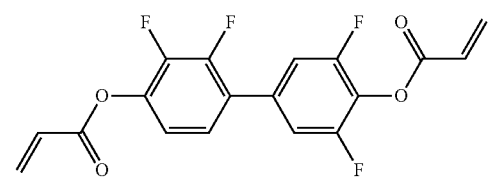
RM-14
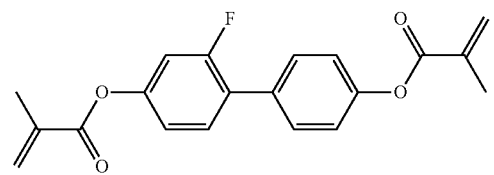
RM-15
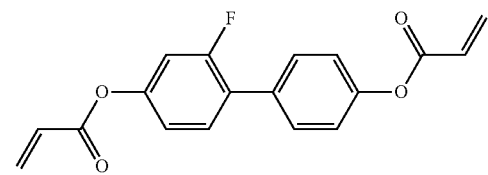 [SMILES: C=CC(=O)Oc1ccc(-c2ccc(OC(=O)C=C)cc2F)cc1]
RM-16
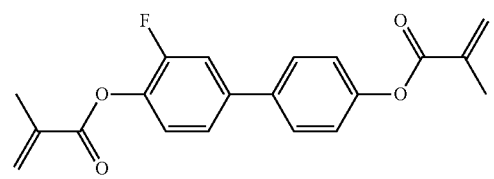 [SMILES: C=C(C)C(=O)Oc1ccc(-c2ccc(OC(=O)C(=C)C)c(F)c2)cc1]
RM-17
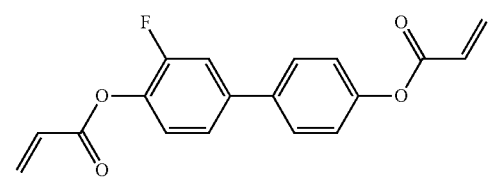 [SMILES: C=CC(=O)Oc1ccc(-c2ccc(OC(=O)C=C)c(F)c2)cc1]
RM-18

TABLE D-continued
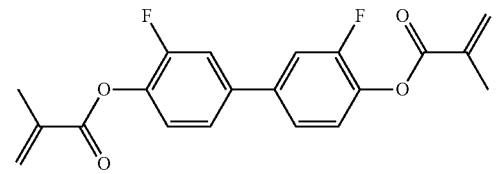 [SMILES: C=C(C)C(=O)Oc1ccc(-c2ccc(OC(=O)C(=C)C)c(F)c2)cc1F] RM-19
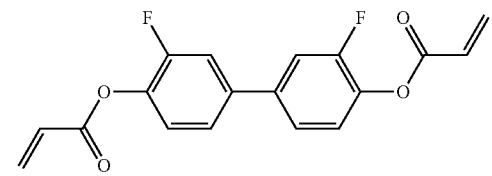 [SMILES: C=CC(=O)Oc1ccc(-c2ccc(OC(=O)C=C)c(F)c2)cc1F] RM-20
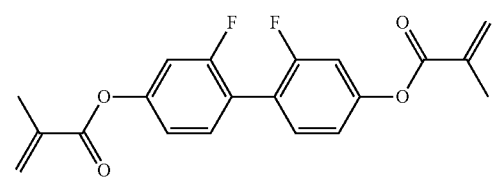 RM-21
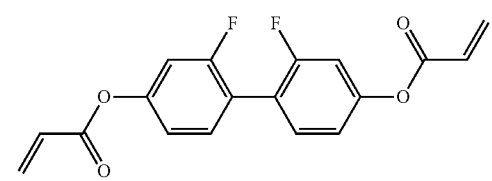 RM-22
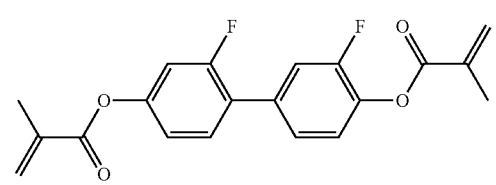 [SMILES: C=C(C)C(=O)Oc1ccc(-c2ccc(OC(=O)C(=C)C)c(F)c2)c(F)c1] RM-23
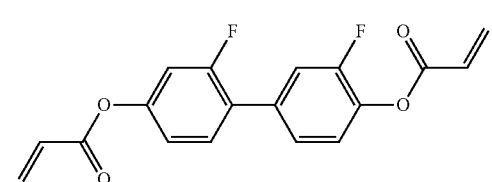 RM-24
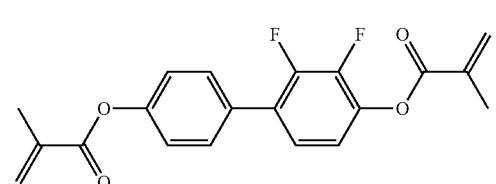 RM-25
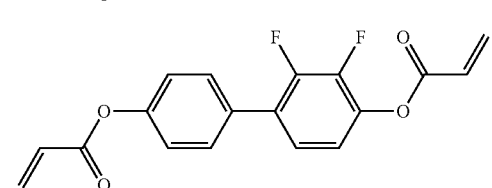 RM-26
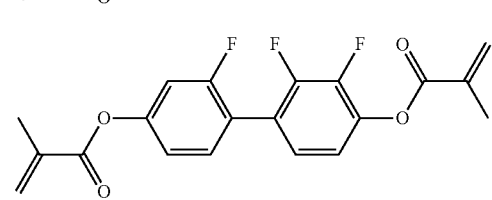 RM-27

TABLE D-continued
| | |
|---|---|
| 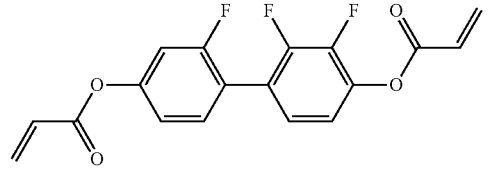 [SMILES: C=CC(=O)Oc1ccc(-c2ccc(OC(=O)C=C)c(F)c2F)cc1] | RM-28 |
| 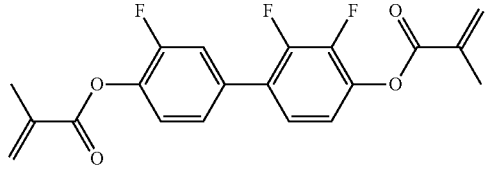 [SMILES: C=C(C)C(=O)Oc1ccc(-c2ccc(OC(=O)C(=C)C)c(F)c2F)c(F)c1] | RM-29 |
| 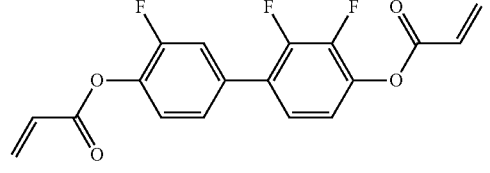 [SMILES: C=CC(=O)Oc1ccc(-c2ccc(OC(=O)C=C)c(F)c2F)c(F)c1F] | RM-30 |
| 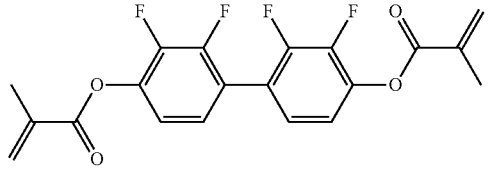 | RM-31 |
| 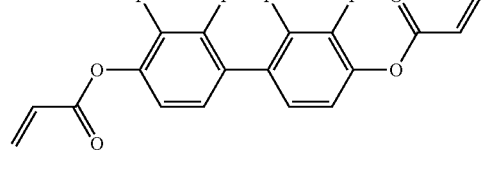 | RM-32 |
| 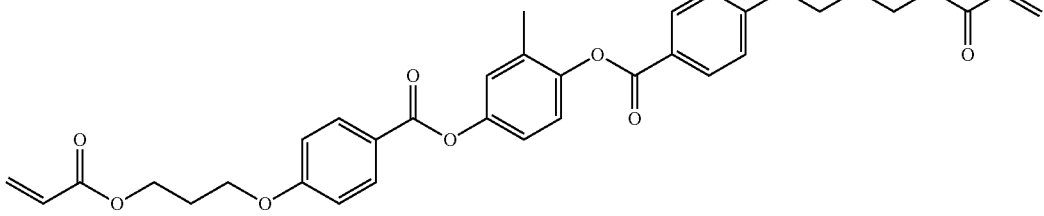 | RM-33 |
| 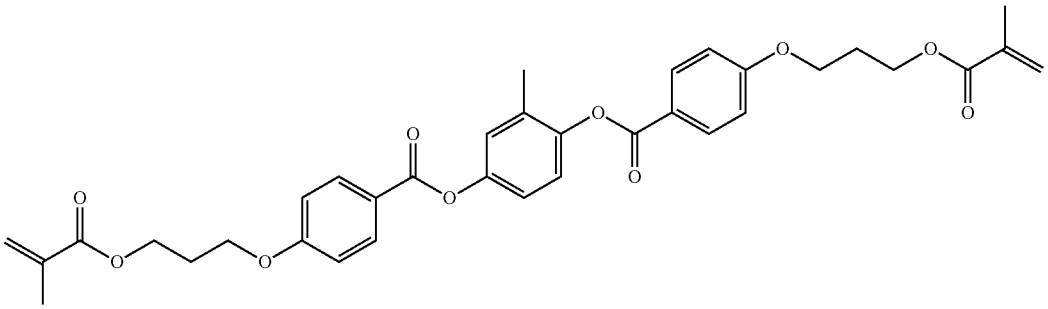 [SMILES: C=C(C)C(=O)OCCCOc1ccc(C(=O)Oc2ccc(OC(=O)c3ccc(OCCCOC(=O)C(=C)C)cc3)c(C)c2)cc1] | RM-34 |
| 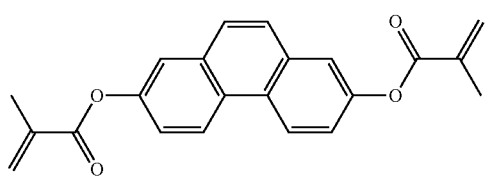 [SMILES: C=C(C)C(=O)Oc1ccc2c(ccc3cc(OC(=O)C(=C)C)ccc32)c1] | RM-35 |

TABLE D-continued
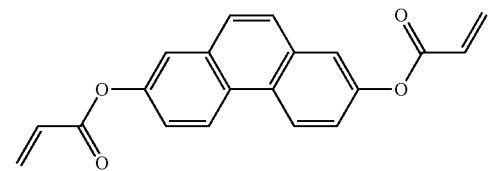 RM-36
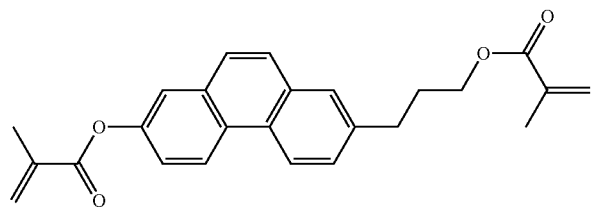 [SMILES: C=C(C)C(=O)OCCCc1ccc2c(ccc3cc(OC(=O)C(=C)C)ccc32)c1] RM-37
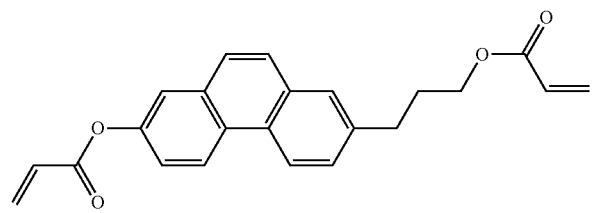 [SMILES: C=CC(=O)OCCCc1ccc2c(ccc3cc(OC(=O)C=C)ccc32)c1] RM-38
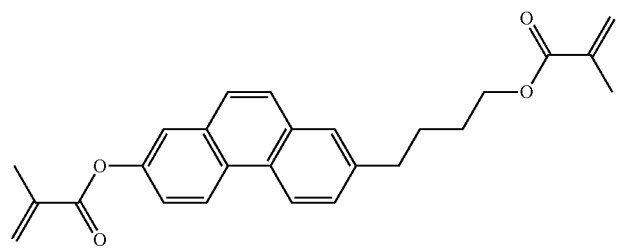 [SMILES: C=C(C)C(=O)OCCCCc1ccc2c(ccc3cc(OC(=O)C(=C)C)ccc32)c1] RM-39
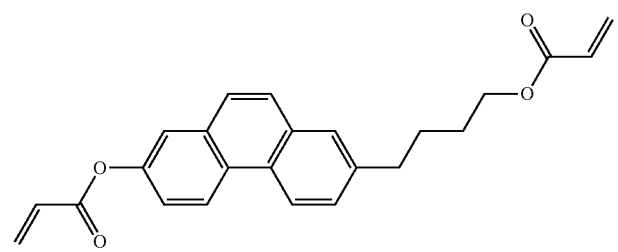 [SMILES: C=CC(=O)OCCCCc1ccc2c(ccc3cc(OC(=O)C=C)ccc32)c1] RM-40
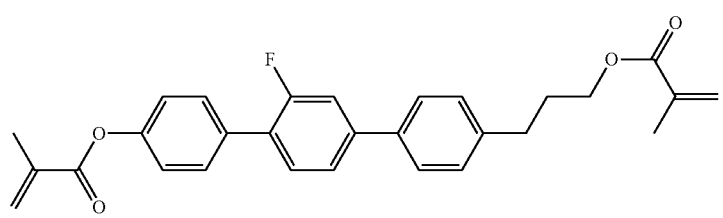 [SMILES: C=C(C)C(=O)OCCCc1ccc(-c2ccc(-c3ccc(OC(=O)C(=C)C)cc3)c(F)c2)cc1] RM-41
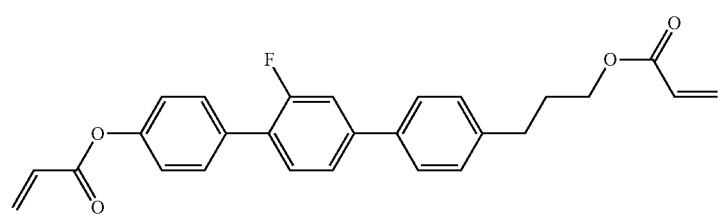 RM-42

TABLE D-continued
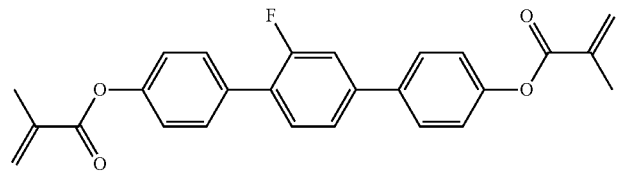 RM-43
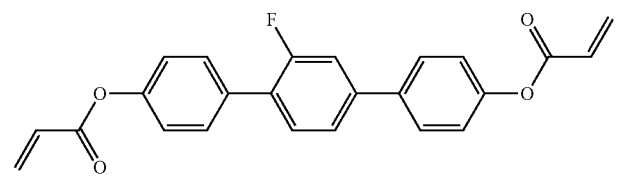 RM-44
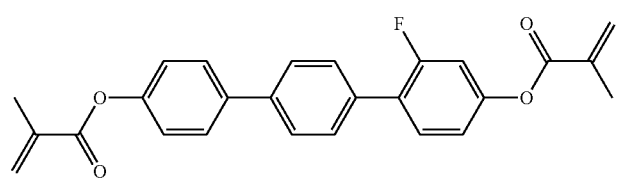 [SMILES: C=C(C)C(=O)Oc1ccc(-c2ccc(-c3ccc(OC(=O)C(=C)C)cc3)c(F)c2)cc1] RM-45
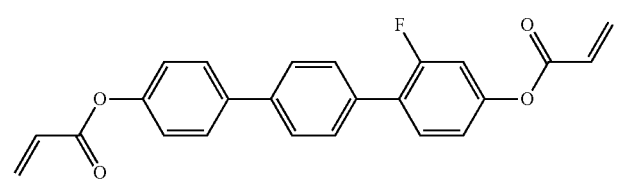 [SMILES: C=CC(=O)Oc1ccc(-c2ccc(-c3ccc(OC(=O)C=C)cc3F)cc2)cc1] RM-46
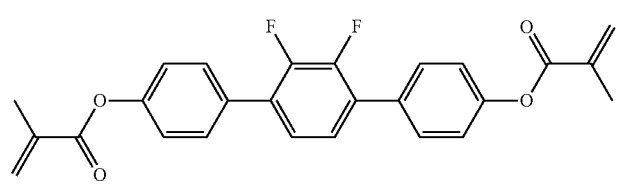 [SMILES: C=C(C)C(=O)Oc1ccc(-c2ccc(-c3ccc(OC(=O)C(=C)C)cc3)c(F)c2F)cc1] RM-47
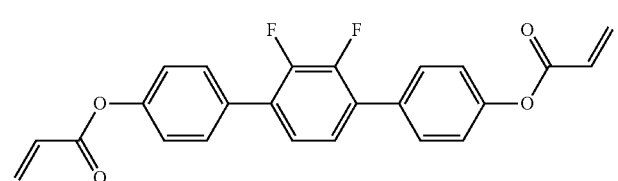 RM-48
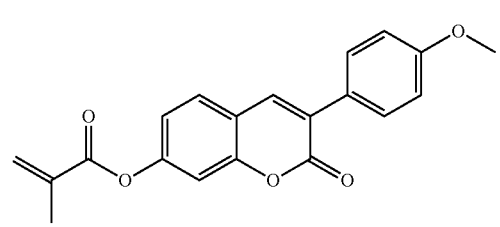 [SMILES: C=C(C)C(=O)Oc1ccc2cc(-c3ccc(OC)cc3)c(=O)oc2c1] RM-49
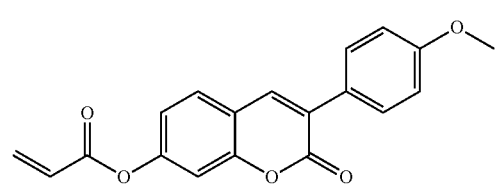 [SMILES: C=CC(=O)Oc1ccc2cc(-c3ccc(OC)cc3)c(=O)oc2c1] RM-50

TABLE D-continued
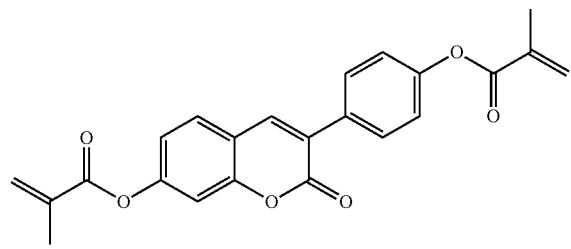 [SMILES: C=C(C)C(=O)Oc1ccc(-c2cc3ccc(OC(=O)C(=C)C)cc3oc2=O)cc1] RM-51
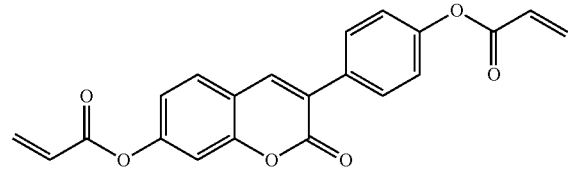 [SMILES: C=CC(=O)Oc1ccc(-c2cc3ccc(OC(=O)C=C)cc3oc2=O)cc1] RM-52
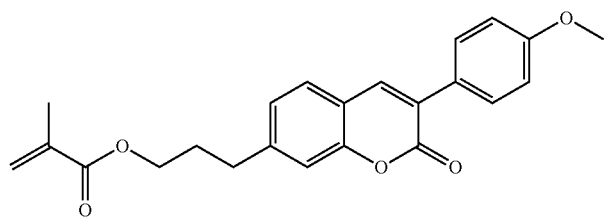 [SMILES: C=C(C)C(=O)OCCCc1ccc2cc(-c3ccc(OC)cc3)c(=O)oc2c1] RM-53
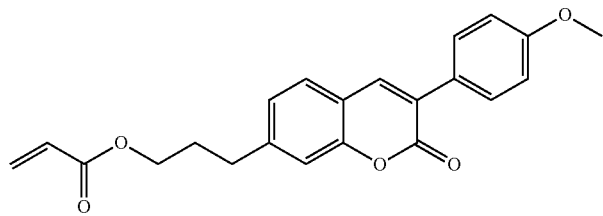 [SMILES: C=CC(=O)OCCCc1ccc2cc(-c3ccc(OC)cc3)c(=O)oc2c1] RM-54
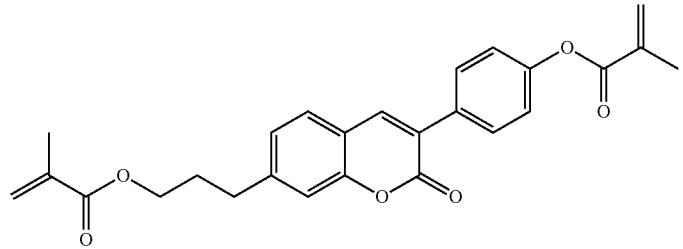 [SMILES: C=C(C)C(=O)OCCCc1ccc2cc(-c3ccc(OC(=O)C(=C)C)cc3)c(=O)oc2c1] RM-55
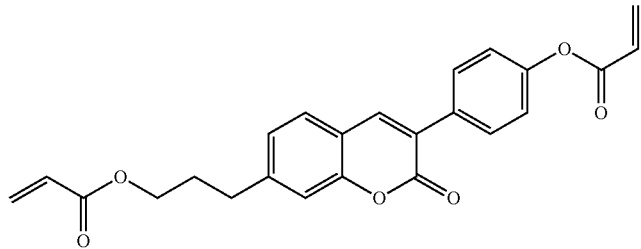 [SMILES: C=CC(=O)OCCCc1ccc2cc(-c3ccc(OC(=O)C=C)cc3)c(=O)oc2c1] RM-56
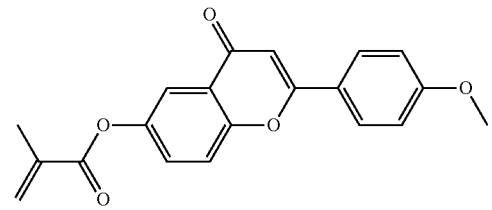 RM-57

TABLE D-continued
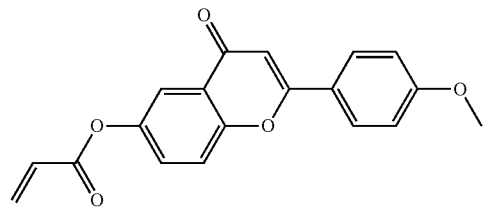 [SMILES: C=CC(=O)Oc1ccc2oc(-c3ccc(OC)cc3)cc(=O)c2c1] RM-58
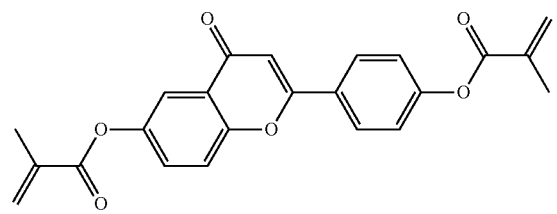 [SMILES: C=C(C)C(=O)Oc1ccc(-c2cc(=O)c3cc(OC(=O)C(=C)C)ccc3o2)cc1] RM-59
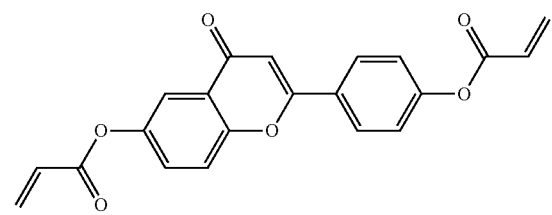 [SMILES: C=CC(=O)Oc1ccc(-c2cc(=O)c3cc(OC(=O)C=C)ccc3o2)cc1] RM-60
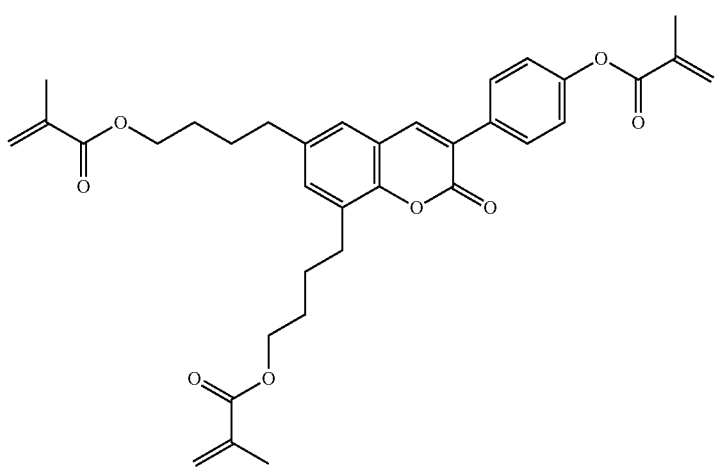 [SMILES: C=C(C)C(=O)OCCCCc1cc(CCCCOC(=O)C(=C)C)c2oc(=O)c(-c3ccc(OC(=O)C(=C)C)cc3)cc2c1] RM-61
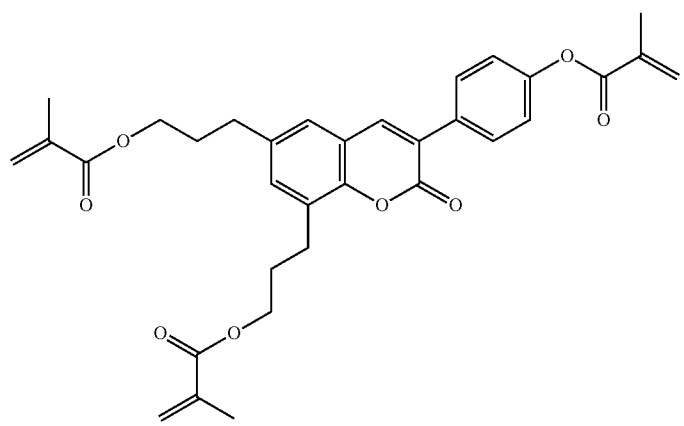 [SMILES: C=C(C)C(=O)OCCCc1cc(CCCOC(=O)C(=C)C)c2oc(=O)c(-c3ccc(OC(=O)C(=C)C)cc3)cc2c1] RM-62

TABLE D-continued
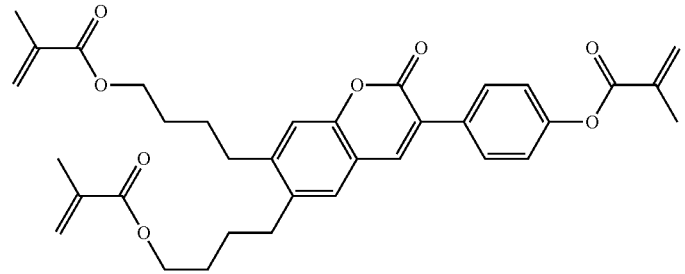 [SMILES: C=C(C)C(=O)OCCCCc1cc2cc(-c3ccc(OC(=O)C(=C)C)cc3)c(=O)oc2cc1CCCCOC(=O)C(=C)C]
RM-63
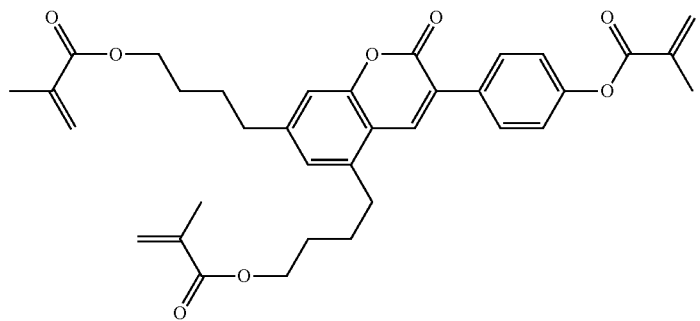 [SMILES: C=C(C)C(=O)OCCCCc1cc(CCCCOC(=O)C(=C)C)c2cc(-c3ccc(OC(=O)C(=C)C)cc3)c(=O)oc2c1]
RM-64
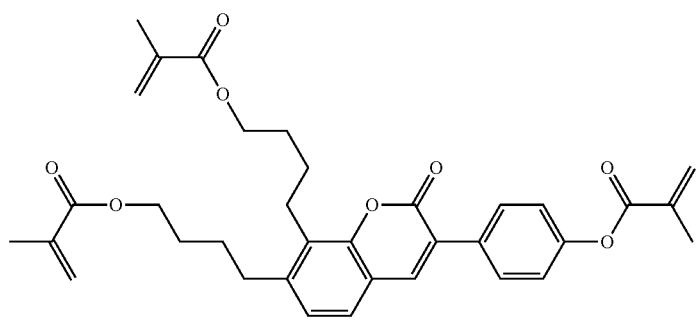 [SMILES: C=C(C)C(=O)OCCCCc1ccc2cc(-c3ccc(OC(=O)C(=C)C)cc3)c(=O)oc2c1CCCCOC(=O)C(=C)C]
RM-65
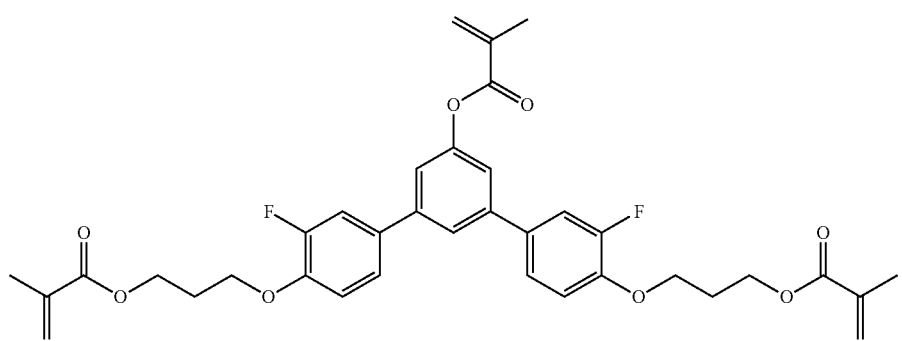 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-66
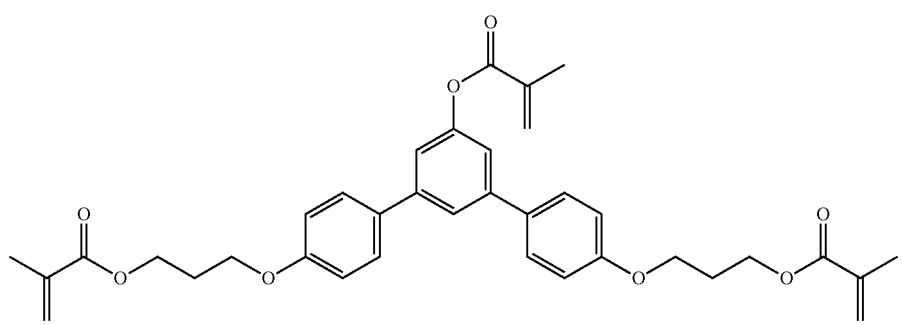 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-67

TABLE D-continued
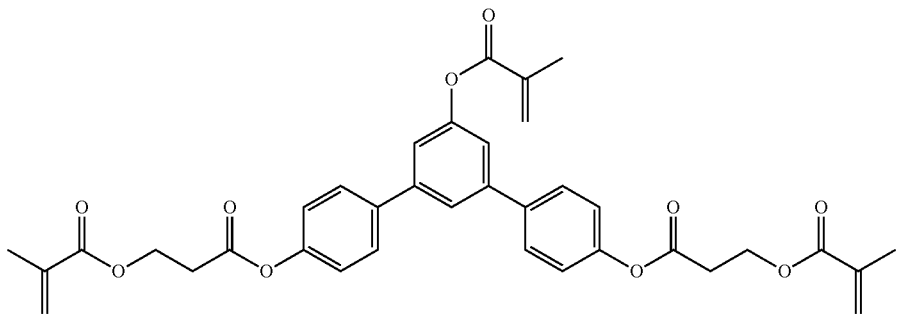 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-68
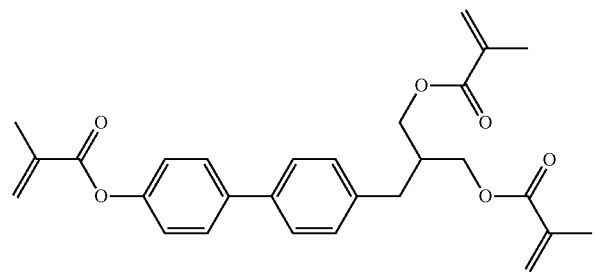 [SMILES: C=C(C)C(=O)OCC(COC(=O)C(=C)C)Cc1ccc(-c2ccc(OC(=O)C(=C)C)cc2)cc1]
RM-69
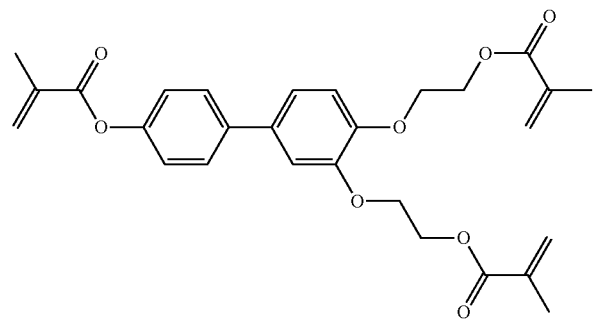 [SMILES: C=C(C)C(=O)OCCOc1ccc(-c2ccc(OC(=O)C(=C)C)cc2)cc1OCCOC(=O)C(=C)C]
RM-70
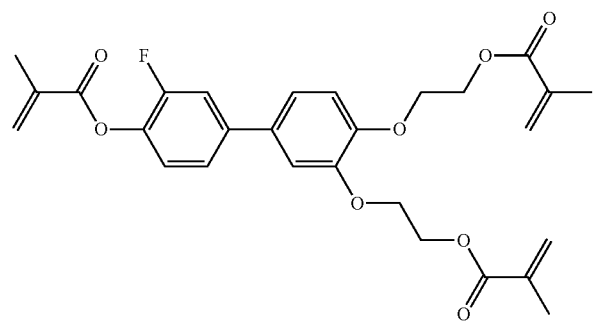 [SMILES: C=C(C)C(=O)OCCOc1ccc(-c2ccc(OC(=O)C(=C)C)c(F)c2)cc1OCCOC(=O)C(=C)C]
RM-71
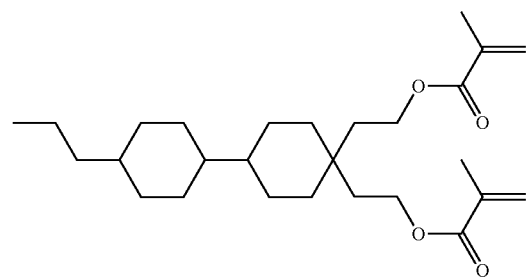 [SMILES: C=C(C)C(=O)OCCC1(CCOC(=O)C(=C)C)CCC(C2CCC(CCC)CC2)CC1]
RM-72

TABLE D-continued
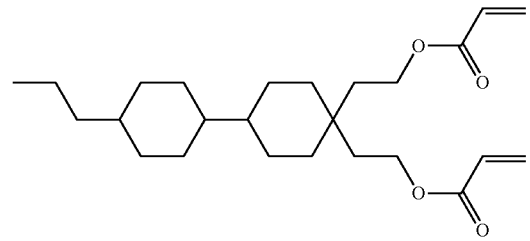 RM-73
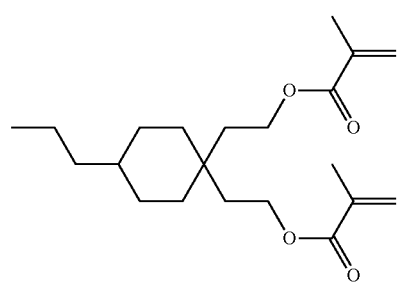 [SMILES: C=C(C)C(=O)OCCC1(CCOC(=O)C(=C)C)CCC(CCC)CC1] RM-74
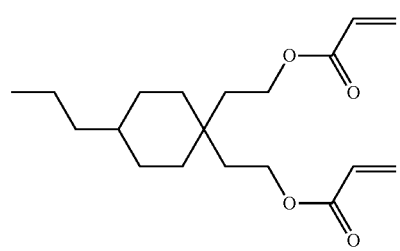 RM-75
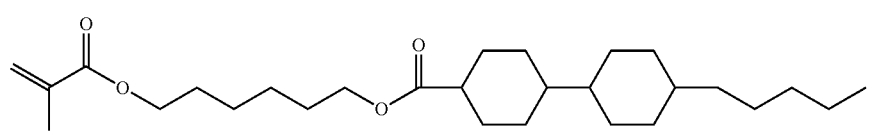 [SMILES: C=C(C)C(=O)OCCCCCCOC(=O)C1CCC(C2CCC(CCCCC)CC2)CC1] RM-76
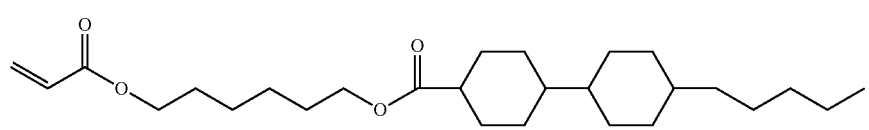 [SMILES: C=CC(=O)OCCCCCCOC(=O)C1CCC(C2CCC(CCCCC)CC2)CC1] RM-77
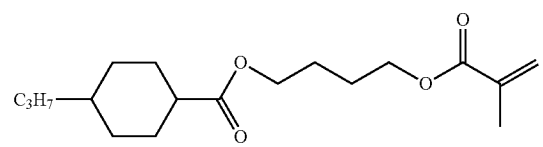 RM-78
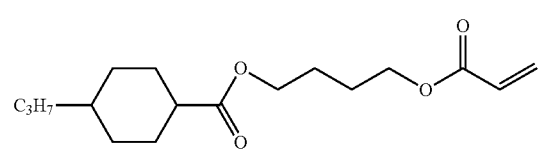 RM-79

TABLE D-continued
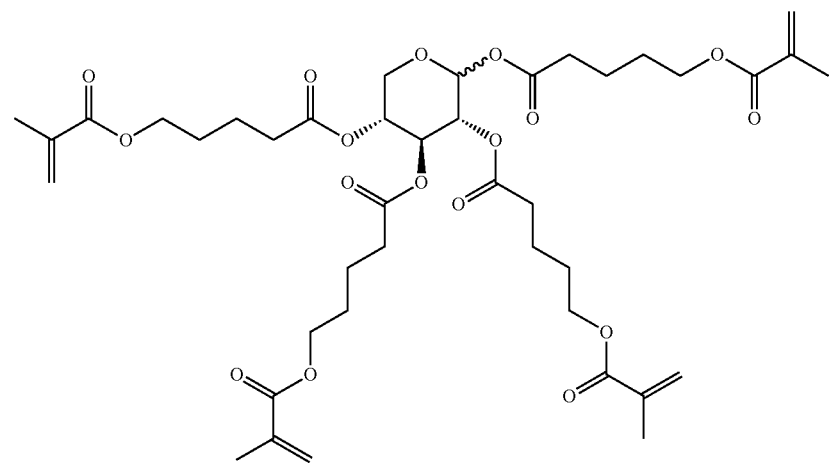 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-80
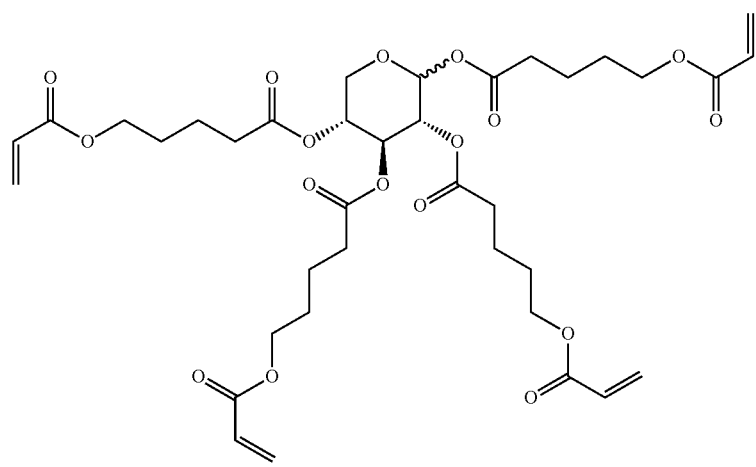 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-81
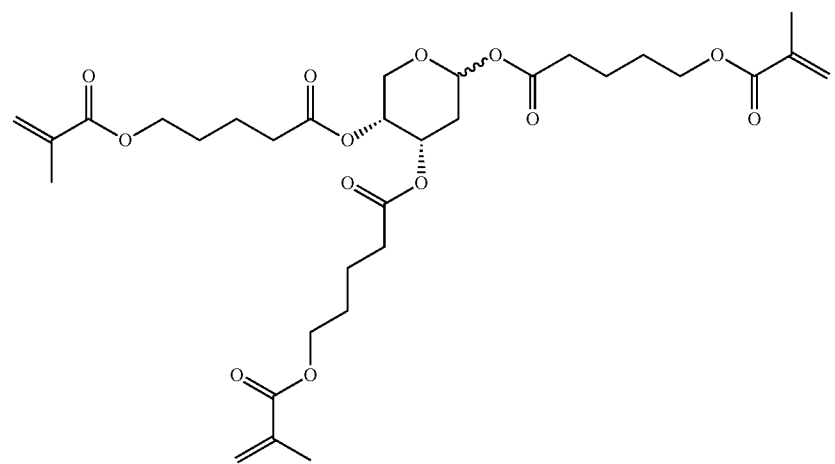 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-82

TABLE D-continued

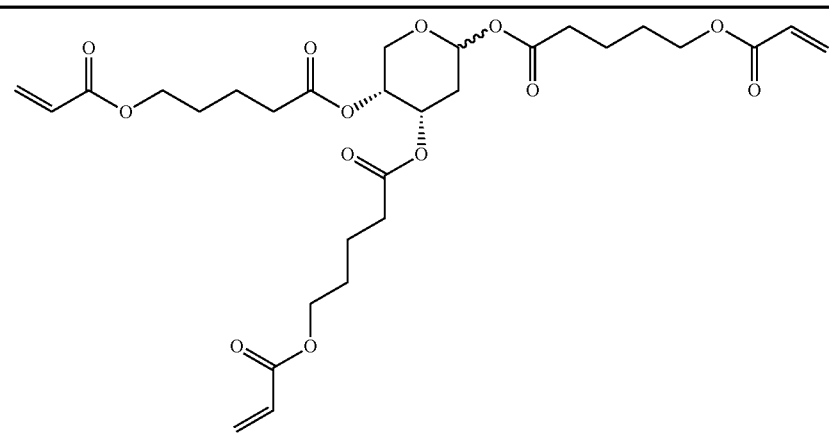
RM-83

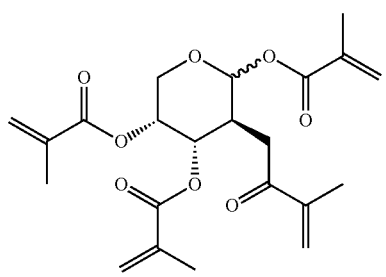 [SMILES: C=C(C)C(=O)C[C@@H]1C(OC(=O)C(=C)C)OC[C@@H](OC(=O)C(=C)C)[C@H]1OC(=O)C(=C)C]
RM-84

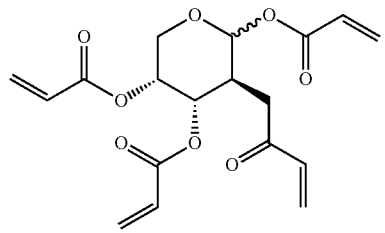 [SMILES: C=CC(=O)C[C@@H]1C(OC(=O)C=C)OC[C@@H](OC(=O)C=C)[C@H]1OC(=O)C=C]
RM-85

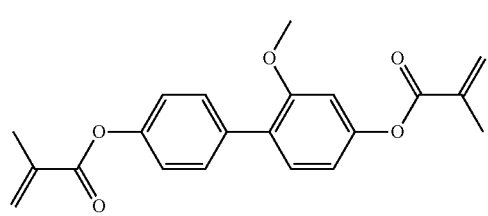 [SMILES: C=C(C)C(=O)Oc1ccc(-c2ccc(OC(=O)C(=C)C)cc2CC)cc1]
RM-86

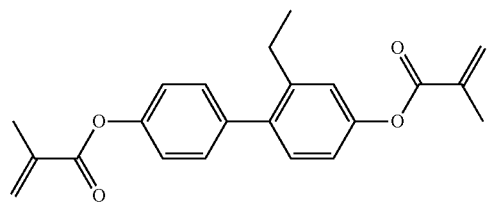
RM-87

Table D shows illustrative compounds which can preferably be used as reactive mesogenic compounds (polymerizable compounds) in the media according to the present invention.

WORKING EXAMPLES

The following examples are intended to explain the invention without restricting it. In the examples, m.p. denotes the melting point and C denotes the clearing point of a liquid-crystalline substance in degrees Celsius; boiling points are denoted by b.p. Furthermore:

C denotes crystalline solid state, S denotes smectic phase (the index denotes the phase type), N denotes nematic state, Ch denotes cholesteric phase, I denotes isotropic phase, $T_g$ denotes glass transition temperature. The number between two symbols indicates the conversion temperature in degrees Celsius.

The host mixture used for determination of the optical anisotropy Δn of the compounds of the formula I is the commercial mixture ZLI-4792 (Merck KGaA). The dielectric anisotropy $\Delta\epsilon$ is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below, $V_0$ denotes the threshold voltage, capacitive [V] at 20° C.

$\Delta n$ denotes the optical anisotropy measured at 20° C. and 589 nm $\Delta\epsilon$ denotes the dielectric anisotropy at 20° C. and 1 kHz cl.p. denotes the clearing point [° C.]

$K_1$ denotes the elastic constant, "splay" deformation at 20° C. [pN]

$K_3$ denotes the elastic constant, "bend" deformation at 20° C. [pN]

$\gamma_1$ denotes the rotational viscosity measured at 20° C. [mPa·s], determined by the rotation method in a magnetic field LTS denotes the low-temperature stability (nematic phase), determined in test cells.

The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

Mixture Examples

Comparative Example V1

| CC-3-V | 34.50% | Clearing point [° C.]: | 75.5 |
|---|---|---|---|
| CC-3-V1 | 8.00% | $\Delta n$ [589 nm, 20° C.]: | 0.1077 |
| CCY-3-O1 | 6.00% | $\Delta\epsilon$ [1 kHz, 20° C.]: | −3.0 |
| CCY-3-O2 | 10.00% | $\epsilon_\parallel$ [1 kHz, 20° C.]: | 3.5 |
| CCY-4-O2 | 5.00% | $K_1$ [pN, 20° C.]: | 13.9 |
| CPY-3-O2 | 11.50% | $K_3$ [pN, 20° C.]: | 15.7 |
| PY-3-O2 | 20.00% | $\gamma_1$ [mPa · s, 20° C.]: | 88 |
| PYP-2-3 | 5.00% | $V_0$ [20° C., V]: | 2.41 |
|  |  | $\gamma_1/K_3$: | 5.61 |

Example M1

| CC-3-V | 34.50% | Clearing point [° C.]: | 74.5 |
|---|---|---|---|
| CC-3-V1 | 8.00% | $\Delta n$ [589 nm, 20° C.]: | 0.1084 |
| CCY-3-O1 | 4.00% | $\Delta\epsilon$ [1 kHz, 20° C.]: | −3.0 |
| CCY-3-O2 | 11.00% | $\epsilon_\parallel$ [1 kHz, 20° C.]: | 3.5 |
| CCY-4-O2 | 5.00% | $K_1$ [pN, 20° C.]: | 13.6 |
| CPY-3-O2 | 11.00% | $K_3$ [pN, 20° C.]: | 15.5 |
| PY-3-O2 | 11.50% | $\gamma_1$ [mPa · s, 20° C.]: | 83 |
| PYP-2-3 | 5.00% | $V_0$ [20° C., V]: | 2.40 |
| PY-V2-O2 | 10.00% | $\gamma_1/K_3$: | 5.35 |

Mixture M1 according to the invention comprising the compound PY-V2-O2 of the formula I has a significantly lower value for the ratio $\gamma_1/K_3$ than the comparative mixture V1.

Example M2

| CC-3-V | 34.50% | Clearing point [° C.]: | 75.0 |
|---|---|---|---|
| CC-3-V1 | 8.00% | $\Delta n$ [589 nm, 20° C.]: | 0.1080 |
| CCY-3-O1 | 5.50% | $\Delta\epsilon$ [1 kHz, 20° C.]: | −3.1 |
| CCY-3-O2 | 10.00% | $\epsilon_\parallel$ [1 kHz, 20° C.]: | 3.5 |
| CCY-V-O2 | 6.00% | $K_1$ [pN, 20° C.]: | 13.9 |
| CPY-3-O2 | 11.50% | $K_3$ [pN, 20° C.]: | 15.9 |
| PY-3-O2 | 19.60% | $\gamma_1$ [mPa · s, 20° C.]: | 86 |
| PYP-2-3 | 5.00% | $V_0$ [20° C., V]: | 2.40 |
|  |  | $\gamma_1/K_3$: | 5.41 |

Mixture M2 according to the invention comprising the compound CCY-V-O2 of the formula I has a significantly lower value for the ratio $\gamma_1/K_3$ than the comparative mixture V1.

Example M3

| CC-3-V | 34.50% | Clearing point [° C.]: | 74.5 |
|---|---|---|---|
| CC-3-V1 | 8.00% | $\Delta n$ [589 nm, 20° C.]: | 0.1075 |
| CCY-3-O1 | 5.00% | $\Delta\epsilon$ [1 kHz, 20° C.]: | −2.9 |
| CCY-3-O2 | 11.00% | $\epsilon_\parallel$ [1 kHz, 20° C.]: | 3.5 |
| CCY-4-O2 | 6.00% | $K_1$ [pN, 20° C.]: | 13.5 |
| CPY-V-O2 | 5.00% | $K_3$ [pN, 20° C.]: | 15.1 |
| CPY-V-O4 | 5.00% | $\gamma_1$ [mPa · s, 20° C.]: | 81 |
| PY-3-O2 | 9.00% | $V_0$ [20° C., V]: | 2.42 |
| PYP-2-3 | 10.00% | $\gamma_1/K_3$: | 5.36 |
| PY-V2-O2 | 5.00% |  |  |
| PP-1-2V1 | 1.50% |  |  |

Mixture M3 according to the invention comprising the compounds PY-V2-O2, CPY-V-O2 and CPY-V-O4 of the formula I has a significantly lower value for the ratio $\gamma_1/K_3$ than the comparative mixture V1.

Example M4

| CC-3-V | 35.00% | Clearing point [° C.]: | 75.0 |
|---|---|---|---|
| CC-3-V1 | 8.00% | $\Delta n$ [589 nm, 20° C.]: | 0.1078 |
| CCY-3-O1 | 4.00% | $\Delta\epsilon$ [1 kHz, 20° C.]: | −3.0 |
| CCY-3-O2 | 11.00% | $\epsilon_\parallel$ [1 kHz, 20° C.]: | 3.5 |
| CCY-V-O2 | 6.00% | $K_1$ [pN, 20° C.]: | 13.7 |
| CPY-3-O2 | 11.00% | $K_3$ [pN, 20° C.]: | 15.9 |
| PY-3-O2 | 10.50% | $\gamma_1$ [mPa · s, 20° C.]: | 82 |
| PY-V2-O2 | 10.00% | $V_0$ [20° C., V]: | 2.42 |
| PYP-2-3 | 4.00% | $\gamma_1/K_3$: | 5.16 |

Mixture M4 according to the invention comprising the compounds PY-V2-O2 and CCY-V-O2 of the formula I has a significantly lower value for the ratio $\gamma_1/K_3$ than the comparative mixture V1.

Example M5

| CC-3-V | 34.50% | Clearing point [° C.]: | 74.5 |
|---|---|---|---|
| CC-3-V1 | 8.00% | $\Delta n$ [589 nm, 20° C.]: | 0.1076 |
| CCY-3-O1 | 6.00% | $\Delta\epsilon$ [1 kHz, 20° C.]: | −2.9 |

-continued

| | | | |
|---|---|---|---|
| CCY-3-O2 | 11.50% | ε∥ [1 kHz, 20° C.]: | 3.5 |
| CCY-4-O2 | 6.00% | K₁ [pN, 20° C.]: | 13.4 |
| CPY-V-O2 | 4.50% | K₃ [pN, 20° C.]: | 15.3 |
| CPY-V-O4 | 4.50% | γ₁ [mPa·s, 20° C.]: | 80 |
| PY-3-O2 | 8.50% | V₀ [20° C., V]: | 2.42 |
| PYP-2-3 | 10.00% | γ₁/K₃: | 5.23 |
| PY-V2-O2 | 5.00% | | |
| PP-1-2V1 | 1.50% | | |

Mixture M5 according to the invention comprising the compounds PY-V2-O2, CPY-V-O2 and CPY-V-O4 of the formula I has a significantly lower value for the ratio γ₁/K₃ than the comparative mixture V1.

Example M6

| | | | |
|---|---|---|---|
| CC-3-V | 38.50% | Clearing point [° C.]: | 74.5 |
| CC-3-V1 | 7.00% | Δn [589 nm, 20° C.]: | 0.1079 |
| CCY-3-O2 | 10.50% | Δε [1 kHz, 20° C.]: | -2.9 |
| CPY-3-O2 | 4.00% | ε∥ [1 kHz, 20° C.]: | 3.5 |
| PY-3-O2 | 11.50% | K₁ [pN, 20° C.]: | 13.4 |
| PGIY-2-O4 | 5.00% | K₃ [pN, 20° C.]: | 15.2 |
| PP-1-2V1 | 1.50% | γ₁ [mPa·s, 20° C.]: | 77 |
| PY-V2-O2 | 5.00% | V₀ [20° C., V]: | 2.43 |
| CPY-V-O2 | 6.00% | γ₁/K₃: | 5.07 |
| CPY-V-O4 | 5.00% | | |
| CCY-V-O2 | 6.00% | | |

Mixture M6 according to the invention comprising the compounds PY-V2-O2, CPY-V-O2, CPY-V-O4 and CCY-V-O2 of the formula I has a significantly lower value for the ratio γ₁/K₃ than the comparative mixture V1.

Example M7

| | | | |
|---|---|---|---|
| CC-3-V | 42.00% | Clearing point [° C.]: | 75.0 |
| CCY-3-O1 | 9.00% | Δn [589 nm, 20° C.]: | 0.0994 |
| CCY-3-O2 | 10.00% | Δε [1 kHz, 20° C.]: | -3.3 |
| CCY-V-O2 | 9.00% | ε∥ [1 kHz, 20° C.]: | 3.6 |
| CPY-V-O2 | 6.50% | K₁ [pN, 20° C.]: | 12.8 |
| CPY-V-O4 | 4.00% | K₃ [pN, 20° C.]: | 15.1 |
| CY-3-O2 | 0.50% | γ₁ [mPa·s, 20° C.]: | 79 |
| PY-3-O2 | 9.00% | V₀ [20° C., V]: | 2.26 |
| PY-V2-O2 | 10.00% | γ₁/K₃: | 5.23 |

Mixture M7 according to the invention comprising the compounds PY-V2-O2, CPY-V-O2, CPY-V-O4 and CCY-V-O2 of the formula I has a significantly lower value for the ratio γ₁/K₃ than the comparative mixture V1.

Example P1

For the preparation of a PS-VA mixture, 99.7% of the mixture according to Example M1 is mixed with 0.3% of the polymerizable compound of the formula

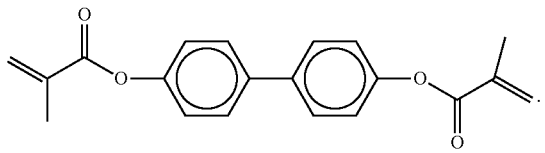

The PS-VA mixture is introduced into a cell having homeotropic alignment. After application of a voltage of 24 V, the cell is irradiated with UV light having a power of 100 mW/cm².

Example M8

| | | | |
|---|---|---|---|
| CC-3-V | 36.00% | Clearing point [° C.]: | 75.0 |
| CC-3-V1 | 8.50% | Δn [589 nm, 20° C.]: | 0.1094 |
| CLY-3-O2 | 6.00% | Δε [1 kHz, 20° C.]: | -3.0 |
| CPY-3-O2 | 4.00% | ε∥ [1 kHz, 20° C.]: | 3.5 |
| CPY-2-O2 | 8.00% | ε⊥ [1 kHz, 20° C.]: | 6.5 |
| PY-4-O2 | 5.00% | K₁ [pN, 20° C.]: | 13.0 |
| PYP-2-3 | 3.00% | K₃ [pN, 20° C.]: | 14.5 |
| PGIY-2-O4 | 5.00% | γ₁ [mPa·s, 20° C.]: | 82 |
| CPY-V-O2 | 8.00% | V₀ [20° C., V]: | 2.34 |
| CPY-V-O4 | 6.00% | γ₁/K₃: | 5.65 |
| CY-3-O2 | 10.50% | | |

Example M9

| | | | |
|---|---|---|---|
| CC-3-V | 35.50% | Clearing point [° C.]: | 74.0 |
| CC-3-V1 | 9.00% | Δn [589 nm, 20° C.]: | 0.1070 |
| CCY-3-O1 | 7.00% | Δε [1 kHz, 20° C.]: | -3.1 |
| CLY-3-O2 | 5.00% | ε∥ [1 kHz, 20° C.]: | 3.5 |
| PY-3-O2 | 8.00% | ε⊥ [1 kHz, 20° C.]: | 6.7 |
| PYP-2-3 | 3.00% | K₁ [pN, 20° C.]: | 13.1 |
| PGIY-2-O4 | 5.00% | K₃ [pN, 20° C.]: | 14.9 |
| CPY-V-O4 | 5.00% | γ₁ [mPa·s, 20° C.]: | 80 |
| CPY-V-O2 | 5.00% | V₀ [20° C., V]: | 2.31 |
| CCY-V-O2 | 8.00% | γ₁/K₃: | 5.34 |
| PY-V2-O2 | 6.00% | LTS bulk [-25° C.]: | >1000 h |
| CY-3-O2 | 4.50% | | |

Example P2

For the preparation of a PS-VA mixture, 99.7% of the mixture according to Example M9 is mixed with 0.3% of the polymerizable compound of the formula

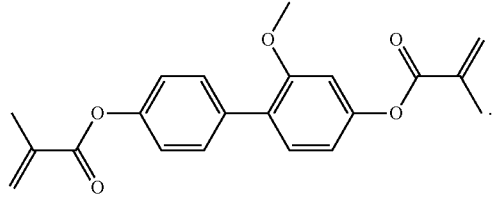 [SMILES: C=C(C)C(=O)Oc1ccc(-c2ccc(OC(=O)C(=C)C)cc2OC)cc1]

The PS-VA mixture is introduced into a cell having homeotropic alignment. After application of a voltage of 24 V, the cell is irradiated with UV light having a power of 100 mW/cm².

Example M10

| | | | |
|---|---|---|---|
| CY-3-O2 | 14.00% | Clearing point [° C.]: | 86.5 |
| CY-3-O4 | 6.00% | Δn [589 nm, 20° C.]: | 0.1024 |
| CCY-3-O1 | 8.50% | Δε [1 kHz, 20° C.]: | -5.0 |
| CCY-3-O2 | 11.00% | ε∥ [1 kHz, 20° C.]: | 3.9 |
| CCY-4-O2 | 8.50% | ε⊥ [1 kHz, 20° C.]: | 8.9 |
| CPY-3-O2 | 4.50% | K₁ [pN, 20° C.]: | 13.8 |

149
-continued

| | | | |
|---|---|---|---|
| CC-3-V | 25.00% | $K_3$ [pN, 20° C.]: | 16.9 |
| PY-V2-O2 | 5.50% | $\gamma_1$ [mPa · s, 20° C.]: | 146 |
| CPY-V-O2 | 6.00% | $V_0$ [20° C., V]: | 1.95 |
| CPY-V-O4 | 5.00% | $\gamma_1/K_3$: | 8.64 |
| CCY-V-O2 | 6.00% | LTS bulk [−25° C.]: | >1000 h |

Example M11

| | | | |
|---|---|---|---|
| CC-3-V | 33.00% | Clearing point [° C.]: | 74.5 |
| CC-3-V1 | 8.00% | Δn [589 nm, 20° C.]: | 0.1097 |
| CCY-3-O2 | 11.50% | Δε [1 kHz, 20° C.]: | −3.5 |
| CCY-V-O2 | 6.00% | $\varepsilon_\parallel$ [1 kHz, 20° C.]: | 3.6 |
| CPY-3-O2 | 11.00% | $\varepsilon_\perp$ [1 kHz, 20° C.]: | 7.1 |
| CLY-3-O2 | 5.00% | $K_1$ [pN, 20° C.]: | 14.2 |
| PY-1-O4 | 6.00% | $K_3$ [pN, 20° C.]: | 16.5 |
| PY-3-O2 | 11.00% | $\gamma_1$ [mPa · s, 20° C.]: | 91 |
| PY-1-O2 | 5.00% | $V_0$ [20° C., V]: | 2.29 |
| PGIY-2-O4 | 3.00% | $\gamma_1/K_3$: | 5.52 |
| PP-1-2V1 | 0.50% | | |

Example P3

For the preparation of a PS-VA mixture, 99.7% of the mixture according to Example M11 is mixed with 0.25% of the polymerizable compound of the formula

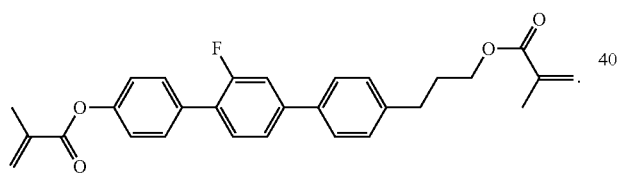

The PS-VA mixture is introduced into a cell having homeotropic alignment. After application of a voltage of 24 V, the cell is irradiated with UV light having a power of 100 mW/cm².

Example M12

| | | | |
|---|---|---|---|
| CC-3-V | 34.50% | Clearing point [° C.]: | 74 |
| CC-3-V1 | 8.00% | Δn [589 nm, 20° C.]: | 0.1079 |
| CCY-3-O2 | 11.50% | Δε [1 kHz, 20° C.]: | −3.3 |
| CCY-V-O2 | 6.00% | $\varepsilon_\parallel$ [1 kHz, 20° C.]: | 3.6 |
| CPY-V-O2 | 6.00% | $\varepsilon_\perp$ [1 kHz, 20° C.]: | 6.9 |
| CPY-V-O4 | 5.50% | $K_1$ [pN, 20° C.]: | 13.7 |
| CLY-3-O2 | 5.00% | $K_3$ [pN, 20° C.]: | 15.7 |
| PY-1-O4 | 3.50% | $\gamma_1$ [mPa · s, 20° C.]: | 84 |
| PY-3-O2 | 11.00% | $V_0$ [20° C., V]: | 2.30 |
| PY-1-O2 | 5.00% | $\gamma_1/K_3$: | 5.35 |
| PGIY-2-O4 | 3.00% | | |
| PP-1-2V1 | 1.00% | | |

Example M13

LC mixture M12 is additionally stabilized with 0.02% of 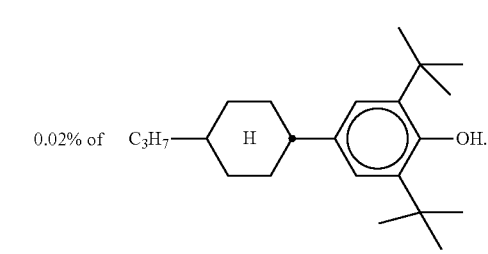

Example M14

| | | | |
|---|---|---|---|
| CC-3-V | 32.00% | Clearing point [° C.]: | 84.50 |
| CPY-2-O2 | 11.00% | Δn [589 nm, 20° C.]: | 0.1084 |
| CPY-3-O2 | 11.00% | Δε [1 kHz, 20° C.]: | −4.5 |
| CCY-V-O2 | 10.00% | $\varepsilon_\parallel$ [1 kHz, 20° C.]: | 3.8 |
| CCY-V-O4 | 11.00% | $\varepsilon_\perp$ [1 kHz, 20° C.]: | 8.3 |
| CAIY-3-O2 | 8.50% | $K_1$ [pN, 20° C.]: | 14.1 |
| CEY-3-O2 | 4.00% | $K_3$ [pN, 20° C.]: | 16.4 |
| PY-3-O2 | 12.50% | $\gamma_1$ [mPa · s, 20° C.]: | 131 |
| | | $V_0$ [20° C., V]: | 2.01 |
| | | $\gamma_1/K_3$: | 7.99 |

Example M15

LC mixture M14 is additionally stabilized with 0.01% of 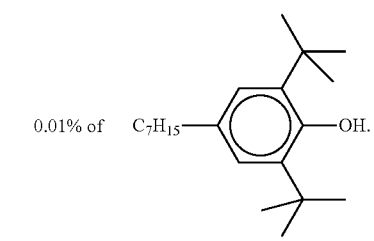

Example M16

| | | | |
|---|---|---|---|
| CC-3-V | 32.00% | Clearing point [° C.]: | 86 |
| CPY-2-O2 | 11.00% | Δn [589 nm, 20° C.]: | 0.1113 |
| CPY-3-O2 | 11.00% | Δε [1 kHz, 20° C.]: | −4.6 |
| CCY-V-O2 | 10.00% | $\varepsilon_\parallel$ [1 kHz, 20° C.]: | 3.9 |
| CCY-V-O4 | 10.00% | $\varepsilon_\perp$ [1 kHz, 20° C.]: | 8.4 |
| CAIY-3-O2 | 11.00% | $K_1$ [pN, 20° C.]: | 14.1 |
| PY-3-O2 | 15.00% | $K_3$ [pN, 20° C.]: | 16.4 |
| | | $\gamma_1$ [mPa · s, 20° C.]: | 137 |
| | | $V_0$ [20° C., V]: | 2.00 |
| | | $\gamma_1/K_3$: | 8.35 |

Example M17

LC mixture M16 is additionally stabilized with 0.01% of 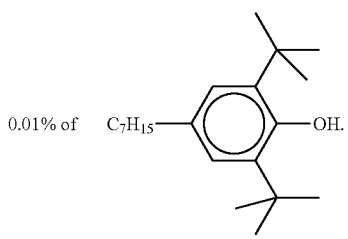

Example M18

LC mixture M11 is additionally stabilized with 0.02% of 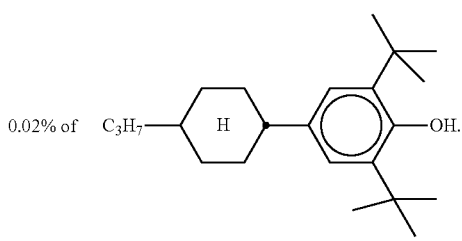

Example M19

LC mixture M12 is additionally stabilized with 0.01% of 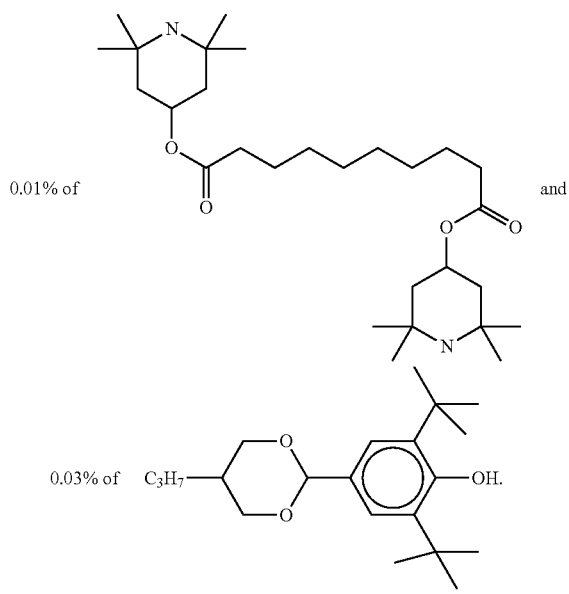 and 0.03% of Without further elaboration, it is believed that one skilled in the art can, using the preceding description, utilize the present invention to its fullest extent. The preceding preferred specific embodiments and examples are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German application No. 102014012641.2, filed Aug. 22, 2014, are incorporated by reference herein.

The invention claimed is:

1. A liquid-crystalline medium comprising:
   (a) one or more compounds of formula I1,

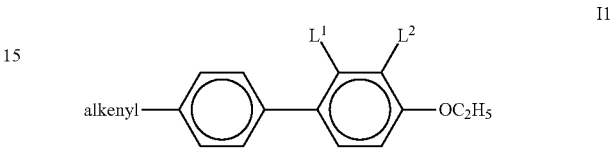

in which
   alkenyl denotes $CH_2=CH-CH_2-CH_2-$, and
   $L^1$ and $L^2$ each, independently of one another, denote F or Cl,
wherein the amount of compounds of formula I1 in the medium is ≥5%;
   (b) one or more compounds selected from the compounds of formulae I 3 and one or more compounds selected from the compounds of formulae I4,

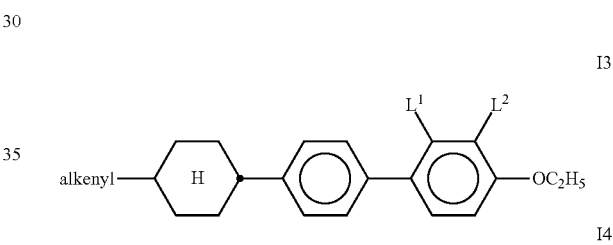

in which
   alkenyl denotes $CH_2=CH-$, and
   $L^1$ and $L^2$ each, independently of one another, denote F or Cl,
wherein the amount of compounds of formula I13 in the medium is ≥5% and the amount of compounds of formula I4 in the medium is ≥6%;
   (c) optionally one or more compounds selected from the compounds of formula I2,

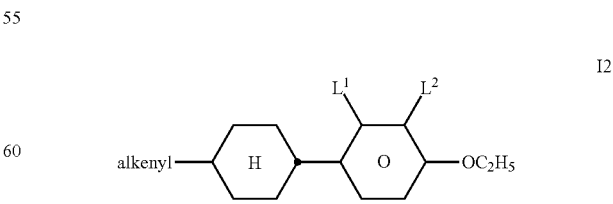

in which
   alkenyl denotes $CH_2=CH-$, and
   $L^1$ and $L^2$ each, independently of one another, denote F or Cl;

the compound of formula CC-n-V

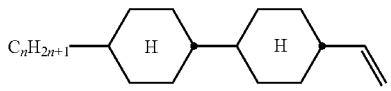

wherein n is 3, in an amount of ≥30% by weight of based on the mixture as a whole, and (d) one or more compounds selected from formulae L-1 to L-11, EY, and T-1 to T-21:

L-1
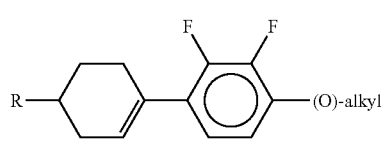

L-2
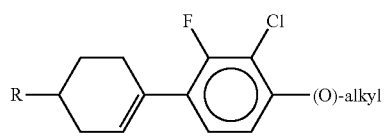

L-3
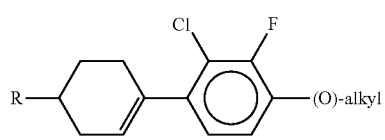

L-4
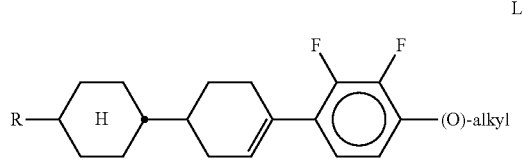

L-5
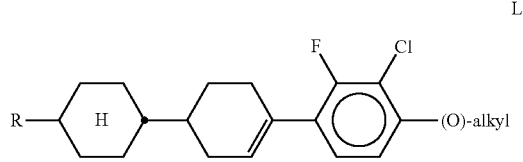

L-6
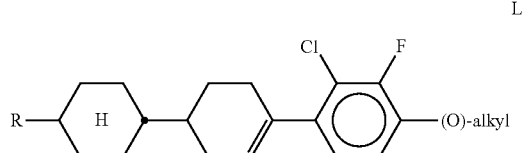

L-7
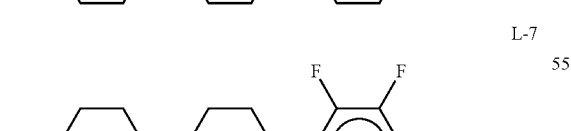

L-8
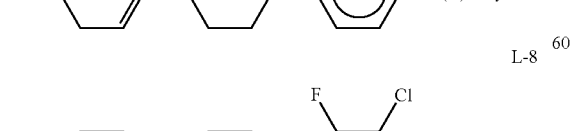

L-9
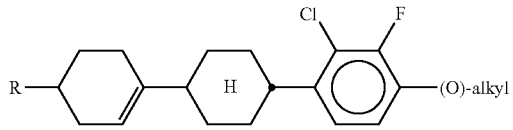

L-10
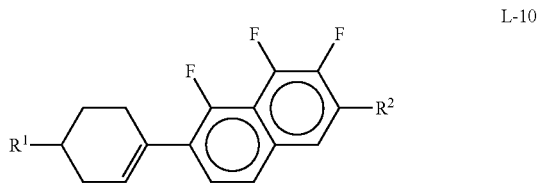

L-11
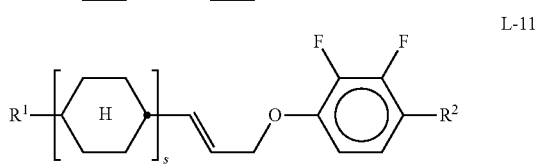

in which

R, $R^1$ and $R^2$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

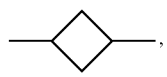

—C≡—, —$CF_2$O—, —$OCF_2$—, —OC—O— or —O—CO— in such a way that O atoms are not linked directly to one another, (O) denotes —O— or a single bond, alkyl denotes an alkyl radical having 1-6 C atoms, and s denotes 1 or 2;

EY
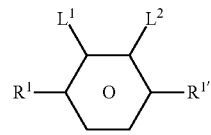

in which $R^1$ denotes H, an alkyl or alkenyl radical having up to 15 C atoms which is un-substituted, monosubstituted by CN or $CF_3$ or at least monosubstituted by halogen, where, in addition, one or more $CH_2$ groups in these radicals may each be replaced by —O—, —S—,

—C≡C—, —$CF_2$O—, —$OCF_2$—, —OC—O— or —O—CO— in such a way that O atoms are not linked directly to one another, $L^1$ and $L^2$ are each independently F or Cl, and $R^{1*}$ denotes H, an alkyl or alkenyl radical having up to 15 C atoms which is un-substituted, monosubstituted by CN or CF$_3$ or at least monosubstituted by halogen, where, in addition, one or more CH$_2$ groups in these radicals may each be replaced by —O—, —S—,
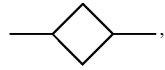
—C≡C—, —CF$_2$O—, —OCF$_2$—, —OC—O— or —O—CO— in such a way that O atoms are not linked directly to one another;
T-1
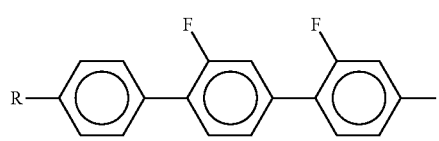
T-2
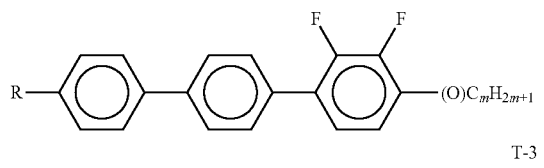
T-3
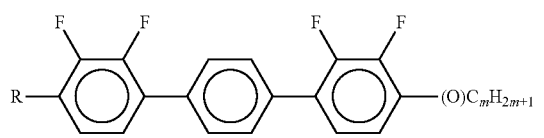
T-4
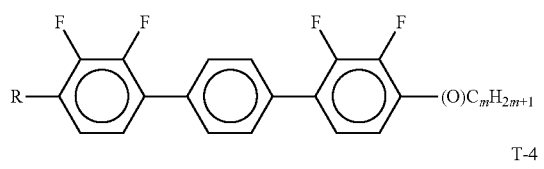
T-5
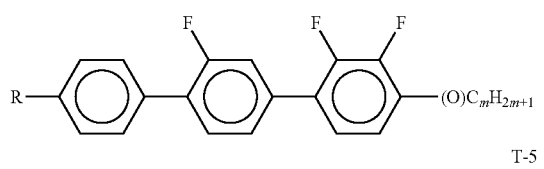
T-6
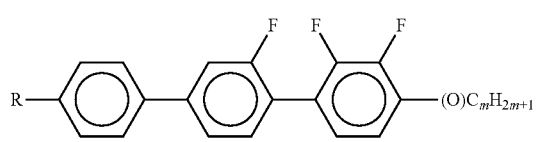
T-7
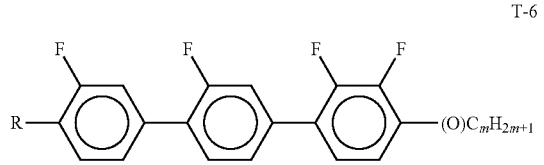
T-8
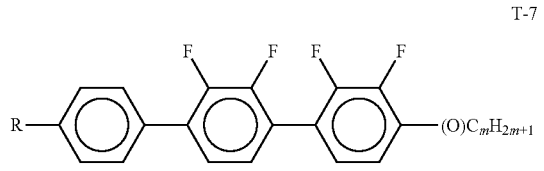
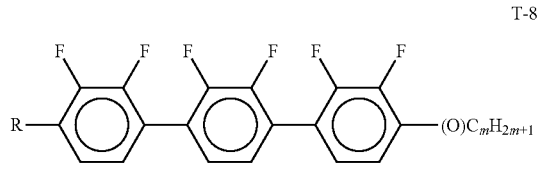
-continued
T-9
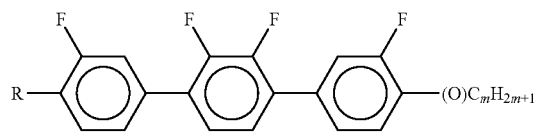
T-10
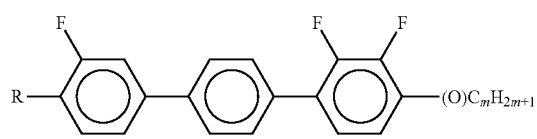
T-11
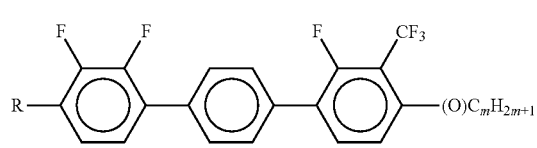
T-12
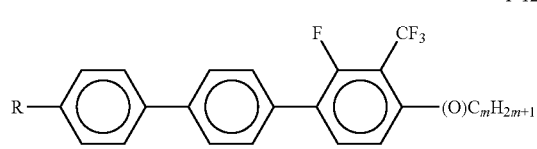
T-13
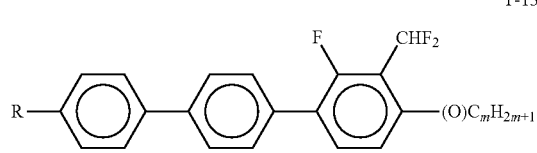
T-14
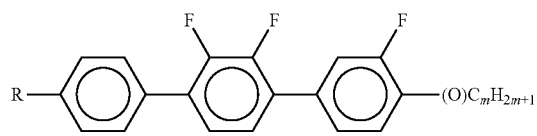
T-15
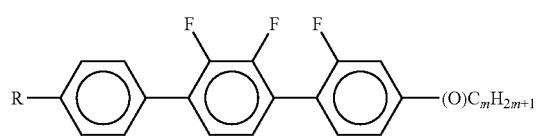
T-16
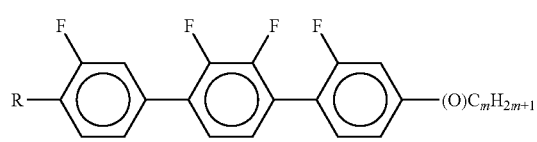
T-17
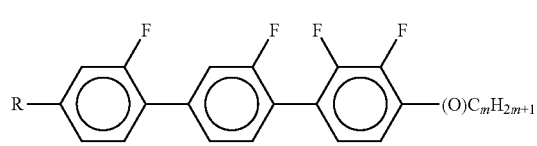
T-18

-continued

T-19

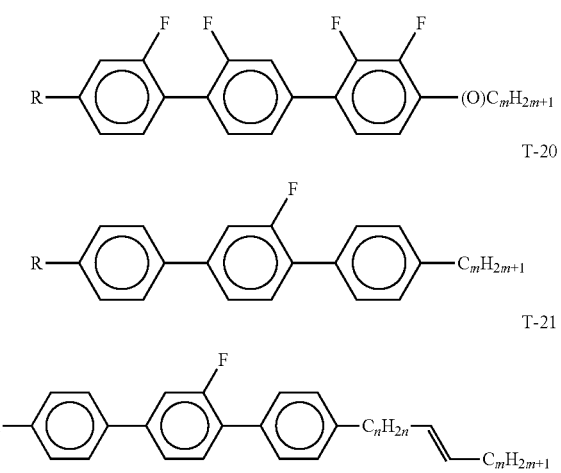

T-20

T-21 in which
R denotes a straight-chain alkyl or alkoxy radical having 1-7 C atoms,
(O) denotes —O— or a single bond,
m denotes 1-6, and
n denotes 0, 1, 2, 3 or 4.

2. A liquid-crystalline medium according to claim 1, wherein said medium contains one or more compounds of formula I2

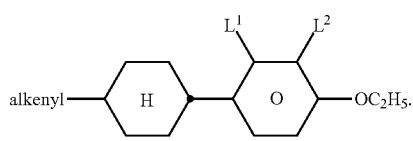

I2

3. A liquid-crystalline medium according to claim 1, further comprising one or more compounds of formula A,

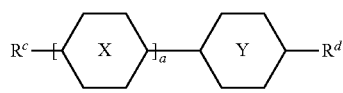

A in which
X and Y each, independently of one another, denote a trans-1,4-cyclohexylene radical or a 1,4-phenylene radical, which in each case is unsubstituted or substituted by one or two identical or different radicals $L^1$,
one of the radicals $R^c$ and $R^d$ denotes an alkenyl radical having 2 to 12 C atoms, and the other of the radicals $R^c$ and $R^d$ denotes an alkyl radical having 1 to 12 C atoms, in which, in addition, one or two non-adjacent $CH_2$ groups may each be replaced by —O—, —CH=CH—, —CO—, —OCO— or —COO— in such a way that O atoms are not linked directly to one another,
$L^1$ denotes F, Cl, $CF_3$, $OCF_3$ or $CHF_2$,
a denotes 1 or 2,
wherein said one or more compounds of formula A are not compounds of formulae A3a and A6a.

4. A liquid-crystalline medium according to one or more of claim 1, further comprising one or more compounds selected from formulae A3a and A6a:

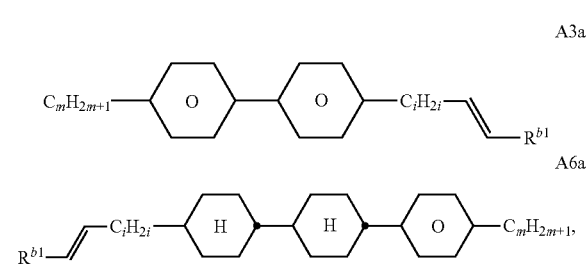

A3a

A6a in which
m denotes 1, 2, 3, 4, 5 or 6,
i denotes 0, 1, 2 or 3, and
$R^{b1}$ denotes H, $CH_3$ or $C_2H_5$.

5. A liquid-crystalline medium according to claim 1, further comprising one or more compounds selected from the compounds of formulae IIA, IIB and IIC,

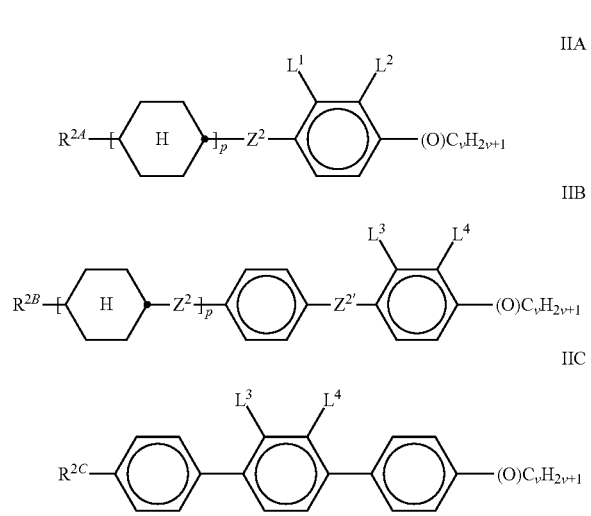

IIA

IIB

IIC in which
$R^{2A}$, $R^{2B}$ and $R^{2C}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

—C≡C—, —$CF_2$O—, —$OCF_2$—, —OC—O— or —O—CO— in such a way that O atoms are not linked directly to one another,
$L^{1-4}$ each, independently of one another, denote F or Cl,
$Z^2$ and $Z^{2'}$ each, independently of one another, denote a single bond, —$CH_2CH_2$—, —CH=CH—, —$CF_2$O—, —$OCF_2$—, —$CH_2$O—, —$OCH_2$—, —COO—, —OCO—, —$C_2F_4$—, —CF=CF—, or —CH=CHCH_2O—, p denotes 1 or 2, q denotes 0 or 1, and v denotes 1 to 6, with the proviso that the compounds of formulae IIA and IIB are not identical to the compounds of formula I1, I2, I3, or I4.

6. A liquid-crystalline medium according to one or more of claim 1, further comprising one or more compounds of formula III,

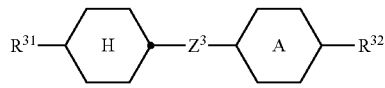

III in which $R^{31}$ and $R^{32}$ each, independently of one another, denote a straight-chain alkyl, alkoxyalkyl or alkoxy radical having up to 12 C atoms, and

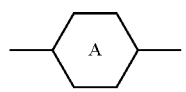

denotes

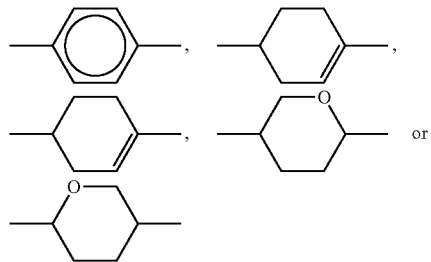

$Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_9$—, or —CF=CF—.

7. A liquid-crystalline medium according claim 1, wherein said one or more compounds selected from formulate L-1 to L-11, EY, and T-1 to T-21 are selected from one or more compounds of the formulate L-1 to L-11,

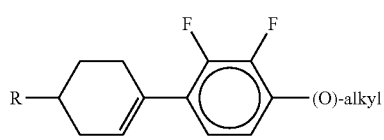
L-1

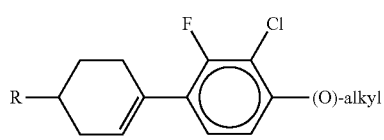
L-2

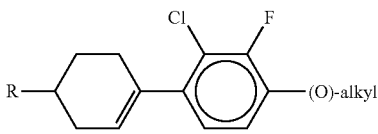
L-3

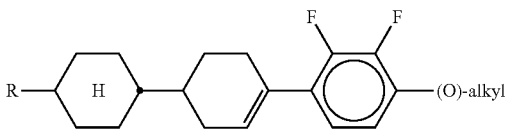
L-4

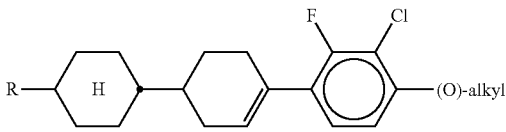
L-5

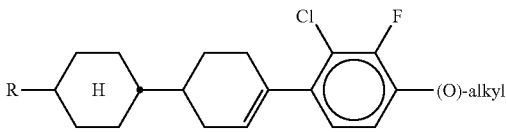
L-6

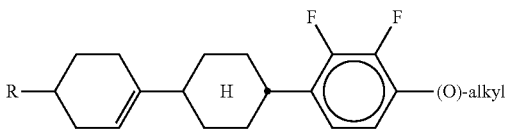
L-7

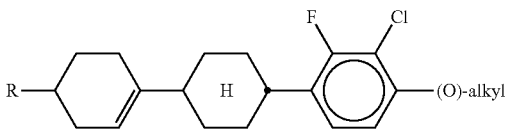
L-8

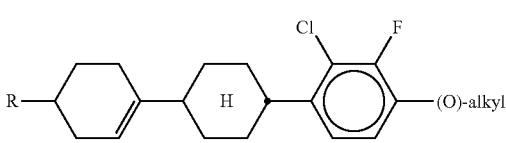
L-9

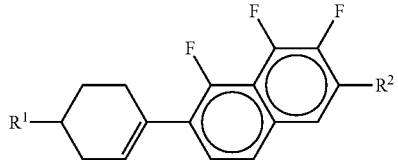
L-10

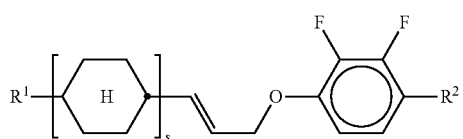
L-11 in which

R, $R^1$ and $R^2$ each, independently of one another, denote H, an alkyl or alkenyl radical having up to 15 C atoms which is unsubstituted, monosubstituted by CN or CF$_3$ or at least monosubstituted by halogen, where, in addition, one or more CH$_2$ groups in these radicals may each be replaced by —O—, —S—,

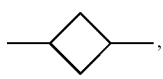

—C≡C—, —CF₂O—, —OCF₂—, —OC—O— or —O—CO— in such a way that O atoms are not linked directly to one another, (O) denotes —O— or a single bond, alkyl denotes an alkyl radical having 1-6 C atoms, and s denotes 1 or 2.

8. A liquid-crystalline medium according to claim 1, wherein said one or more compounds selected from formulae L-1 to L-11, EY, and T-1 to T-21 are selected from one or more compounds of the formulate T-1 to T-21, T-1
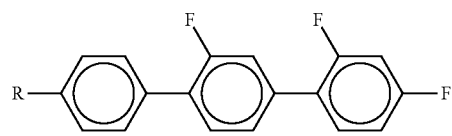

T-2
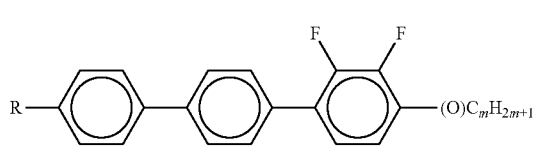

T-3
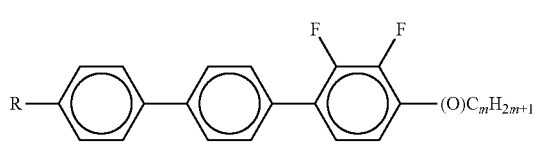

T-4
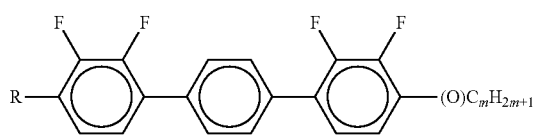

T-5
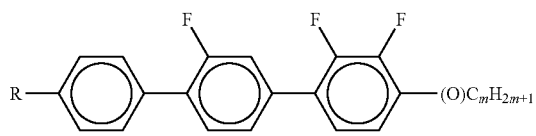

T-6
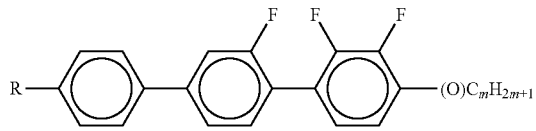

T-7
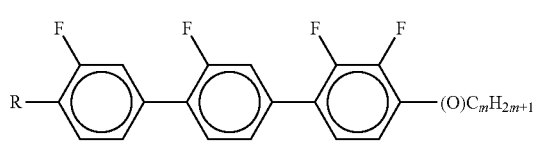

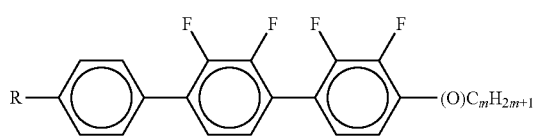

T-8
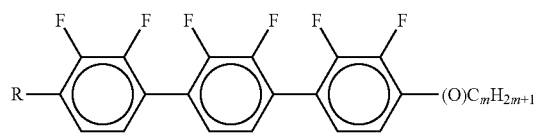

T-9
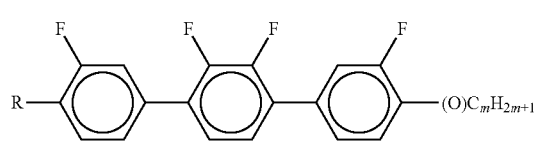

T-10
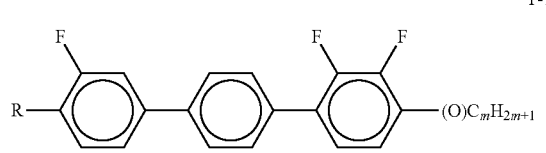

T-11
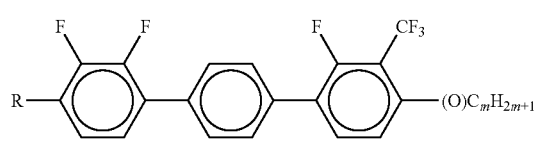

T-12
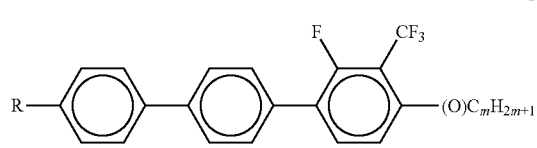

T-13
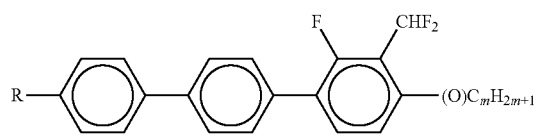

T-14
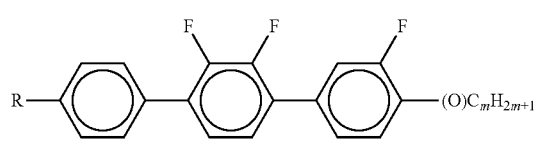

T-15
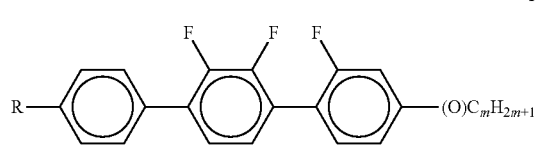

T-16
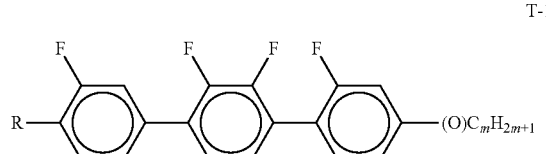

T-17

-continued

T-18
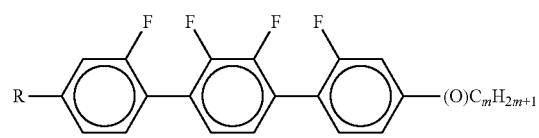

T-19
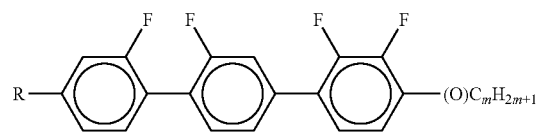

T-20
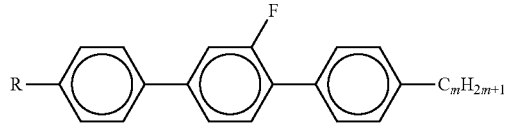

T-21
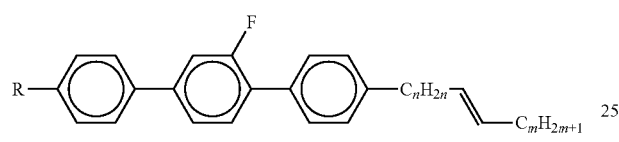

in which
R denotes a straight-chain alkyl or alkoxy radical having 1-7 C atoms,
(O) denotes —O— or a single bond,
m denotes 1-6, and
n denotes 0, 1, 2, 3 or 4.

9. A liquid-crystalline medium according claim 1, further comprising one or more compounds of formulae O-1 to O-17, O-1
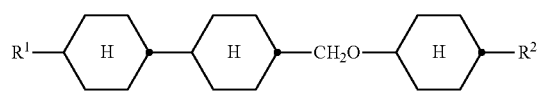

O-2
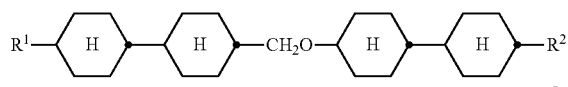

O-3
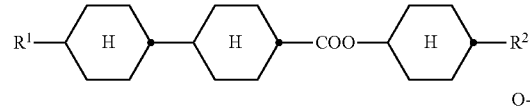

O-4
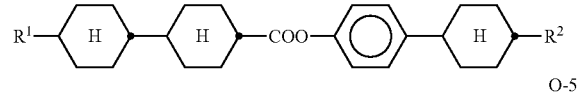

O-5
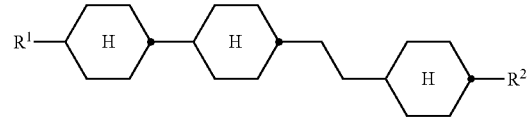

O-6
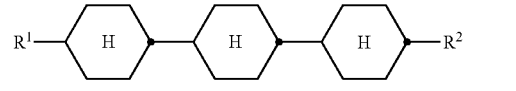

-continued

O-7
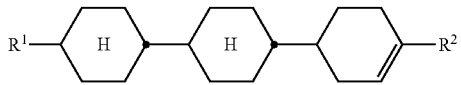

O-8
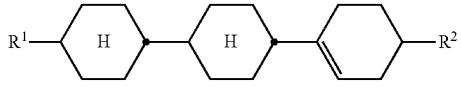

O-9
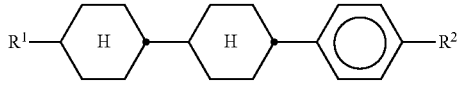

O-10
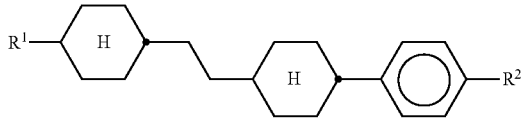

O-11
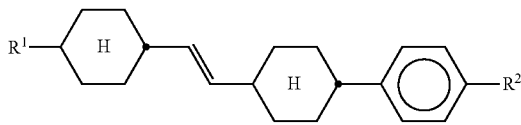

O-12
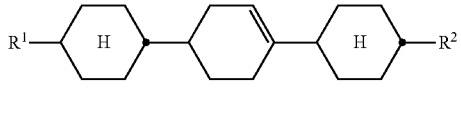

O-13
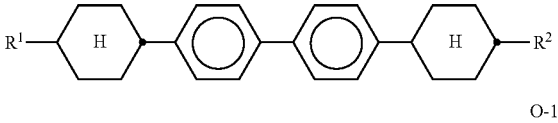

O-14
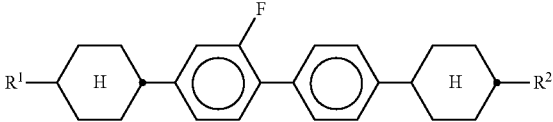

O-15
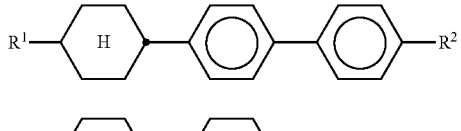

O-16

O-17
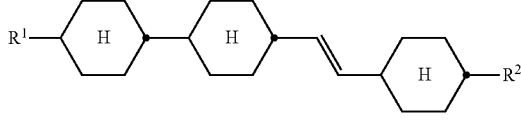

in which
$R^1$ and $R^2$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

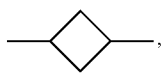,

—C≡C—, —CF$_2$O—, —OCF$_2$—, —OC—O— or —O—CO— in such a way that O atoms are not linked directly to one another.

10. A liquid-crystalline medium according claim 1, further comprising one or more indane compounds of formula In,

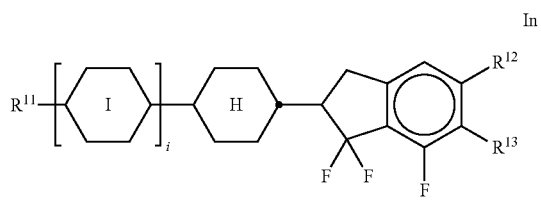 In in which
R$^{11}$, R$^{12}$, R$^{13}$ each, independently of one another, denote a straight-chain alkyl, alkoxy, alkoxyalkyl or alkenyl radical having 1-5 C atoms,
R$^{12}$ and R$^{13}$ additionally can also denote halogen,

denotes

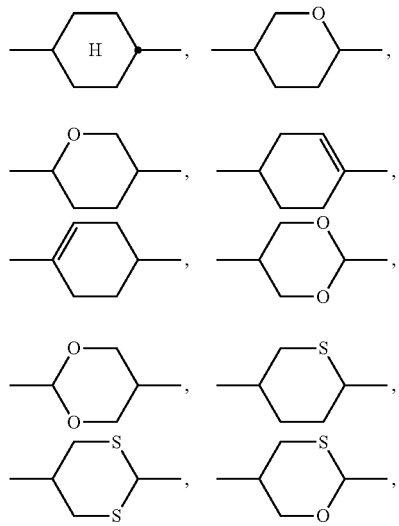

and
i denotes 0, 1 or 2.

11. A liquid-crystalline medium according to claim 1, further comprising one or more polymerizable compounds.

12. A liquid-crystalline medium according claim 11, wherein the concentration of the polymerizable compound(s), based on the total weight of the medium, is 0.01-5% by weight.

13. A liquid-crystalline medium according to claim 11, wherein the polymerizable compound(s) is (are) selected from compounds of formula M $$R^a\text{-}A^1\text{-}(Z^1\text{-}A^2)_m\text{-}R^b \quad M$$

in which the individual radicals have the following meanings:
R$^a$ and R$^b$ each, independently of one another, denote P, P-Sp-, H, halogen, SF$_5$, NO$_2$, a carbon group or a hydrocarbon group, where at least one of the radicals R$^a$ and R$^b$ denotes or contains a group P or P-Sp-,
P on each occurrence, identically or differently, denotes a polymerizable group,
Sp on each occurrence, identically or differently, denotes a spacer group or a single bond,
A$^1$ and A$^2$ each, independently of one another, denote an aromatic, heteroaromatic, alicyclic or heterocyclic group, preferably having 4 to 25 ring atoms, which may also contain fused rings, and which may also be mono- or polysubstituted by L,
L denotes P-Sp-, H, OH, CH$_2$OH, halogen, SF$_5$, NO$_2$, a carbon group or a hydrocarbon group,
Z$^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{a1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond,
R$^0$ and R$^{00}$ each, independently of one another, denote H or alkyl having 1 to 12 C atoms,
m denotes 0, 1, 2, 3 or 4, and
n1 denotes 1, 2, 3 or 4.

14. A liquid-crystalline medium according to claim 1, further comprising one or more additives.

15. A liquid-crystalline medium according to claim 14, wherein said additive is selected from free-radical scavengers, antioxidants and/or stabilizers.

16. A liquid-crystalline medium according to claim 1, further comprising one or more stabilizers selected from the following:

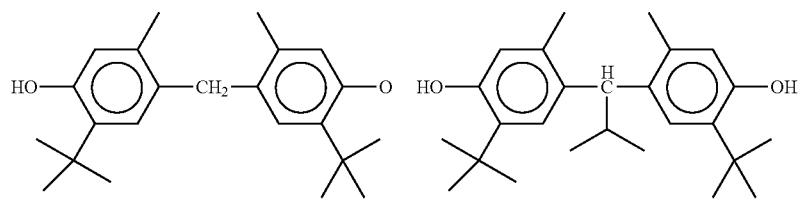

-continued
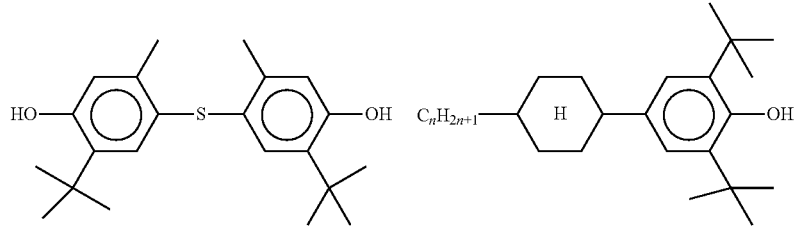
n = 1, 2, 3, 4, 5, 6 or 7
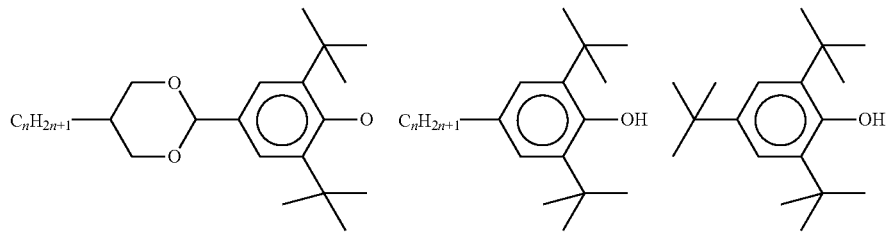
n = 1, 2, 3, 4, 5, 6 or 7    n = 1, 2, 3, 4, 5, 6 or 7
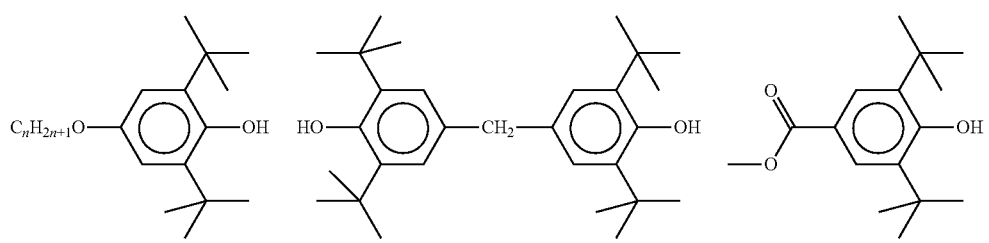
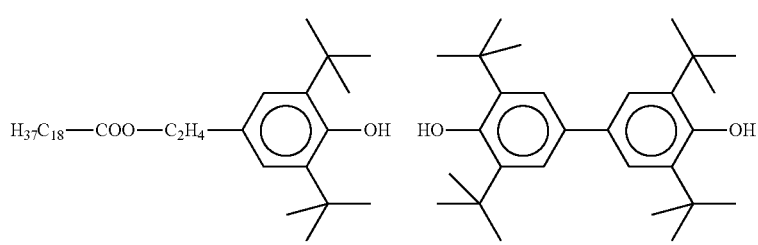
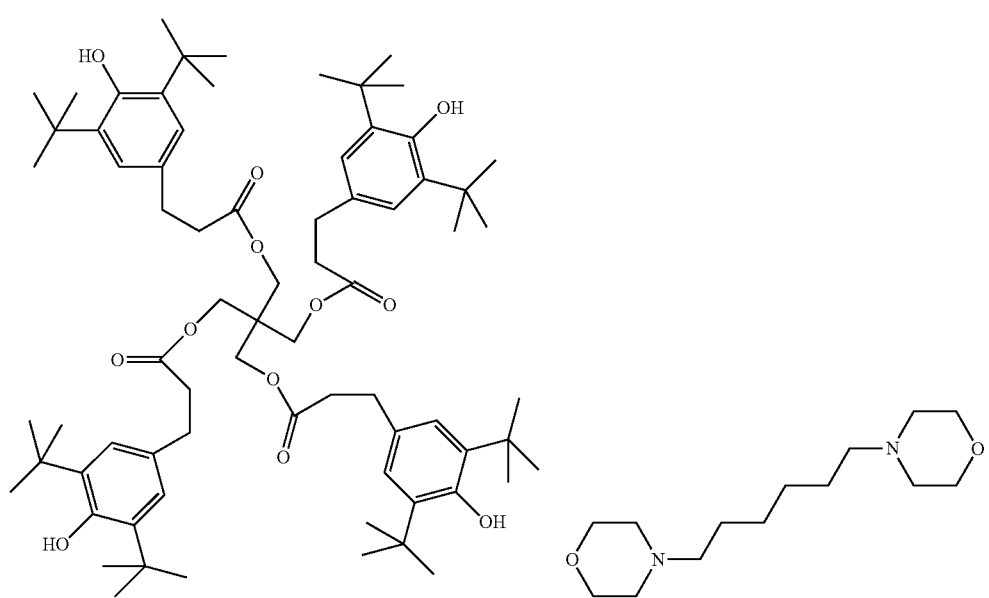

-continued
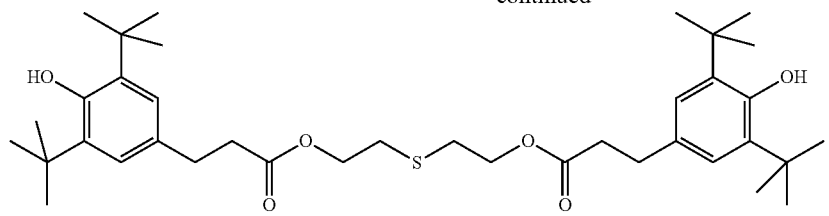
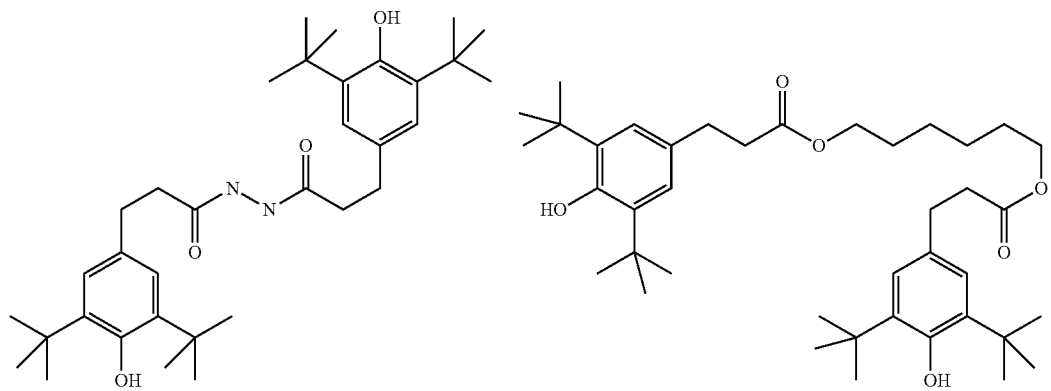
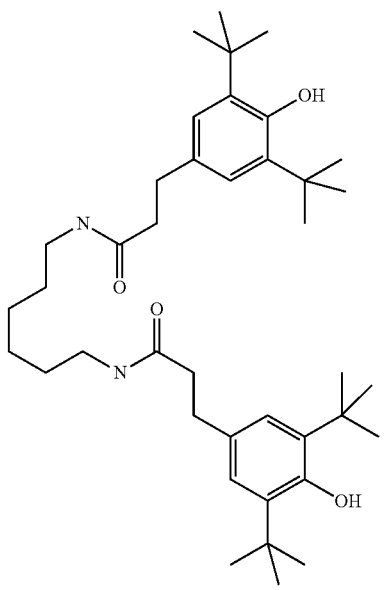
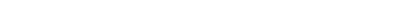
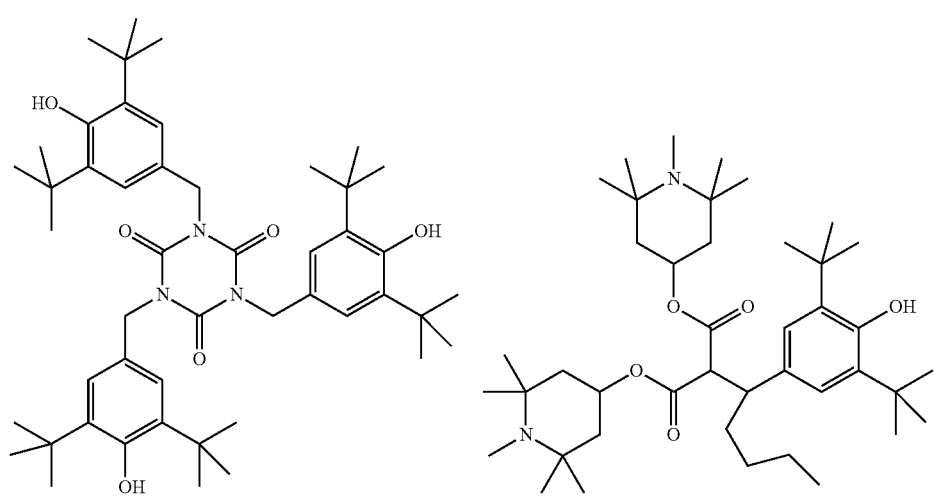

171
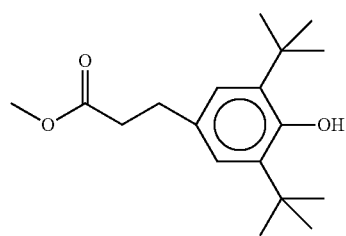
-continued
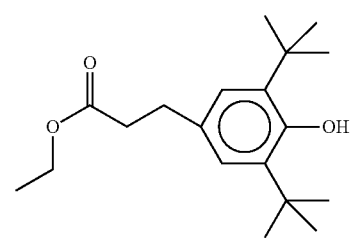
172
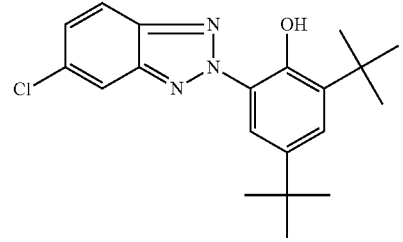
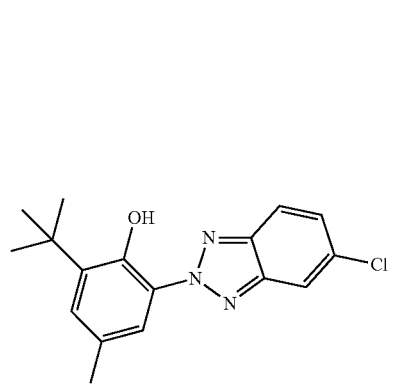
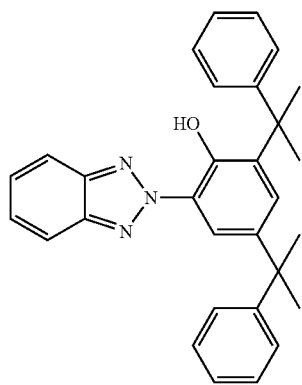
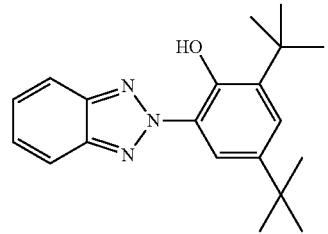
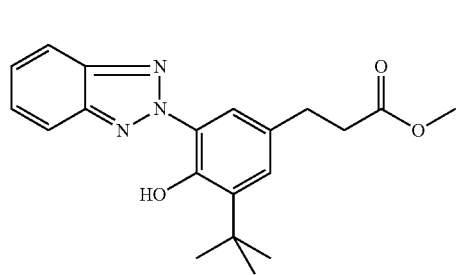
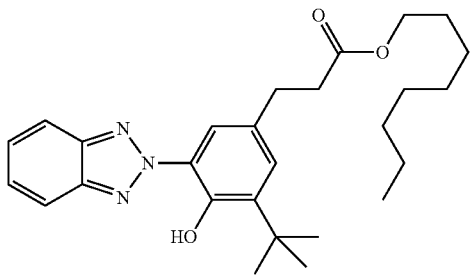
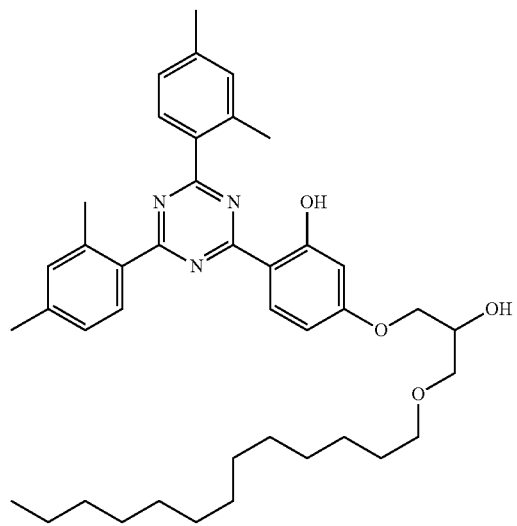
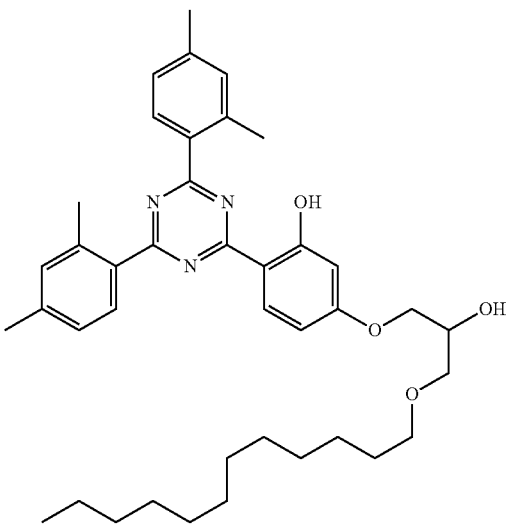

-continued

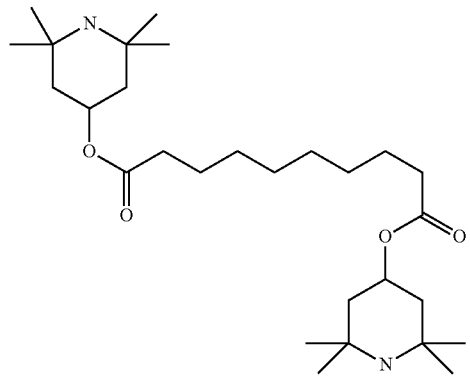
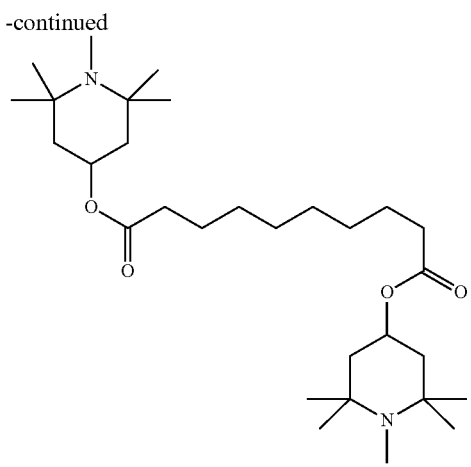
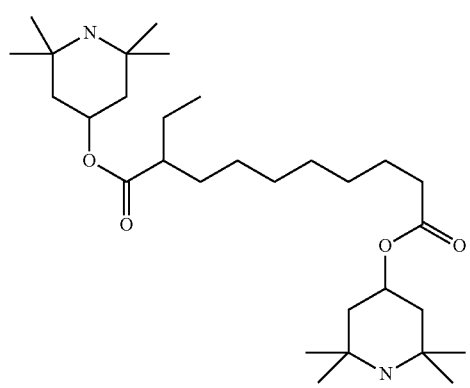
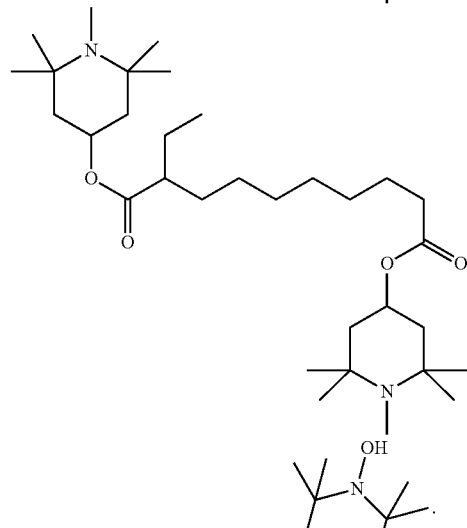
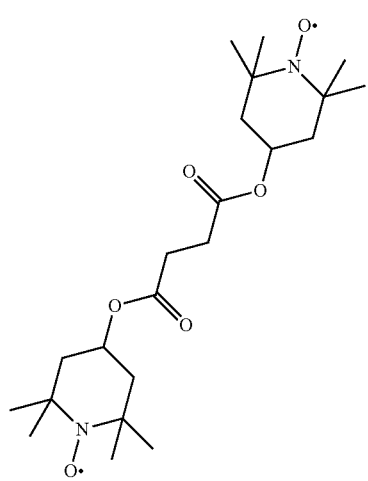
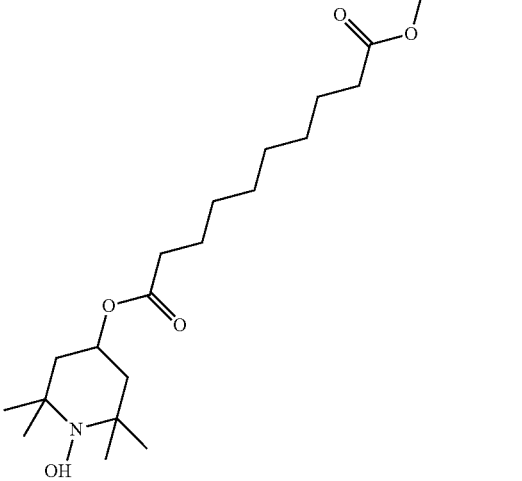

17. A liquid-crystalline medium according to claim 15, wherein said medium comprises one or more stabilizers in amounts of 0.001-10% by weight, based on the total weight of the medium.

18. A process for the preparation of a liquid-crystalline medium according to claim 1, comprising mixing at least one compound of formula I1 with one or more compounds of formula I3, one or more compounds of formula I4, one or more compounds selected from formulae L-1 to L-11, EY, and T-1 to T-21, optionally one or more compounds of formula I2, and optionally adding one or more additives.

19. A process according to claim 18, further comprising mixing at least one polymerizable compound, and one or more additives are optionally added.

20. A method of generating an electro-optical effect comprising applying a voltage to a liquid-crystalline medium according to claim 1.

21. The method according to claim 20 wherein said medium is contained in a VA, PSA, PS-VA, PA-VA, IPS, PS-IPS, FFS, PS-FFS or PALC display.

22. An electro-optical display having active-matrix addressing comprising, as dielectric, a liquid-crystalline medium according to claim 1.

23. An electro-optical display according to claim 22, wherein said display is a VA, PSA, PS-VA, PA-VA, IPS, PS-IPS, FFS, UB-FFS, PS-FFS or PALC display.

24. A liquid-crystalline medium according to claim 1, further comprising one or more compounds selected from formulae BC, CR, PH-1, PH-2, BF-1, BF-2, BS-1 and BS-2:

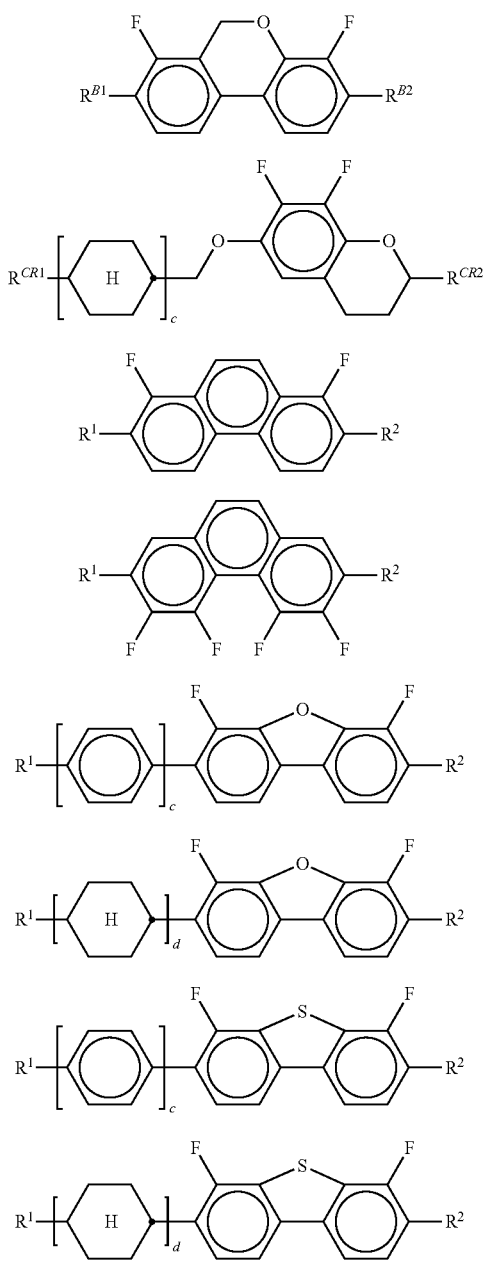

in which $R^{B1}$, $R^{B2}$, $R^{CR1}$, $R^{CR2}$, $R^1$, and $R^2$ each, independently of one another, denote H, an alkyl or alkenyl radical having up to 15 C atoms which is un-substituted, monosubstituted by CN or $CF_3$ or at least monosubstituted by halogen, where, in addition, one or more $CH_2$ groups in these radicals may each be replaced by —O—, —S—,

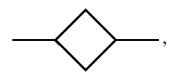

—C≡C—, —$CF_2$O—, —O$CF_2$—, —OC—O— or —O—CO— in such a way that O atoms are not linked directly to one another, c denotes 0, 1 or 2, and d denotes 1 or 2.

25. A liquid-crystalline medium according to claim 24, wherein said one or more compounds selected from formulae BC, CR, PH-1, PH-2, BF-1, BF-2, BS-1 and BS-2 are selected from the following subformulae:

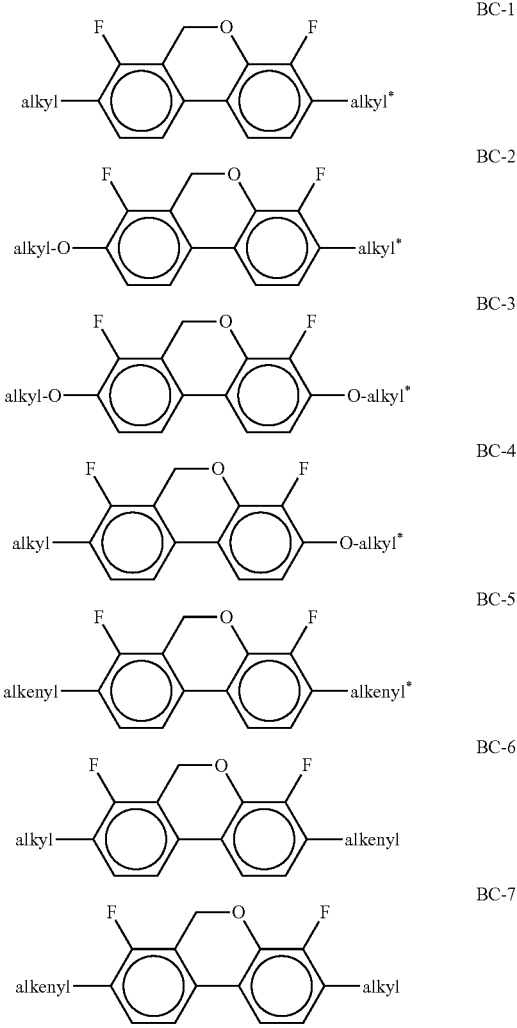

-continued

CR-1
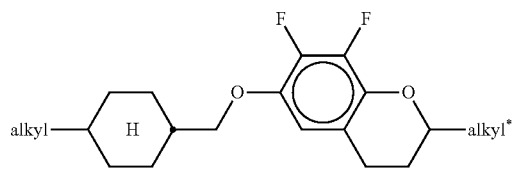

CR-2
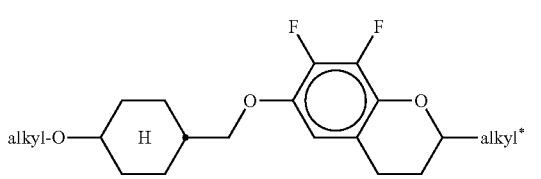

CR-3
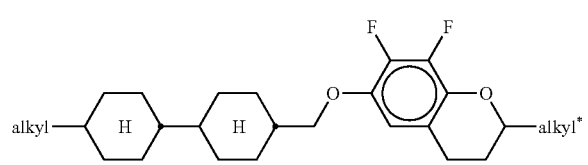

CR-4
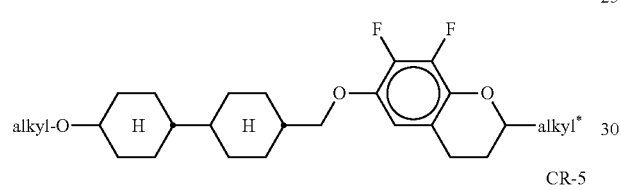

CR-5
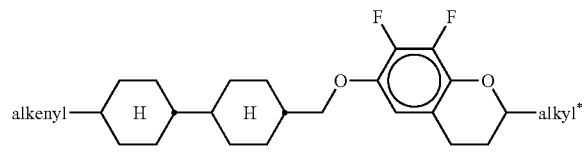

BF-1a
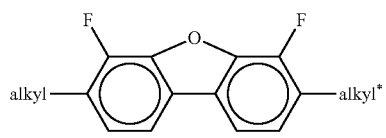

BF-1b
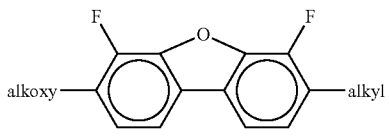

BF-1c
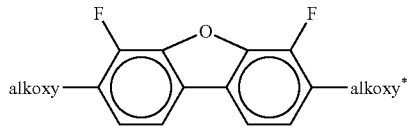

BS-1a
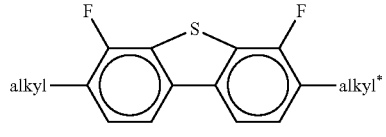

BS-1b
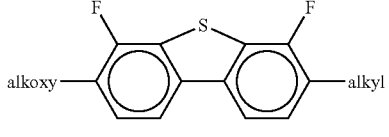

-continued

BS-1c
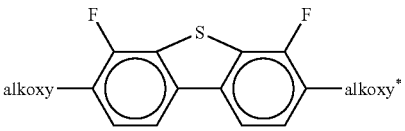

in which
alkyl and alkyl* each, independently of one another, denote a straight-chain alkyl radical having 1-6 C atoms,
alkoxy and alkoxy* each, independently of one another, denote a straight-chain alkoxy radical having 1-6 C atoms, and
alkenyl and
alkenyl* each, independently of one another, denote a straight-chain alkenyl radical having 2-6 C atoms.

26. A liquid-crystalline medium according to claim 7, wherein said one or more compounds selected from formulae L-1 to L-11 are selected from formulae L-1 to L-4.

27. A liquid-crystalline medium according to claim 1, wherein said one or more compounds selected from formulae L-1 to L-11, EY, T-1 to T-21 and are selected from formula EY:

EY
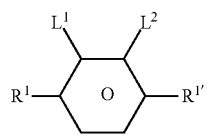

in which
$R^1$ denotes H, an alkyl or alkenyl radical having up to 15 C atoms which is un-substituted, monosubstituted by CN or $CF_3$ or at least monosubstituted by halogen, where, in addition, one or more $CH_2$ groups in these radicals may each be replaced by —O—, —S—,

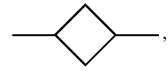

—C≡C—, —$CF_2$O—, —O$CF_2$—, —OC—O— or —O—CO—in such a way that O atoms are not linked directly to one another,
$L^1$ and $L^2$ are each independently F or Cl, and
$R^{1*}$ denotes H, an alkyl or alkenyl radical having up to 15 C atoms which is un-substituted, monosubstituted by CN or $CF_3$ or at least monosubstituted by halogen, where, in addition, one or more $CH_2$ groups in these radicals may each be replaced by —O—, —S—,

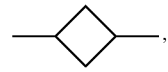

—C≡C—, —$CF_2$O—, —O$CF_2$—, —OC—O— or —O—CO—in such a way that O atoms are not linked directly to one another.

28. A liquid-crystalline medium according to claim 27, wherein said one or more compounds selected from formula EY are selected from the following compounds:

| | |
|---|---|
| EY-1 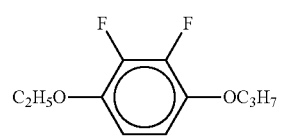 | EY-12 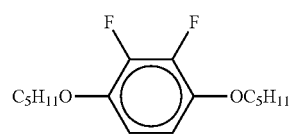 |
| EY-2 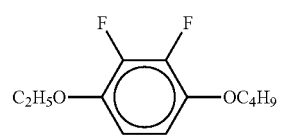 | EY-13 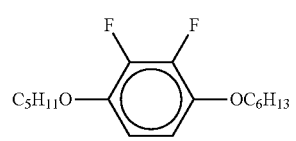 |
| EY-3 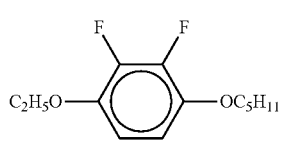 | EY-14 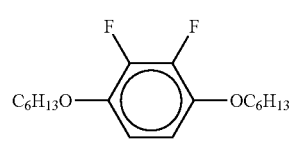 |
| EY-4 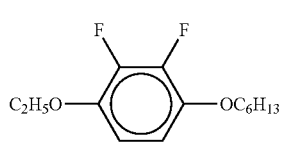 | EY-15 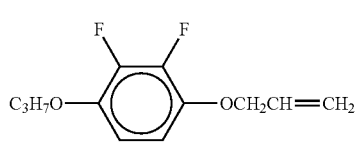 |
| EY-5 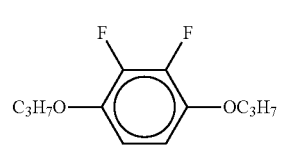 | EY-16 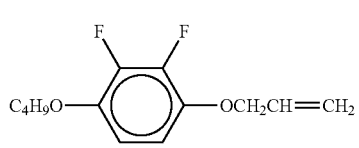 |
| EY-6 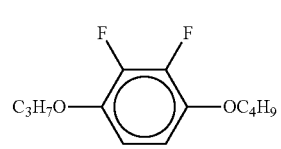 | EY-17 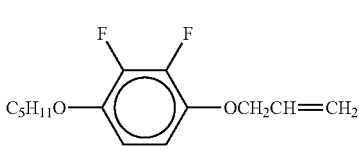 |
| EY-7 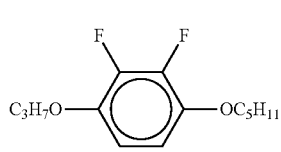 | EY-18 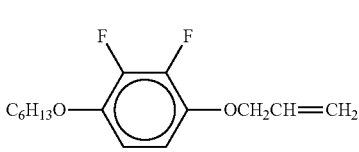 |
| EY-8 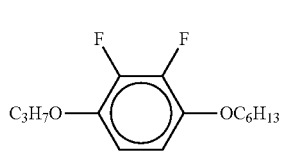 | EY-19 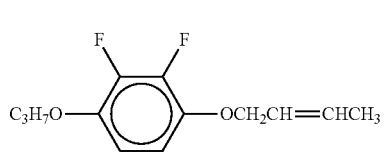 |
| EY-9 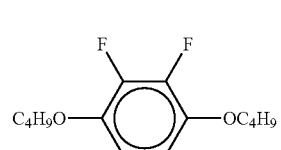 | EY-20 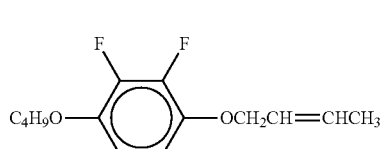 |
| EY-10 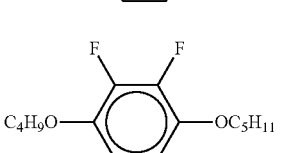 | EY-21 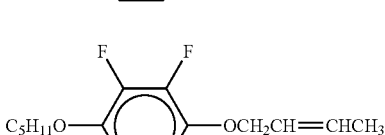 |
| EY-11 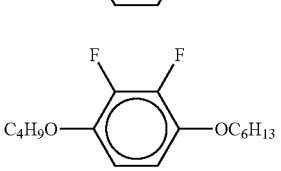 | EY-22 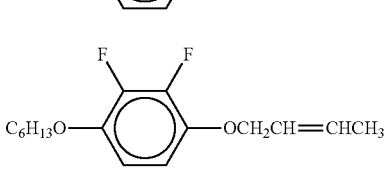 |

-continued

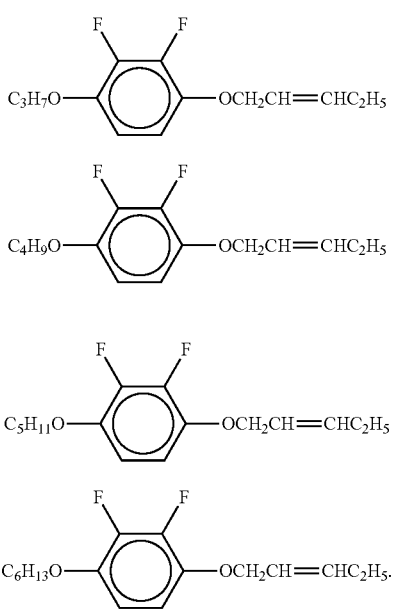

29. A liquid-crystalline medium according to claim 1, further comprising one or more compounds selected from formulae Q-1 to Q-9:

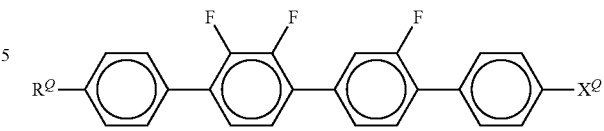

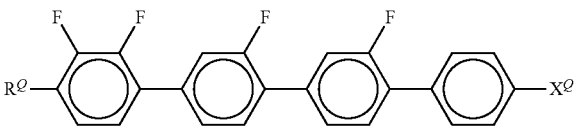

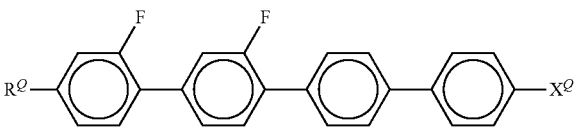

in which $R^Q$ and $X^Q$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—, —C≡C—, —$CF_2$O—, —O$CF_2$—, —OC—O— or —O—CO— in such a way that O atoms are not linked directly to one another.

30. A liquid-crystalline medium according to claim 11, wherein said one or more polymerizable compounds are selected from the following compounds:

-continued
RM-3
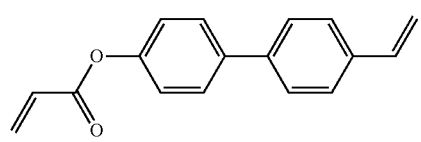
RM-4
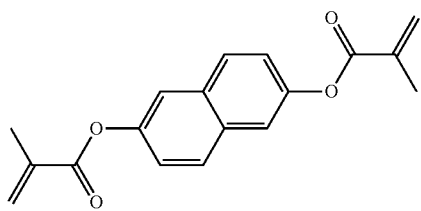
RM-5
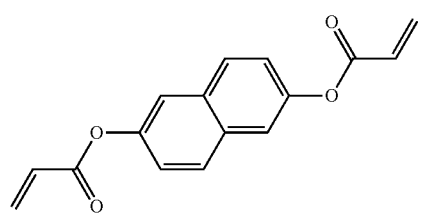
RM-6
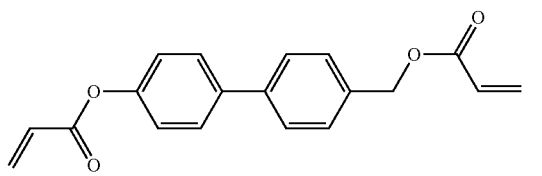
RM-7
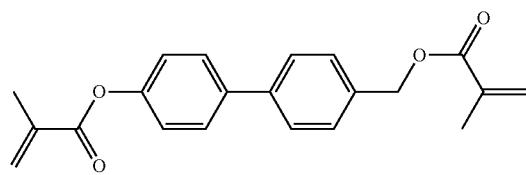
RM-8
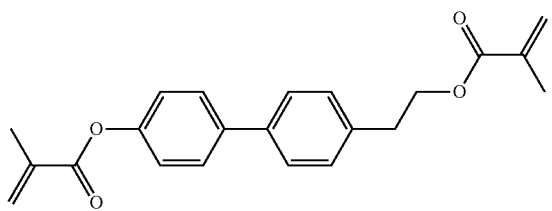
RM-9
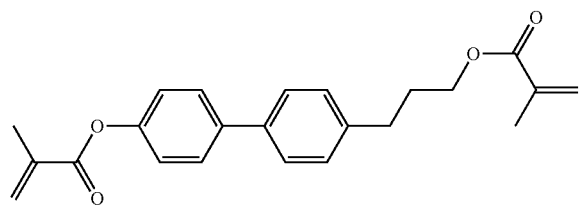
RM-10
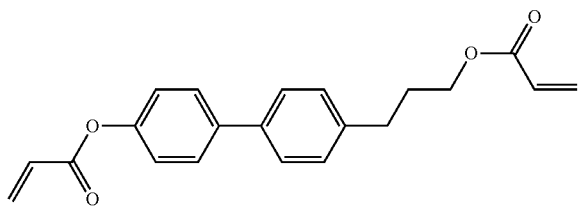
RM-11
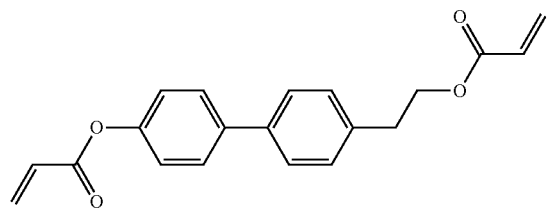
RM-12
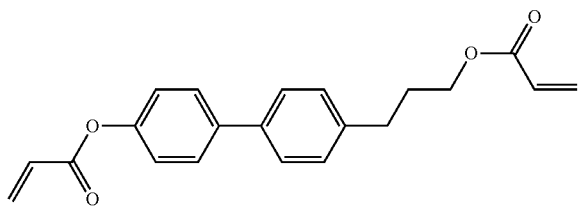
RM-13
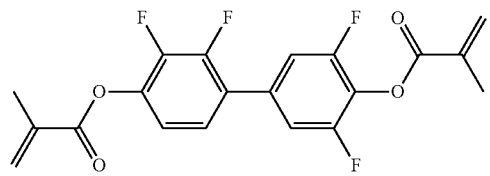
RM-14
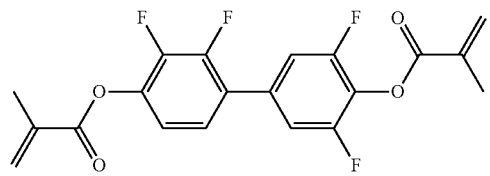
RM-15
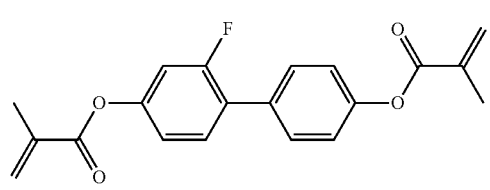
RM-16
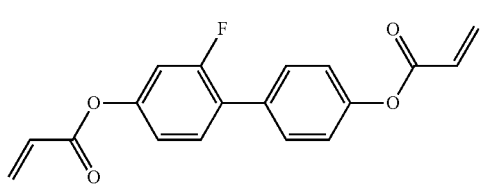

-continued
RM-17
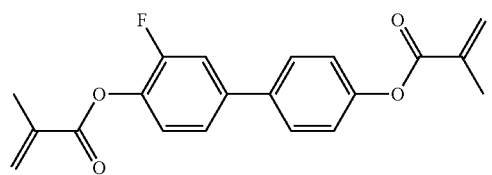
RM-18
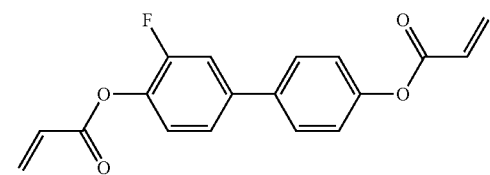
RM-19
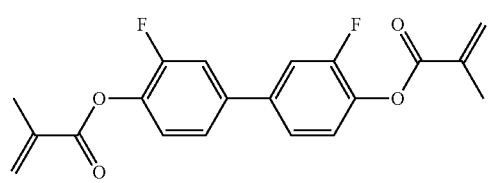
RM-20
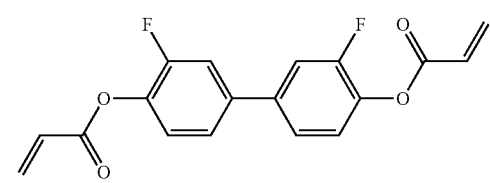
RM-21
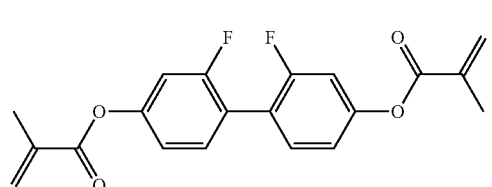
RM-22
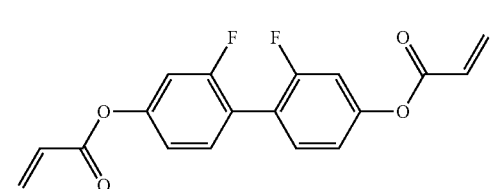
RM-23
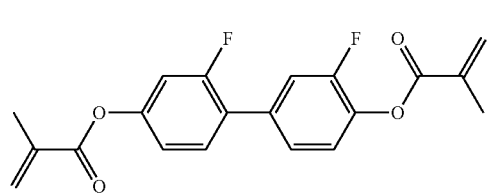
RM-24
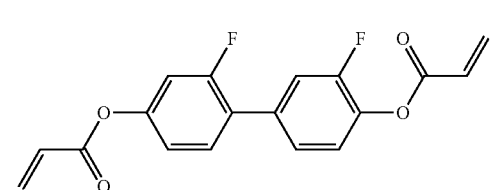
RM-25
RM-26
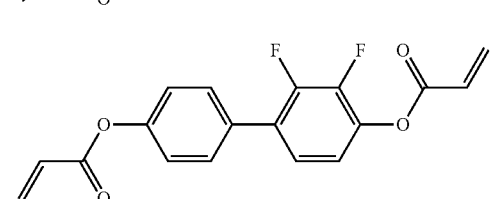
RM-27
RM-28
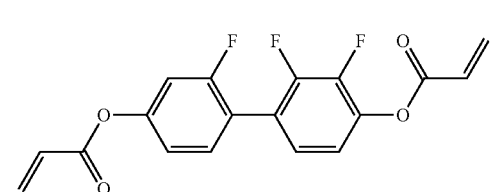
RM-29
RM-30
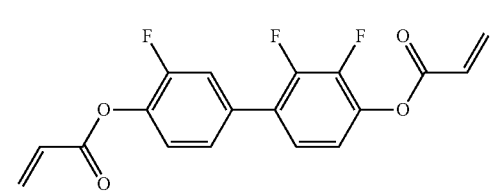
RM-31
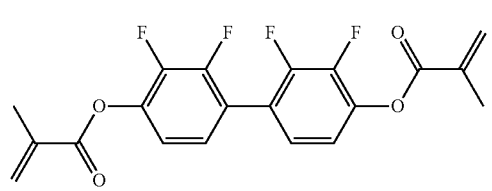
RM-32

-continued
RM-33
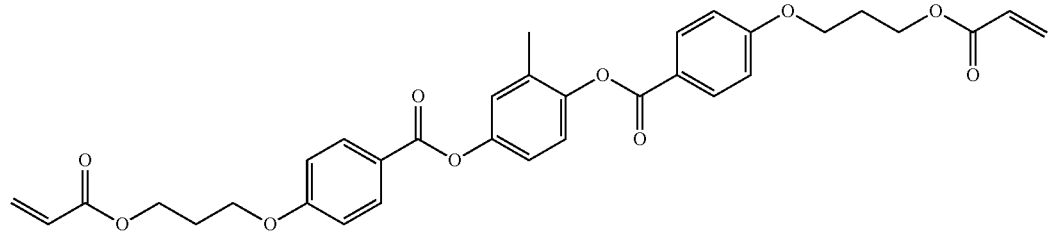
RM-34
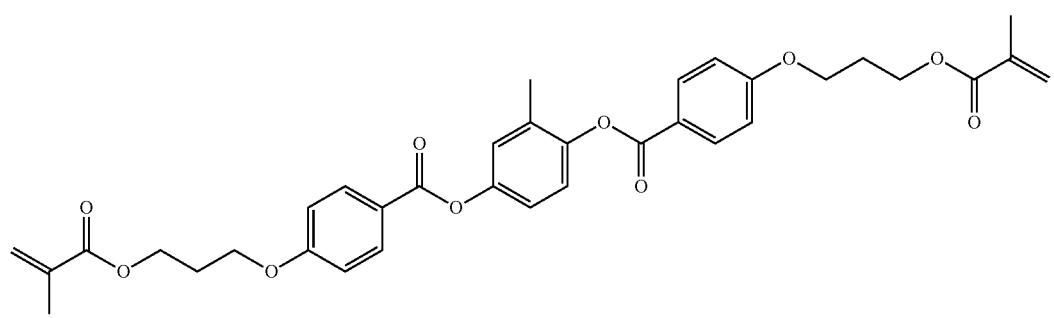
RM-35
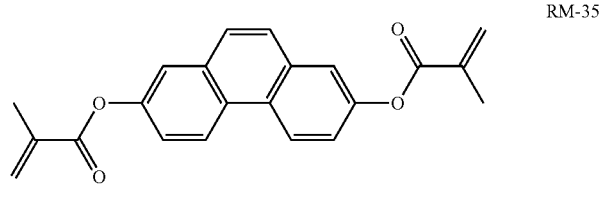
RM-36
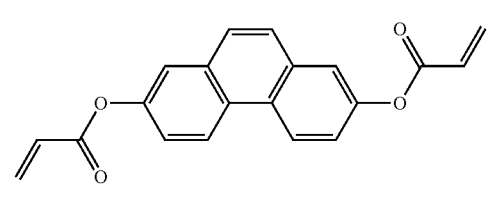
RM-37
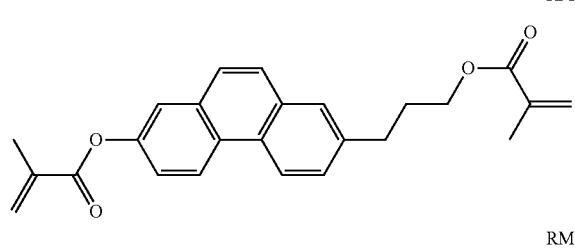
RM-38
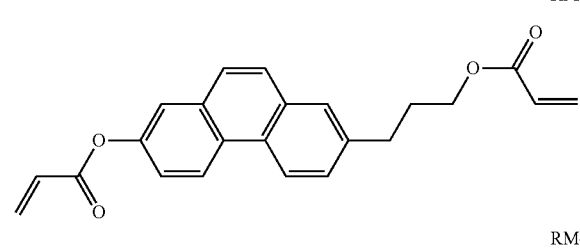
RM-39
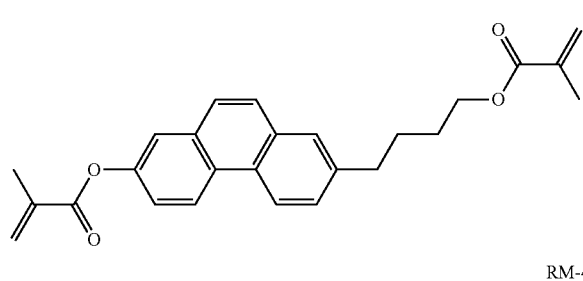
RM-40
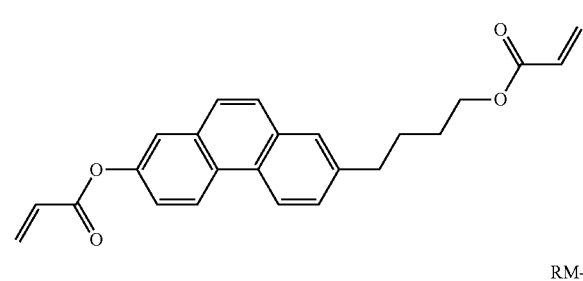
RM-41
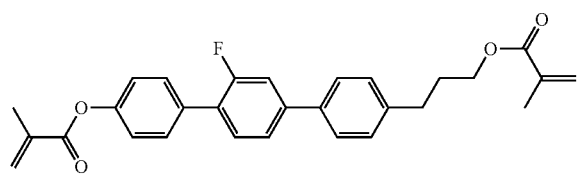
RM-42
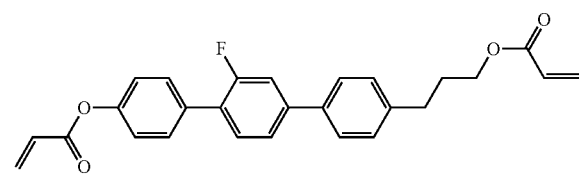
RM-43
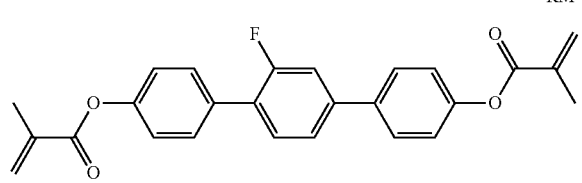
RM-44
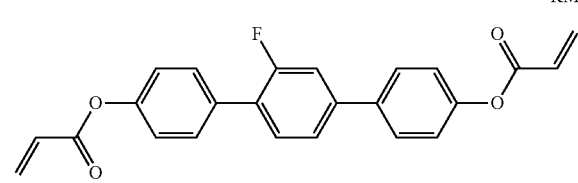

-continued
RM-45
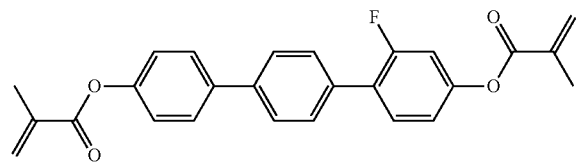
RM-46
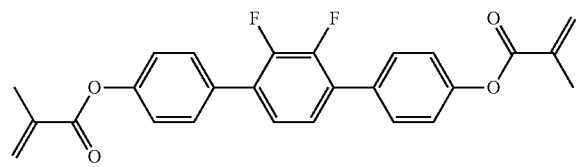
RM-47
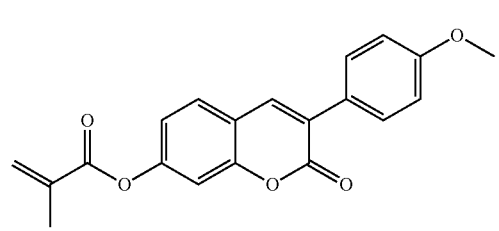
RM-48
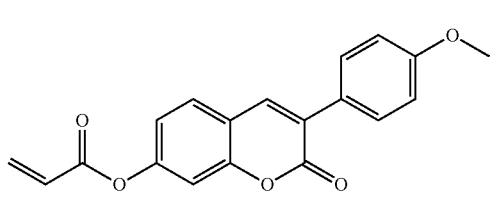
RM-49
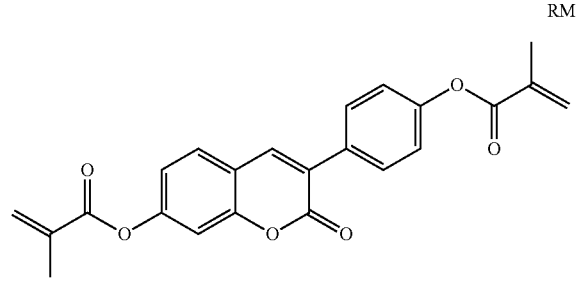
RM-50
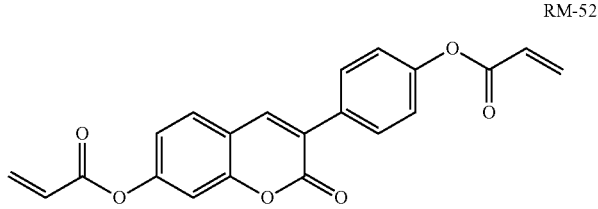
RM-51
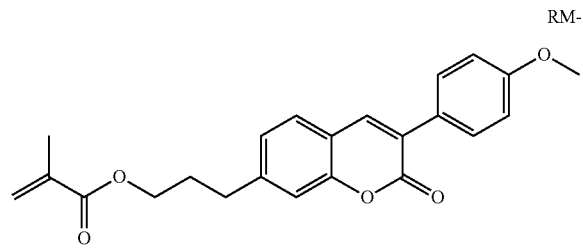
RM-52
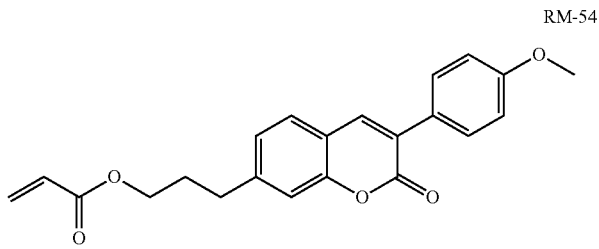
RM-53
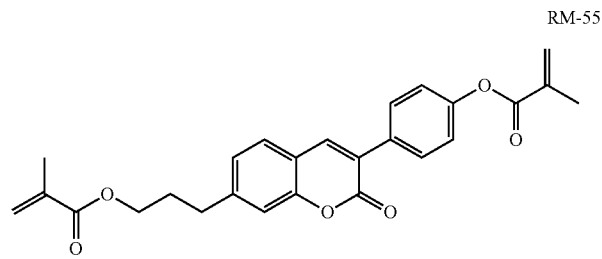
RM-54
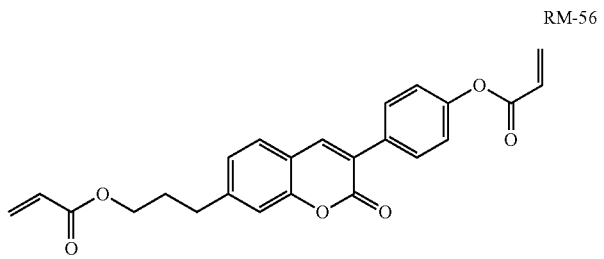
RM-55
RM-56

-continued
RM-57
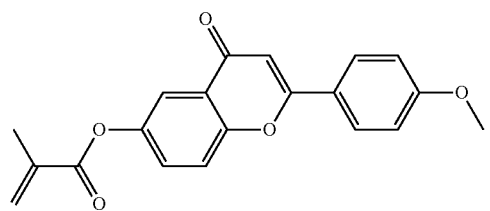
RM-58
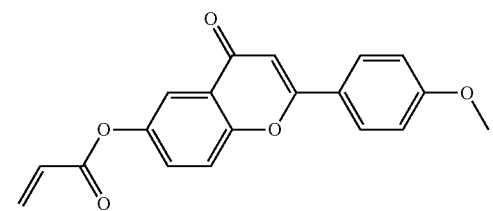
RM-59
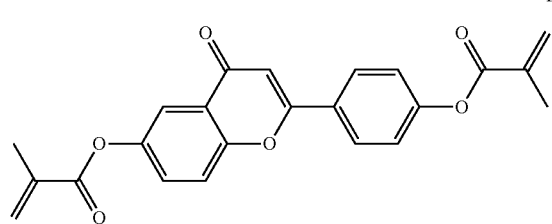
RM-60
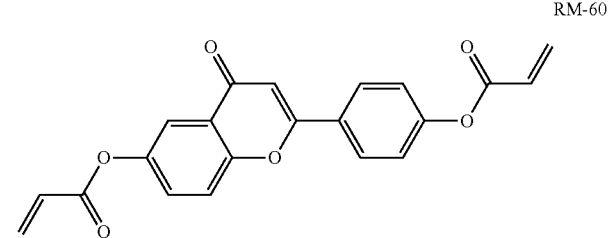
RM-61
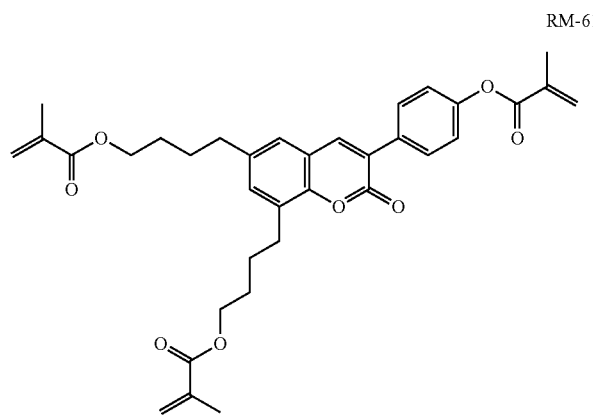
RM-62
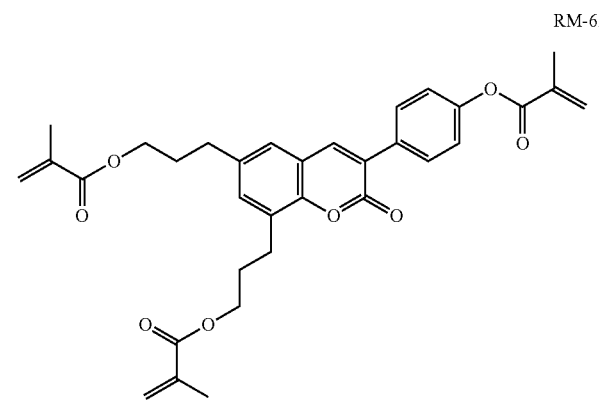
RM-63
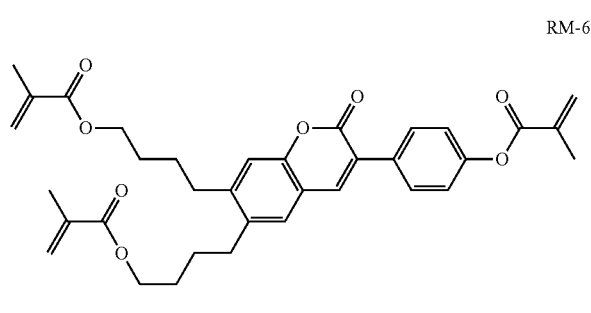
RM-64
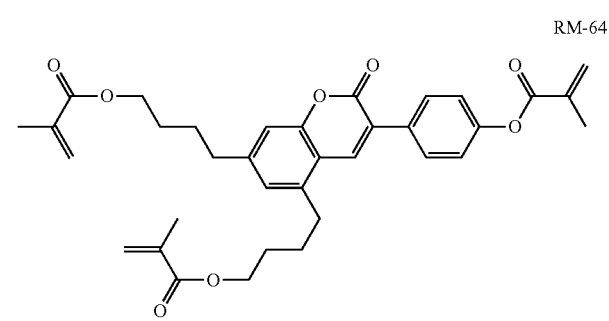
RM-65
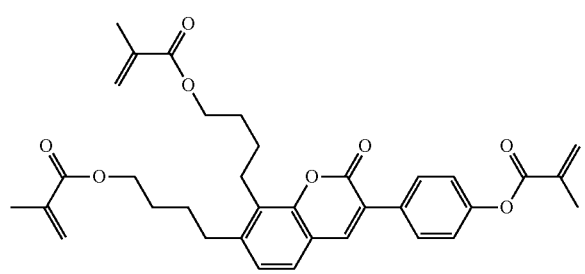

-continued
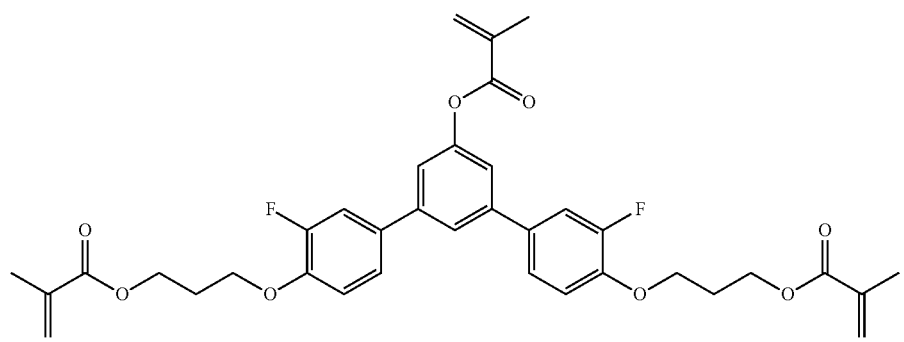
RM-66
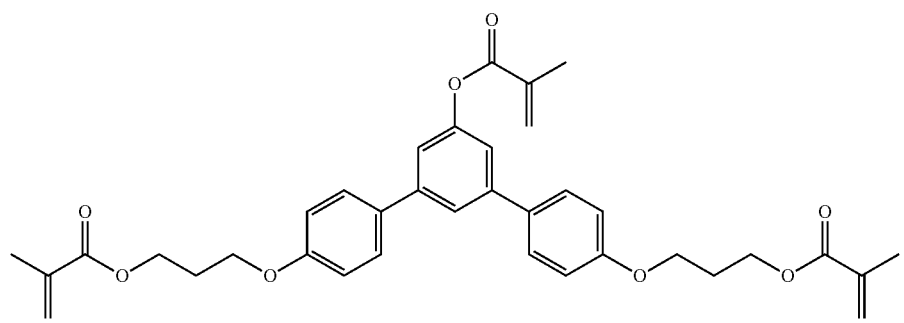
RM-67
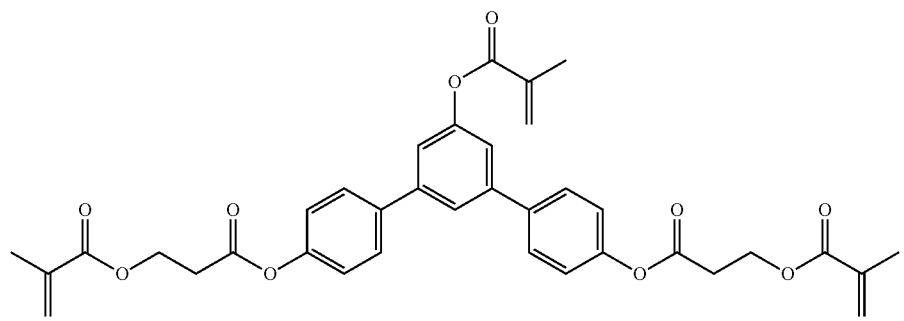
RM-68
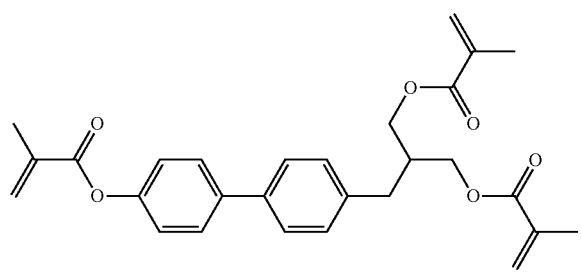
RM-69
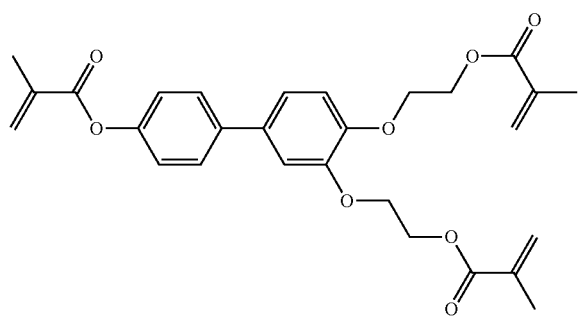
RM-70
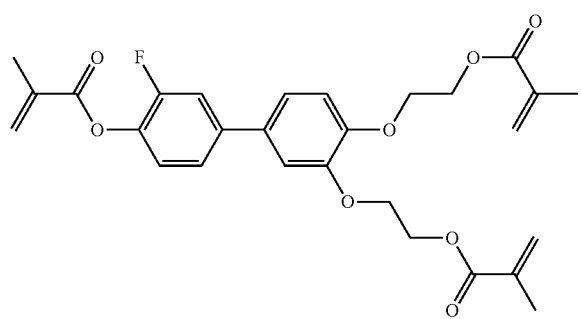
RM-71
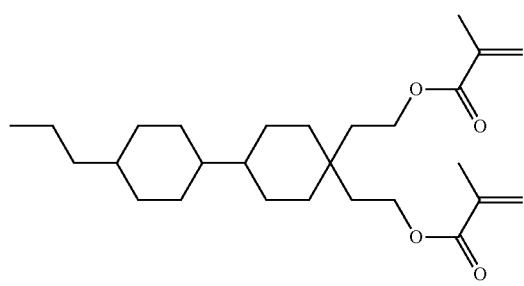
RM-72

-continued
RM-73
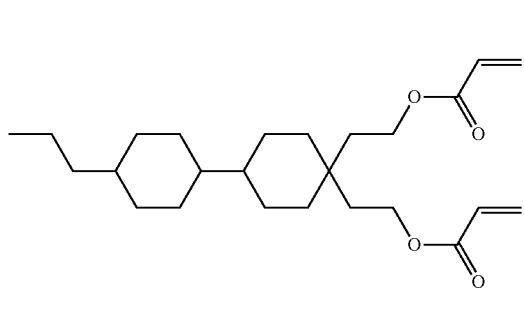
RM-74
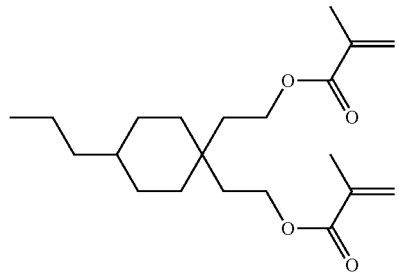
RM-75
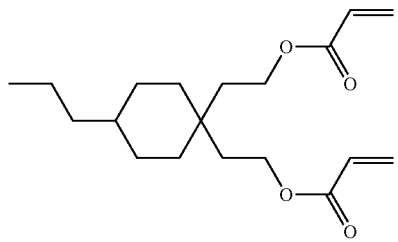
RM-76
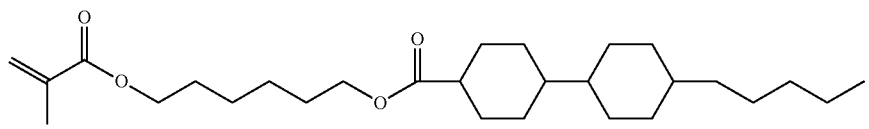
RM-77
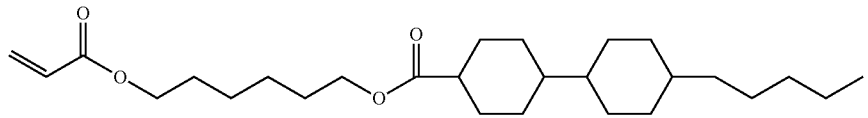
RM-78
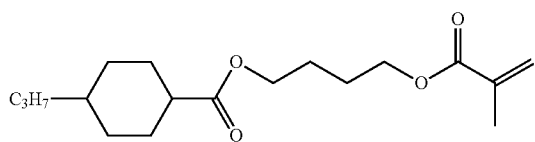
RM-79
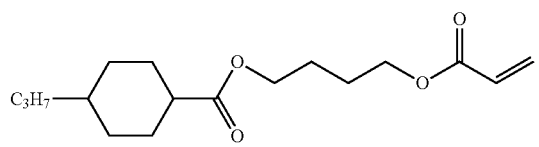
RM-80
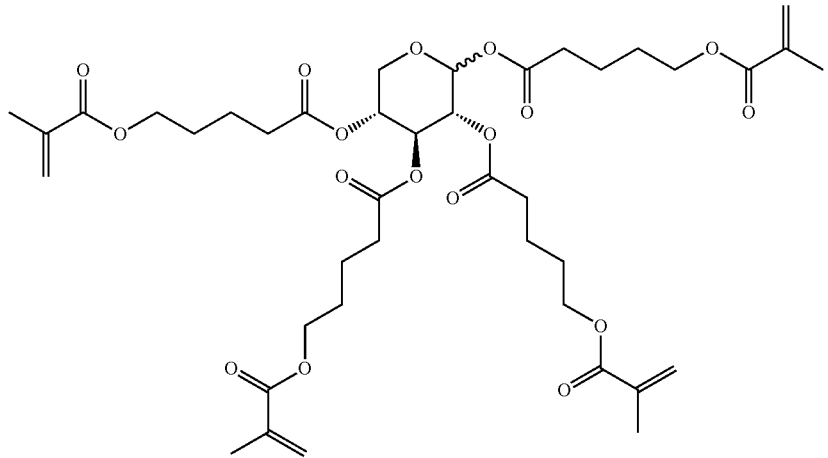

-continued
RM-81
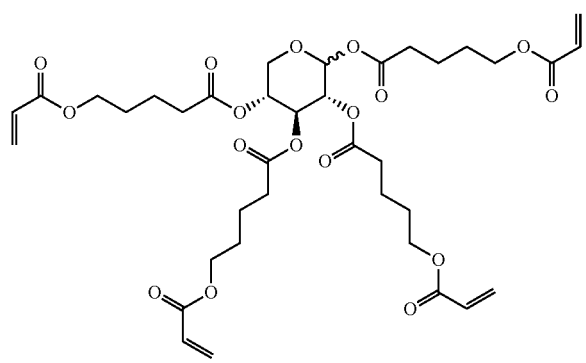
RM-82
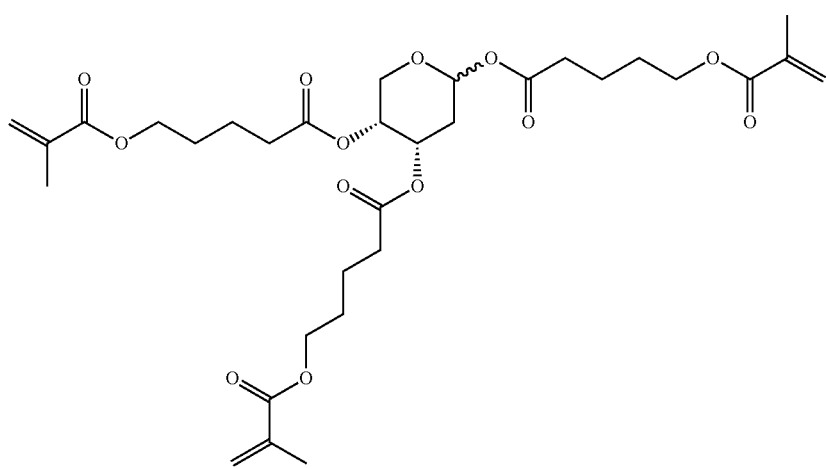
RM-83
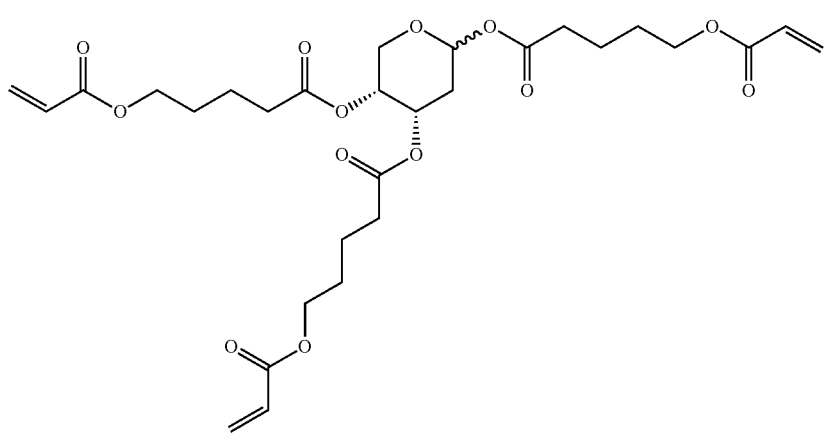
RM-84
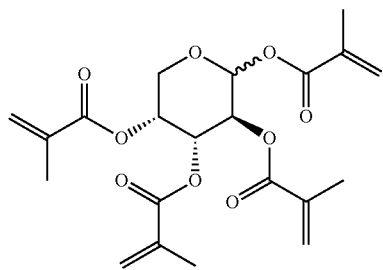
RM-85
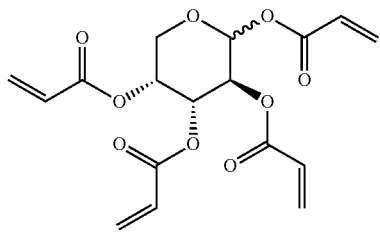

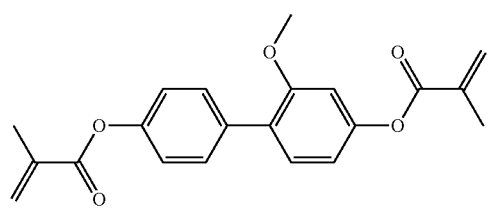

RM-86

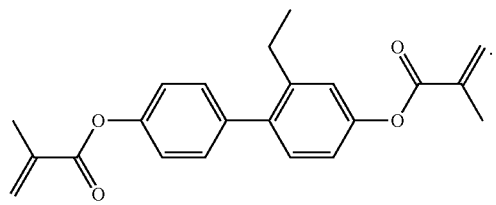

RM-87

31. A liquid-crystalline medium according to claim 1, wherein said medium further contains one or more compounds of formula A1a

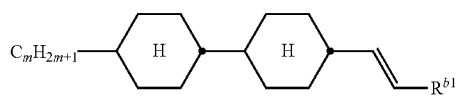

A1a wherein
m denotes 1, 2, 3, 4, 5 or 6, and
$R^{b1}$ denotes H, $CH_3$ or $C_2H_5$,
and wherein said compound of formula A1a is not a compound of formula CC-n-V wherein n is 3.

32. A liquid-crystalline medium according to claim 31, wherein said one or more compounds of formula A1a are selected from the following compounds

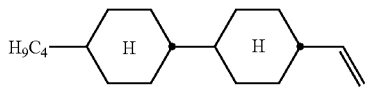

A1a2

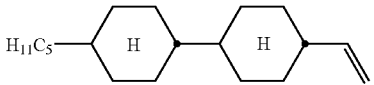

A1a3

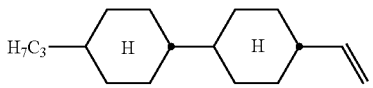

A1a4

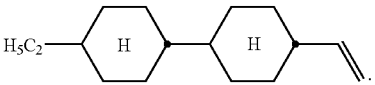

A1a5

33. A liquid-crystalline medium according to claim 1, wherein the amount of the compound of formula CC-n-V, wherein n is 3, is 30% to 50% by weight of based on the mixture as a whole.

34. A liquid-crystalline medium according to claim 24, wherein said one or more compounds selected from formulae BC, CR, PH-1, PH-2, BF-1, BF-2, BS-1 and BS-2 are selected from one or more compounds of the formulae BF-1, BF-2, BS-1 and BS-2.

* * * * *